(12) United States Patent
Hwang et al.

(10) Patent No.: US 12,456,795 B2
(45) Date of Patent: Oct. 28, 2025

(54) ELECTRONIC DEVICE COMPRISING ANTENNA

(71) Applicant: SAMSUNG ELECTRONICS CO., LTD., Suwon-si (KR)

(72) Inventors: Soonho Hwang, Suwon-si (KR); Kyungjae Lee, Suwon-si (KR); Kyungil Seo, Suwon-si (KR); Shinho Yoon, Suwon-si (KR); Seunghwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 18/313,812

(22) Filed: May 8, 2023

(65) Prior Publication Data

US 2023/0275340 A1 Aug. 31, 2023

Related U.S. Application Data

(63) Continuation of application No. PCT/KR2022/011478, filed on Aug. 3, 2022.

(30) Foreign Application Priority Data

Aug. 10, 2021 (KR) .................. 10-2021-0105677
Dec. 16, 2021 (KR) .................. 10-2021-0180895

(51) Int. Cl.
*H01Q 1/24* (2006.01)
*H01Q 9/04* (2006.01)
*H04B 1/3827* (2015.01)

(52) U.S. Cl.
CPC ........... *H01Q 1/243* (2013.01); *H01Q 9/0407* (2013.01); *H04B 1/3827* (2013.01)

(58) Field of Classification Search
CPC ...... H01Q 1/243; H01Q 9/0407; H01Q 1/528; H04B 1/3827; G06F 1/16; G09F 9/30; H04M 1/02
See application file for complete search history.

(56) References Cited

U.S. PATENT DOCUMENTS 8,981,889 B2   3/2015   Yoo et al.
9,704,663 B2   7/2017   Stanley et al.
(Continued)

FOREIGN PATENT DOCUMENTS

CN   108666739   10/2018
CN   210671188   6/2020
(Continued)

OTHER PUBLICATIONS

Extended European Search Report dated Oct. 9, 2024 issued in European Patent Application No. 22856098.3.
(Continued)

*Primary Examiner* — Fayyaz Alam
(74) *Attorney, Agent, or Firm* — Nixon & Vanderhye, P.C.

(57) ABSTRACT

An electronic device according to an embodiment may include: a first housing including a first edge oriented in a first direction and a second edge oriented in a second direction perpendicular to the first direction; a second housing rotatably connected to the first housing, wherein the second housing includes a third edge corresponding to the first edge and a fourth edge corresponding to the second edge when the first housing and the second housing face each other; a flexible display defining a front surface of the electronic device and disposed over the first housing and the second housing; a dielectric material at least partially disposed between the flexible display and the fourth edge of the second housing and at least partially surrounding a perimeter of the flexible display; a conductive member comprising a
(Continued)

conductive material located between the dielectric material and the flexible display; and a wireless communication circuit disposed within the first housing or the second housing, wherein the fourth edge may include a first conductive portion, a first non-conductive portion, a second conductive portion, a second non-conductive portion, and a third conductive portion, the conductive member may include a first split portion and a second split portion corresponding to the first non-conductive portion and the second non-conductive portion of the fourth edge of the second housing, respectively, and the wireless communication circuit may be configured to transmit and/or receive a radio signal using at least one of the first conductive portion, the second conductive portion, or the third conductive portion of the second housing.

30 Claims, 55 Drawing Sheets

(56) References Cited

U.S. PATENT DOCUMENTS

| | | |
|---|---|---|
| 10,222,838 B2 | 3/2019 | Kim et al. |
| 10,826,159 B2 | 11/2020 | Kim et al. |
| 11,114,744 B2 | 9/2021 | Park et al. |
| 11,211,961 B2 | 12/2021 | Noh et al. |
| 11,973,263 B2 | 4/2024 | Seo et al. |
| 2012/0050938 A1 | 3/2012 | Dabov et al. |
| 2013/0207854 A1 | 8/2013 | Ryu |
| 2016/0234362 A1 | 8/2016 | Moon et al. |
| 2017/0244153 A1* | 8/2017 | Chen ........................ H01Q 13/10 |
| 2018/0288203 A1 | 10/2018 | Jeon et al. |
| 2019/0020102 A1* | 1/2019 | Jarvis ...................... H01Q 1/521 |
| 2020/0194905 A1* | 6/2020 | Wei ........................ A61B 5/0006 |
| 2021/0075459 A1 | 3/2021 | Noh et al. |
| 2021/0384630 A1 | 12/2021 | Kim et al. |

FOREIGN PATENT DOCUMENTS

| | | |
|---|---|---|
| KR | 20140028451 A | 3/2014 |
| KR | 101521658 B1 | 5/2015 |
| KR | 10-2017-0056246 A | 5/2017 |
| KR | 20170056246 A | 5/2017 |
| KR | 101927142 B1 | 12/2018 |
| KR | 101978204 B1 | 5/2019 |
| KR | 20190053017 A | 5/2019 |
| KR | 102019122 B1 | 9/2019 |
| KR | 10-2020-0101218 A | 8/2020 |
| KR | 20200101218 A | 8/2020 |
| KR | 10-2021-0031309 A | 3/2021 |
| KR | 20210031309 A | 3/2021 |
| KR | 10-2556813 B1 | 7/2023 |
| WO | 2021/125518 | 6/2021 |

OTHER PUBLICATIONS

International Search Report for PCT/KR2022/011478 mailed Nov. 16, 2022, 7 pages.

Written Opinion of the ISA for PCT/KR2022/011478 mailed Nov. 16, 2022, 3 pages.

* cited by examiner

ELECTRONIC DEVICE COMPRISING ANTENNA

CROSS-REFERENCE TO RELATED APPLICATIONS

This application is a continuation of International Application No. PCT/KR2022/011478 designating the United States, filed on Aug. 3, 2022, in the Korean Intellectual Property Receiving Office and claiming priority to Korean Patent Application No. 10-2021-0105677, filed on Aug. 10, 2021, in the Korean Intellectual Property Office, and to Korean Patent Application No. 10-2021-0180895, filed on Dec. 16, 2021, in the Korean Intellectual Property Office, the disclosures of all of which are incorporated by reference herein in their entireties.

BACKGROUND

Field

The disclosure relates to an electronic device including an antenna.

Description of Related Art

An electronic device may include a display to provide visual information.

At least a portion of the housing defining the outer periphery of the electronic device may be formed of a metal frame, and. the wireless communication circuit may perform wireless communication by feeding power to at least a portion of the metal frame.

Meanwhile, in addition to a bar-type electronic device, various types of electronic devices such as a foldable electronic device and a rollable electronic device have been released. An elastic foldable display may be disposed in the foldable display or the rollable electronic device.

A conductive member may be provided at a position adjacent to the display in order to prevent/reduce performance degradation of the display due to electrostatic discharge.

A conductive member may be disposed at a position adjacent to the display in order to prevent/reduce performance degradation of the display due to electrostatic discharge. In this case, an antenna using at least a portion of a metal frame as an antenna radiator may be deteriorated in antenna radiation performance due to interference between the conductive member and at least a portion of the metal frame used as the antenna radiator.

SUMMARY

Embodiments of the disclosure may provide an electronic device that may include a split portion in the conductive member provided adjacent to the display in order to prevent/reduce performance degradation of the display due to electrostatic discharge.

An electronic device according to an example embodiment may include: a first housing including a first edge oriented in a first direction and a second edge oriented in a second direction perpendicular to the first direction; a second housing rotatably connected to the first housing to be rotatable relative to the first housing, wherein the second housing includes a third edge corresponding to the first edge and a fourth edge corresponding to the second edge when the first housing and the second housing face each other; a flexible display defining a front surface of the electronic device and disposed over the first housing and the second housing; a dielectric material at least partially disposed between the flexible display and the fourth edge of the second housing and at least partially surrounding a perimeter of the flexible display; a conductive member comprising a conductive material located between the dielectric material and the flexible display; and a wireless communication circuit disposed within the first housing or the second housing, wherein the fourth edge may include a first conductive portion, a first non-conductive portion, a second conductive portion, a second non-conductive portion, and a third conductive portion, the conductive member may be provided with a first split portion and a second split portion corresponding to the first non-conductive portion and the second non-conductive portion of the fourth edge of the second housing, respectively, and the wireless communication circuit may be configured to transmit and/or receive a radio signal using at least one of the first conductive portion, the second conductive portion, or the third conductive portion of the second housing.

An electronic device according to an example embodiment may include: a housing including a first edge oriented in a first direction and a second edge oriented in a second direction perpendicular to the first direction; a display defining a front surface of the electronic device; a dielectric material at least partially disposed between the display and the second edge of the housing and at least partially surrounding a perimeter of the display; a conductive member comprising a conductive material located between the dielectric material and the display; and a wireless communication circuit disposed within the housing, wherein the second edge may include a first conductive portion, a second conductive portion, and a first non-conductive portion disposed between the first conductive portion and the second conductive portion, the conductive member may be provided with a first split portion corresponding to the first non-conductive portion of the second edge of the housing, and the wireless communication circuit may be configured to transmit and/or receive a radio signal using at least one of the first conductive portion and the second conductive portion of the housing.

According to various example embodiments of the disclosure, an electronic device is provided with a split portion in a conductive member at a position adjacent to a display in order to prevent/reduce performance deterioration of the display due to electrostatic discharge. As a result, it is possible to suppress deterioration of antenna radiation performance.

According to various example embodiments of the disclosure, an electronic device is provided with a protrusion on at least a portion of a conductive member disposed at a position adjacent to a display. As a result, it is possible to protect the display from electrostatic discharge.

In addition, various effects that may be directly or indirectly appreciated through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings. However, it shall be understood that it is not intended to limit the disclosure to specific embodiments, and that the disclosure includes various modifications, equivalents, or alternatives of the embodiments of the disclosure.

Figure 1:
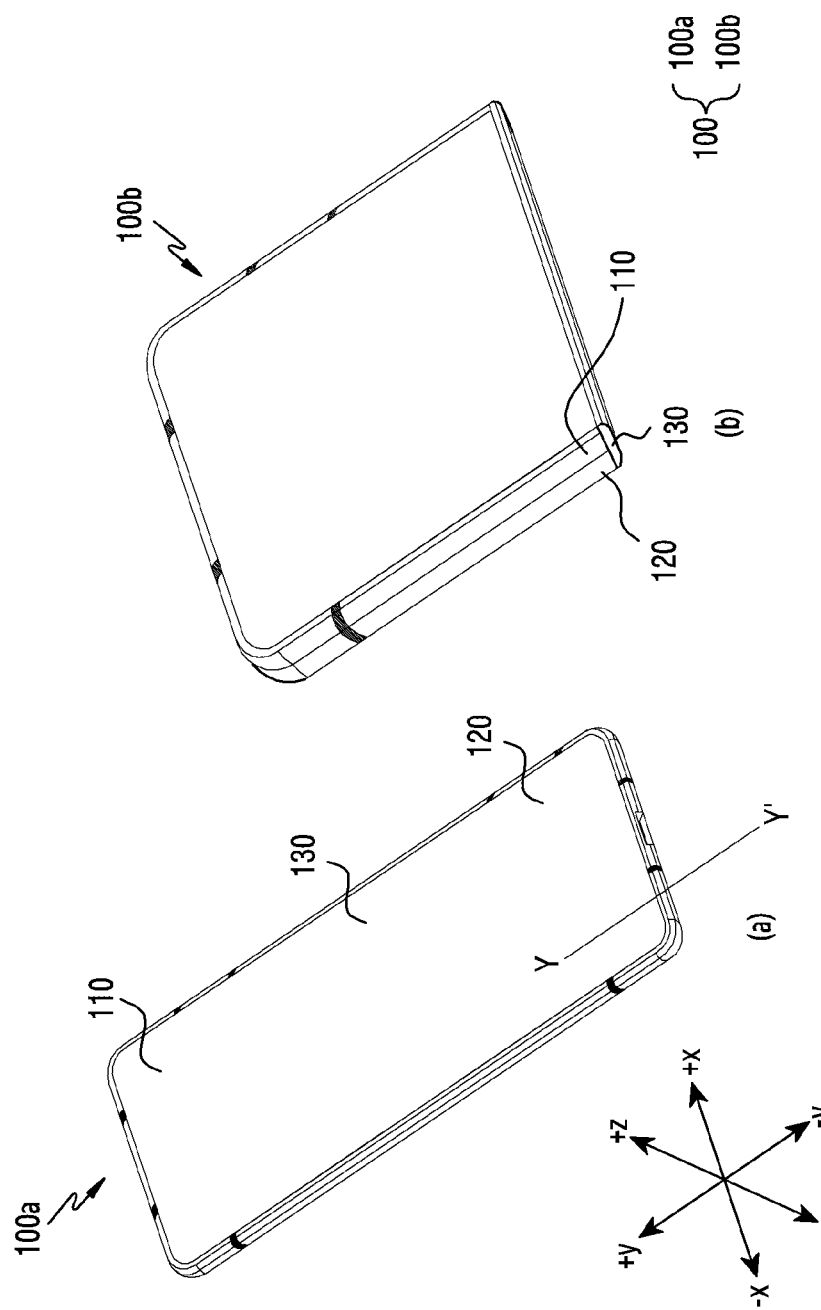
FIG. 1 is a perspective view of an electronic device according to various embodiments.

FIG. 1 is a perspective view of an example electronic device 100 according to various embodiments.

Referring to FIG. 1, the electronic device 100 may include a first housing 110, a second housing 120, a connecting member 103, and/or a display 140.

According to an embodiment, the first housing 110 and the second housing 120 may be coupled to each other via a connecting member 130 to be rotatable about a first axis (e.g., the +x-axis in FIG. 1) oriented in a first direction (e.g., the x-axis direction in FIG. 1) with respect to the first housing 110. In an example, the first housing 110 and the second housing 120 are illustrated with respect to a structure that is foldable about the +x-axis direction or the −x-axis direction (or the "horizontal direction"), but is not limited thereto. According to an embodiment, the first housing 110 and the second housing 120 may be foldable about the +y-axis direction or the −y-axis direction (or the "vertical direction").

According to an embodiment, the rear surfaces of the first housing 110 and the second housing 120 (e.g., the surface located in the −z axis direction in the first housing 110) may be covered with a rear cover (not illustrated). In an example, at least a portion of the rear cover may be formed of a non-conductive material.

According to an embodiment, on the front surface of the electronic device 100, a display 140 may be disposed over the first housing 110 and the second housing 120. In an example, the display 140 may occupy most of the front surface of the electronic device 100.

According to an embodiment, the display 140 may include a flexible display. In an example, when the electronic device 100 is in a folded state, the display 140 may be flexibly bent depending on an angle formed between the first housing 110 and the second housing 120.

According to an embodiment, the first housing 110 may include a first edge 110a extending in a second direction (e.g., the +y-axis direction in FIG. 1) and a second edge 110b extending in a first direction (e.g., the +x-axis direction in FIG. 1) perpendicular to the second direction (e.g., the +y-axis direction in FIG. 1).

According to an embodiment, when the first housing 110 and the second housing 120 face each other (or when the electronic device 100 is in the folded state) (e.g., 100b of FIG. 1), a third edge 120a corresponding to the first edge 110a and a fourth edge 120b corresponding to the second edge 110b may be included.

According to an embodiment, the electronic device 100 may be replaced with a bar-type electronic device. In an example, the bar-type electronic device may include a housing in which the first housing 110 and the second housing 120 are integrally configured without including a connecting member. Accordingly, the following description of the second housing 120 may be understood as being substantially the same as a description of a housing of a bar-type electronic device.

Figure 2A:
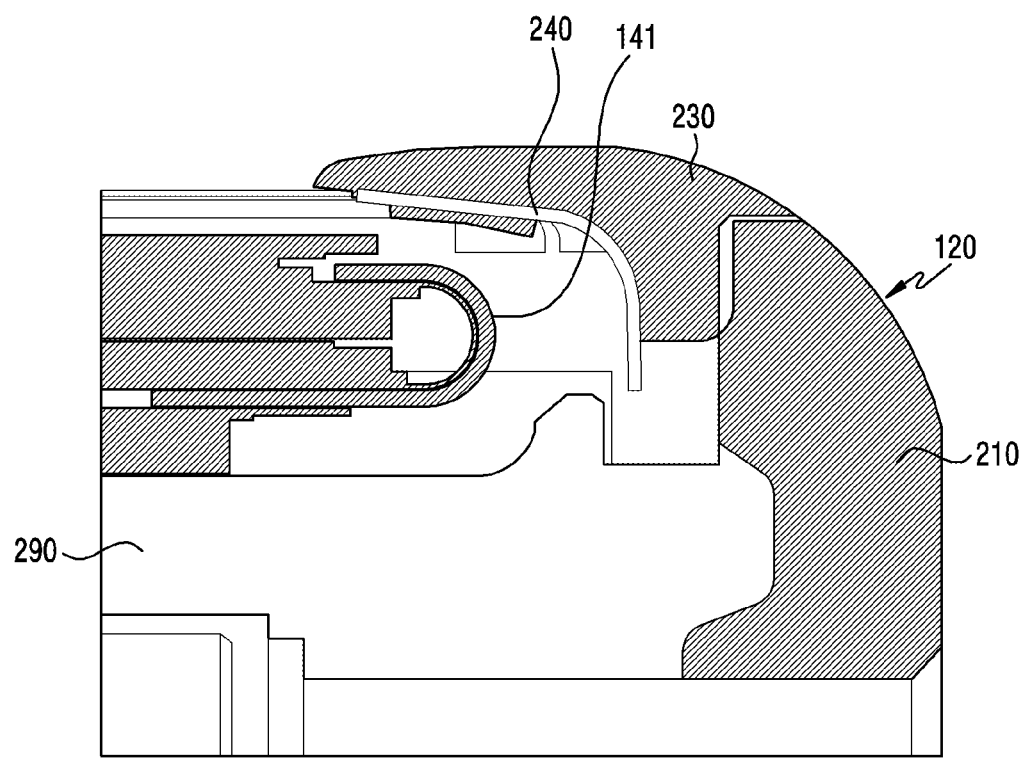
FIG. 2A is a cross-sectional view taken along Y-Y' in a second housing of FIG. 1 according to various embodiments.

FIG. 2A is a cross-sectional view taken along line Y-Y' of FIG. 1 in the second housing 120 according to various embodiments.

Referring to FIG. 2A, the second housing 120 according to an embodiment may include conductive portions 210 included in the fourth edge 120b (e.g., refer to FIG. 2B) and a dielectric material 230 disposed between the fourth edge 120b and a bent portion 141. According to an embodiment, when the electronic device 100 is a bar-type electronic device, the second housing 120 may correspond to the housing of the bar-type electronic device. In another example, the description of the second housing 120 may be substantially applicable to the first housing 110 as it is. For example, the dielectric material 230 may be disposed between the second edge 110b and the bent 141 in the first housing 110.

According to an embodiment, a portion of the second housing 120 may include an injection-molded part 290 formed adjacent to the conductive portions 210. The injection-molded part 290 according to an embodiment may be formed of a non-conductive material. According to an embodiment, the injection-molded part 290 may be formed of a dielectric material having a predetermined dielectric constant.

According to an embodiment, a conductive member (or a conductive portion) 240 may be disposed between the dielectric material 230 and the bent portion 141. In an example, at least a portion of the conductive member 240 may be disposed on the dielectric material 230 such that one surface of the conductive member 240 faces the inside of the second housing 120.

According to an embodiment, the conductive member 240 may include a conductive adhesive tape or an FPCB including a conductive portion. In an example, the conductive member 240 may be a tape including a flexible (soft) conductive adhesive layer.

According to an embodiment, a display circuit unit (display driver IC (DDI)) may be disposed below (e.g., in the −z axis direction) of the bent portion 141 or the display (e.g., the display 140 in FIG. 1). In an example, the display circuit unit may include a plurality of circuits and elements for driving the display.

According to an embodiment, the conductive member 240 may protect the display circuit unit from electrostatic discharge. In an example, the conductive member 240 may provide a discharge path that transfers discharge occurring near the dielectric material 230 to the conductive portions 210 to prevent/reduce performance degradation of the display circuit unit.

Figure 2B:
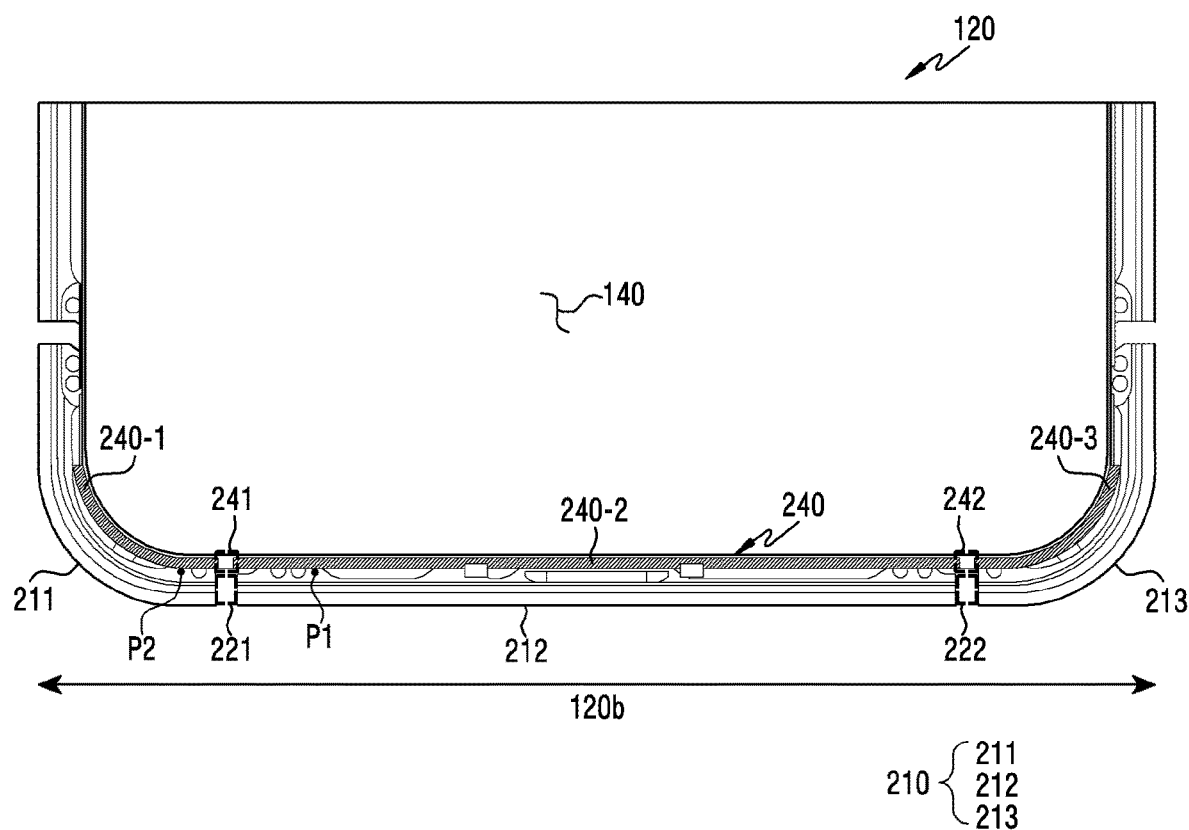
FIG. 2B is a diagram illustrating a portion of the front surface of the second housing according to various embodiments.

FIG. 2B is a diagram illustrating a portion of the front surface of the second housing 120 according to various embodiments.

Referring to FIG. 2B, the fourth edge 120b of the second housing 120 may include a first conductive portion 211, a first non-conductive portion 221, a second conductive portion 212, a second non-conductive portion. 222, and/or a third conductive portion 213. Meanwhile, in the following description, a conductive portion may be replaceably understood as a conductive unit or a conductive region, and a non-conductive portion may be replaceably understood as a non-conductive unit or a split portion.

According to an embodiment, the first conductive portion 211, the second conductive portion 212, or the third conductive portion 213 may include a metallic material. In an example, the first conductive portion 211, the second conductive portion 212, and the third conductive portion 213 may correspond to at least a portion of a metal housing.

According to an embodiment, the first non-conductive portion 221 or the second non-conductive portion 222 may be formed of a dielectric material having a predetermined dielectric constant. In an example, the first non-conductive portion 221 and the second non-conductive portion 222 may be filled with a dielectric material.

According to an embodiment, by feeding power to a first feeding point P1 and/or a second feeding point P2, the wireless communication circuit (not illustrated) disposed within the first housing 110 or the second housing 120 may transmit/receive a radio signal using at least one of the first conductive portion 211 or the second conductive portion 212. In an example, a wireless communication circuit disposed on a printed circuit board within the second housing 120 may transmit and/or receive a radio signal by feeding power to at least one of the first conductive portion 211, the second conductive portion 212, or the third conductive portion.

According to an embodiment, the conductive member 240 may be disposed to be electrically separated from the first conductive portion 211, the second conductive portion 212, or the third conductive portion 213.

According to an embodiment, the conductive member 240 may include a first conductive member portion 240-1, a first split portion 241, a second conductive member portion 240-2, a second split portion 242, and/or a third conductive member portion 240-3.

According to an embodiment, the first conductive member portion 240-1, the second conductive member portion 240-2, and the third conductive member portion 240-3 may include a conductive material. In an example, the first conductive member portion 240-1, the second conductive member portion 240-2, and the third conductive member portion 240-3 may be formed of a conductive tape.

According to an embodiment, the first split portion 241 and the second split portion 242 may include a non-conductive material. In an example, the first split portion 241 or the second split portion 242 may be filled with a dielectric material having a predetermined dielectric constant.

According to an embodiment, at least a portion of the first split portion 241 may be disposed to correspond to the first non-conductive portion 221. As another example, at least a portion of the second split portion 242 may be disposed to correspond to the second non-conductive portion 222. In an example, the first split portion 241 may be provided at a point of the conductive member 240 to face the first non-conductive portion 221, and the second split portion 242 may be provided at another point of the conductive member 240 to face the second non-conductive portion 222.

According to an embodiment, when only one of the first non-conductive portion 221 or the second non-conductive portion 222 is provided, of the first split portion 241 or the second split portion 242, only one corresponding to one of the portion 221 or the second non-conductive portion 222 may be provided. For example, when the fourth edge 120b is provided with the first non-conductive portion 221 without being provided with the second non-conductive portion 222, the conductive member 240 may be provided with the first split portion 241 without being provided with the second split portion 242. As another example, when the fourth edge 120b is provided with the second non-conductive portion 222 without being provided with the first non-conductive portion 221, the conductive member 240 may be provided with the second split portion 242 without being provided with the first split portion 241.

Figure 3:
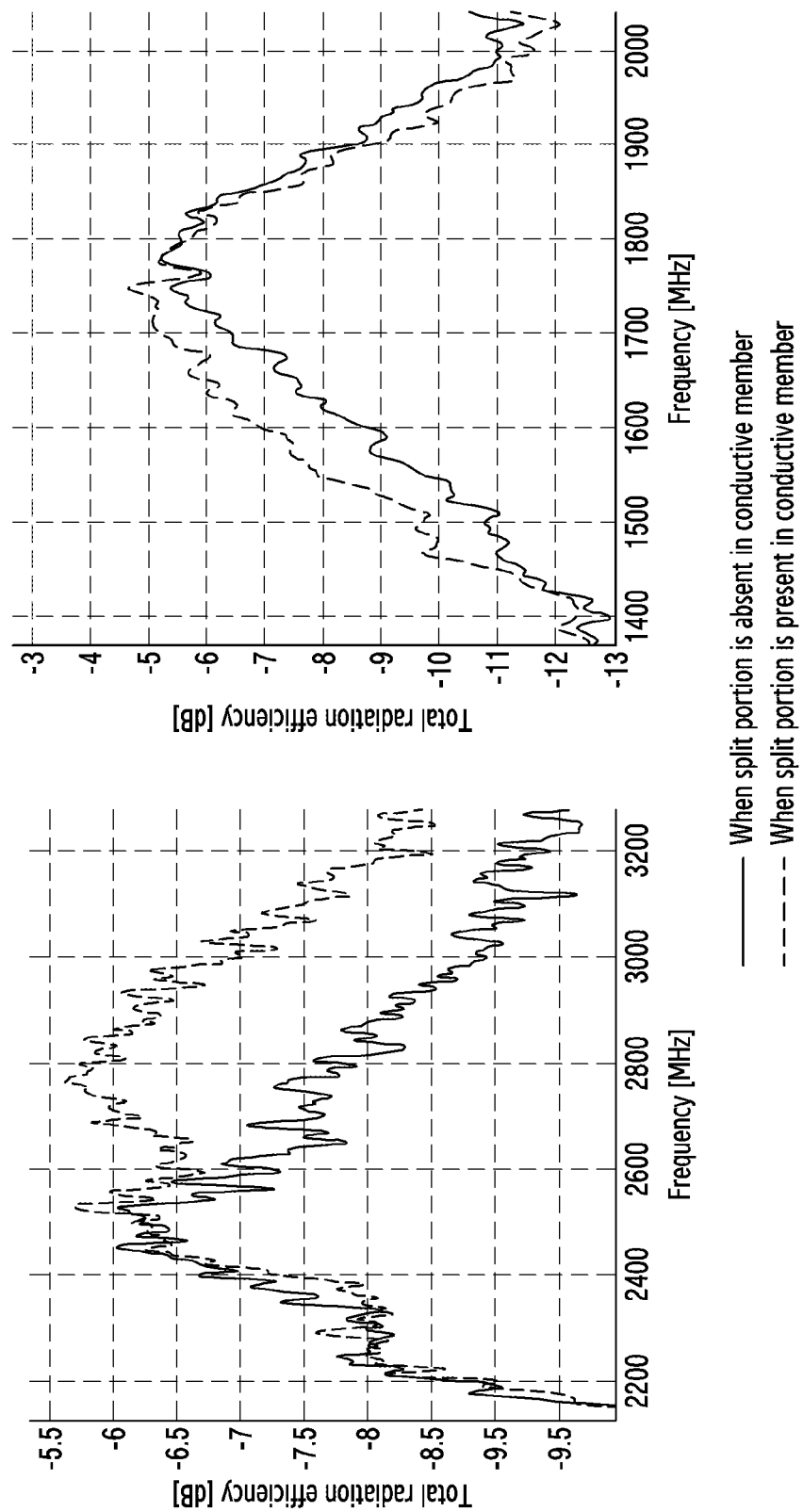
FIG. 3 includes graphs each showing the total radiation efficiency of an electronic device according to whether the split portions are provided in the conductive member according to various embodiments.

FIG. 3 includes graphs each showing the total radiation efficiency of an electronic device 100 according to whether the split portions 241 and 242 are provided in the conductive member 240 according to various embodiments.

Referring to FIG. 3, when the split portions 241 and 242 are provided on the conductive member 240, due to the shifting of parasitic resonance, the radiation efficiency in a predetermined band may be improved (or deterioration of the total radiation efficiency is suppressed) compared to the case in which the split portions 241 and 242 are not provided in the conductive portion.

According to an embodiment, the first conductive portion 211 may operate as an antenna radiator in a high-frequency band (e.g., about 2.2 GHz to about 3.2 GHz (a high band)), and the second conductive portion 212 may operate as an antenna radiator in an intermediate frequency band (e.g., a frequency band of about 1.4 GHz to about 2 GHz (a mid-band)). However, the disclosure is not limited to the case in which only a portion of any of the first conductive portion 211, the second conductive portion 212, or the third conductive portion 213 operates as an antenna radiator. In an example, the first conductive portion 211, the second conductive portion 212, and the third conductive portion 213 may each receive power from the wireless communication circuit and operate as an antenna radiator in a predetermined frequency band. For example, the third conductive portion 213 may receive power from the wireless communication circuit and operate as an antenna radiator in a designated frequency band.

According to an embodiment, when the split portions 241 and 242 are provided in the conductive member 240, the total antenna radiation efficiency via the first conductive portion 211 or the second conductive portion 212 may be improved in the frequency band of about 2.5 GHz to about 2.5 GHz compared to the case in which the split portions 241 and 242 are not provided in the conductive member 240. In an example, when the split portions 241 and 242 are provided in the conductive member 240, due to the shift of parasitic resonance, the antenna radiation efficiency may be improved (or the deterioration of the total radiation efficiency is suppressed) in the frequency band of about 2 GHz or more. When the split portions 241 and 242 are provided in the conductive member 240, the total antenna radiation efficiency via the second conductive portion 212 or the third conductive portion 213 may be improved in the frequency band of about 1.4 GHz to about 1.8 GHz compared to the case in which the split portions 241 and 242 are not provided in the conductive member 240. In an example, when the split portions 241 and 242 are provided in the conductive member 240, due to the shift of parasitic resonance, the antenna radiation efficiency may be improved in the frequency band of about 2 GHz or less.

Figure 4A:
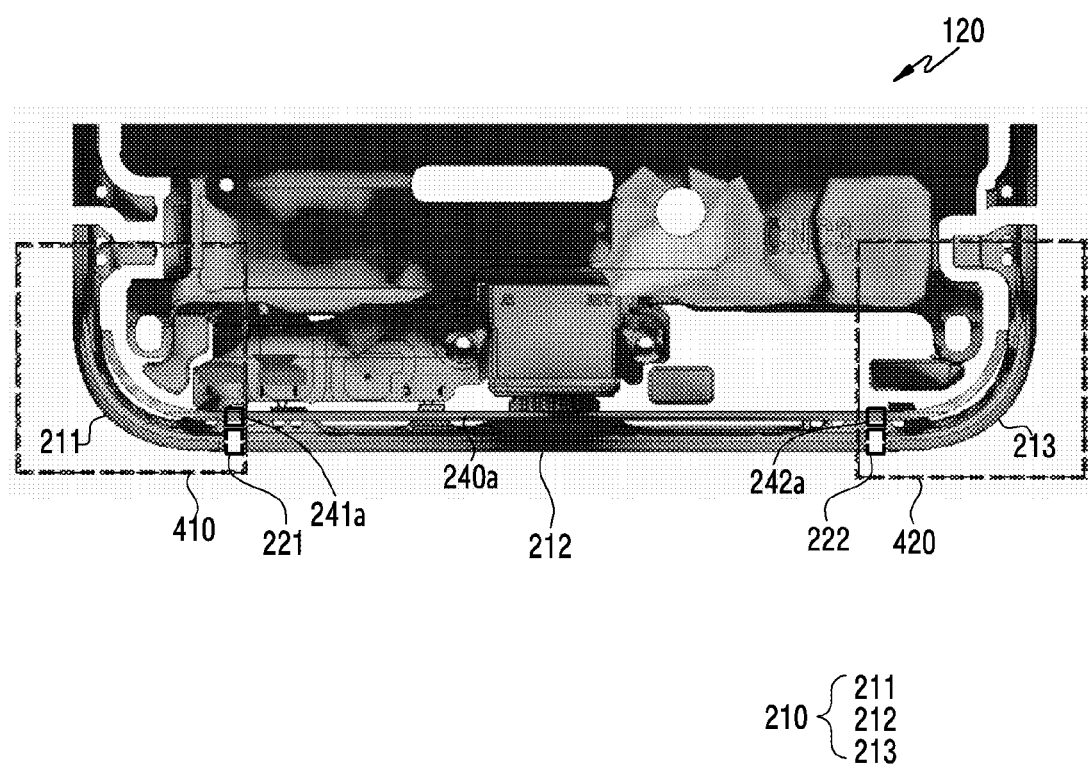
FIG. 4A is a diagram illustrating an electric field distribution formed in the second housing when the conductive member in which split portions are absent is provided according to various embodiments.
Figure 4B:
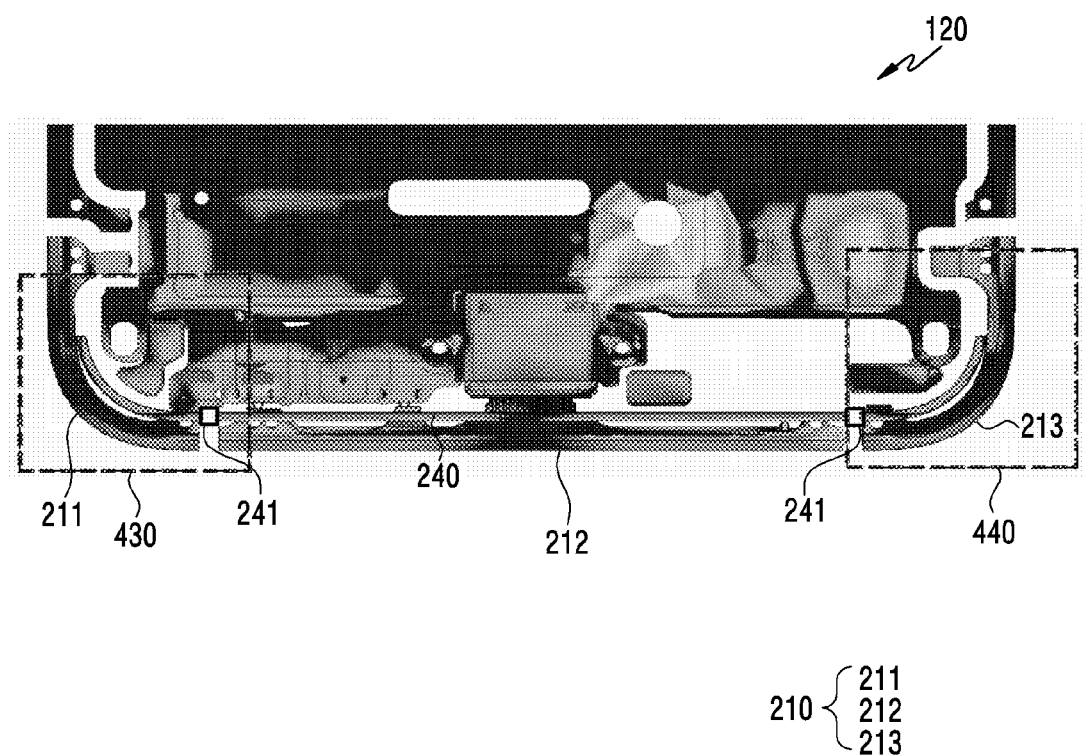
FIG. 4B is a diagram illustrating an electric field distribution formed in the second housing when the conductive member in which split portions are present is provided according to various embodiments.

FIG. 4A is a diagram illustrating an electric field distribution formed in the second housing 120 when the conductive member 240a in which split portions are absent is provided. In an example, the conductive member 240a in which split portions are absent may include a first conductive portion 241a and a second conductive portion 242a. FIG. 4B is a diagram illustrating an electric field distribution formed in the second housing when the conductive member 240 in which split portions are present is provided according to various embodiments. In an example, the conductive member 240 in which the split portions are present may include a first split portion 241 and a second split portion 242.

Referring to FIGS. 4A and 4B, when the split portions are not provided in the conductive member 240, the electric fields of the conductive portions 210 are coupled to the conductive member 240 so that an electric field is also capable of being formed in the conductive member 240. In an example, when an electric field is also formed in the conductive member 240, the antenna radiation performance through the conductive portions 210 may be deteriorated.

According to an embodiment, when the conductive member 240a in which split portions are absent is disposed in the second housing 120, the same electric field distribution as those in the first region 410 and the second region 420 may be formed. The conductive member 240a may include a first conductive portion 241a and a second conductive portion 242a without including a non-conductive portion. In an example, when the conductive member 240a in which split portions are absent is disposed in the second housing 120, an electric field is also formed in the conductive member 240a, so that parasitic resonance may occur, which may cause the antenna radiation performance of the electronic device 100 to be deteriorated.

According to an embodiment, when the conductive member 240 in which the split portions 241 and 242 are present is disposed in the second housing 120, the same electric field distribution as those in the third region 430 and the fourth region 440 may be formed. In an example, compared to the case in which the conductive member 240a in which split portions are absent is disposed in the second housing 120, when the conductive member 240 in which split portions are present is disposed in the second housing 120, since the amount of coupling to the conductive member 240 is reduced, parasitic resonance may be weakened or eliminated.

Figure 5:
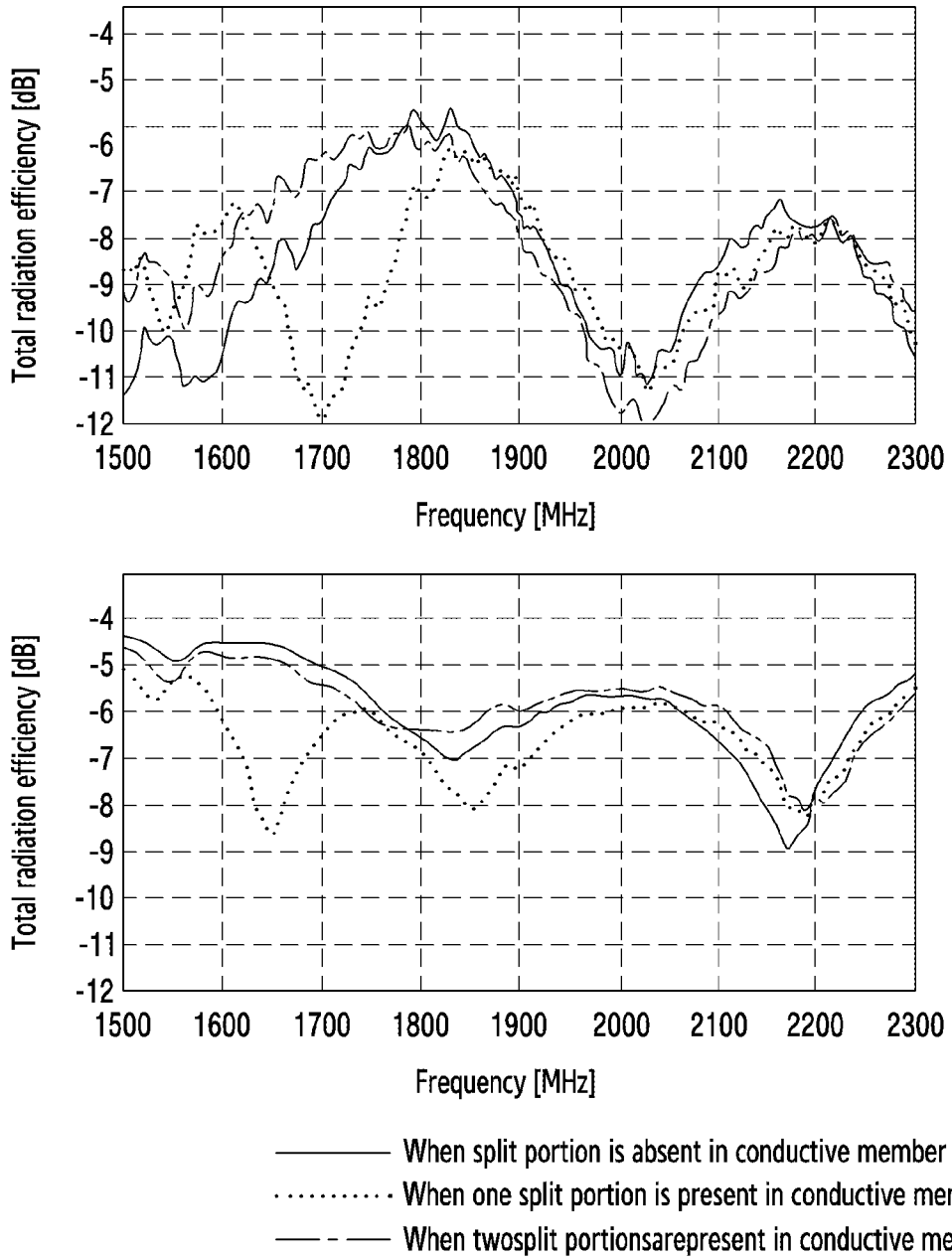
FIG. 5 includes graphs each showing the total radiation efficiency of an electronic device according to the number of split portions provided in the conductive member according to various embodiments.

FIG. 5 includes graphs each showing the total radiation efficiency of the electronic device 100 according to the number of split portions provided in the conductive member 240 according to various embodiments.

Referring to FIG. 5, the total radiation efficiency of the electronic device 100 may vary depending on the number of split portions provided in the conductive member 240.

According to an embodiment, when one split portion (e.g., the first split portion 241 or the second split portion 242) is provided in the conductive member 240, the total radiation efficiency of the electronic device 100 may be improved in the frequency band of about 1.65 GHz to about 2.3 GHz compared to the case in which split portions are absent in the conductive member 240.

According to an embodiment, when only one split portion is present in the conductive member 240, parasitic resonance occurs in the frequency band of about 1.6 GHz to about 1.7 GHz, and thus the total radiation efficiency of the electronic device 100 may be reduced (or deteriorated). However, it is possible to make a change by adjusting the electric length of the conductive member 240 such that the parasitic resonance shifts away from the resonance frequency band.

Figure 6:
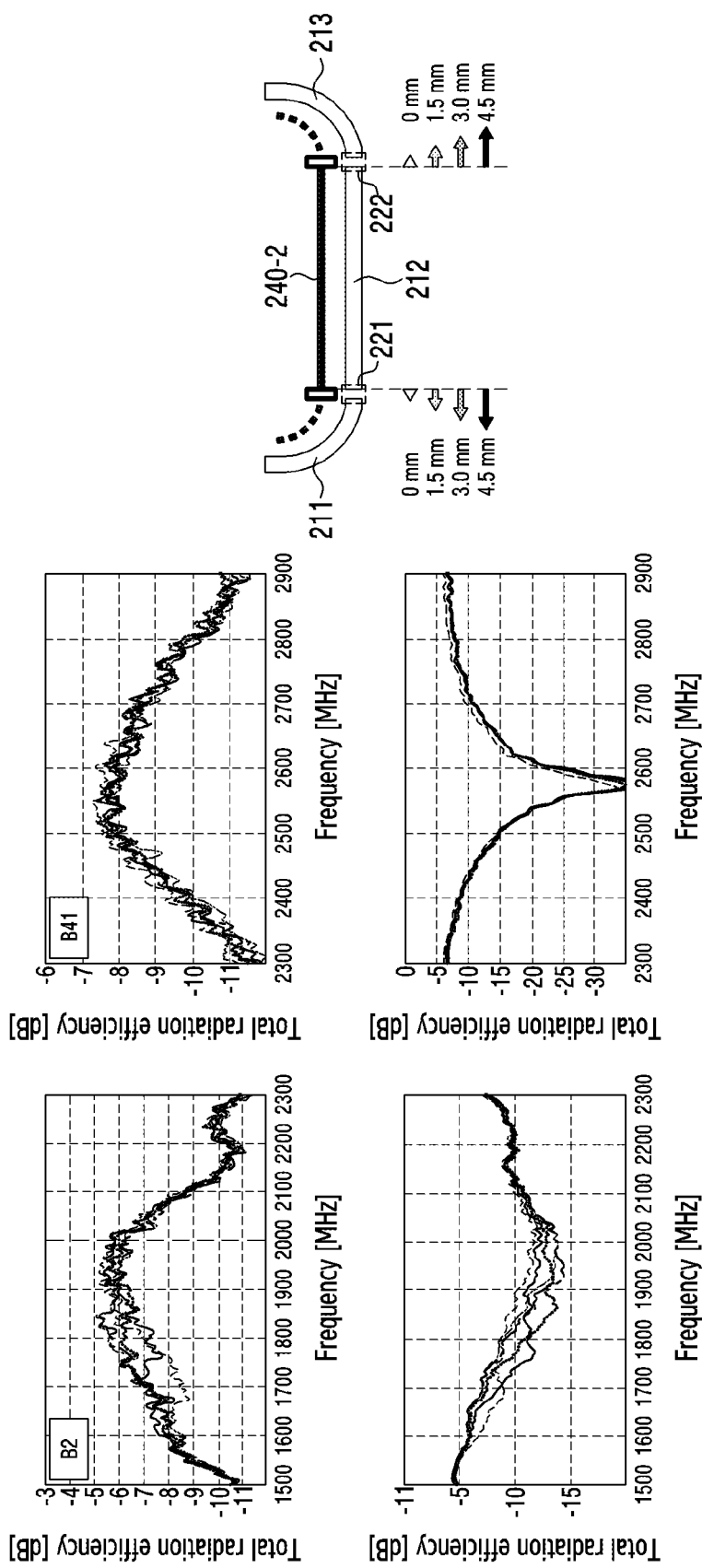
FIG. 6 includes graphs each showing the total radiation efficiency of the electronic device when the length of the conductive member is changed according to various embodiments FIG. 7 includes graphs each showing the total radiation efficiency of an electronic device depending on whether split portions provided in a conductive member and non-conductive portions provided in the conductive member are aligned according to various embodiments FIG. 8A includes graphs each showing the total radiation efficiency of an electronic device depending on lengths of split portions included in a conductive member according to various embodiments.

FIG. 6 includes graphs each showing the total radiation efficiency of the electronic device 100 when the length of the conductive member 240 is changed according to various embodiments.

Referring to FIG. 6, when the length of the conductive member 240 increases by a predetermined value or more with reference the length of the second conductive portion 212, the region in which the first split portion 241 and the second split portion 242 overlap each other increases. As a result, since the frequency of parasitic resonance shifts from a frequency band of about 1.9 GHz to a frequency band of about 1.6 GHz, the parasitic resonance may act as a parasitic component which may cause the total radiation performance to be deteriorated in a predetermined band.

According to an embodiment, compared to the case in which the length of the conductive member 240 is the same as the length of the second conductive portion 212, when the length of the second conductive member portion 240-2 is longer than that of the second conductive portion 212 by about 3.0 mm, parasitic resonance may occur in the frequency band of about 1 GHz to about 2 GHz, which may cause the total antenna radiation performance to be deteriorated. In another example, even when the length of the conductive member 240 becomes longer than the length of the second conductive portion 212, the total radiation efficiency of the electronic device 100 may not be significantly affected in the frequency band of about 2 GHz or higher.

Figure 7:
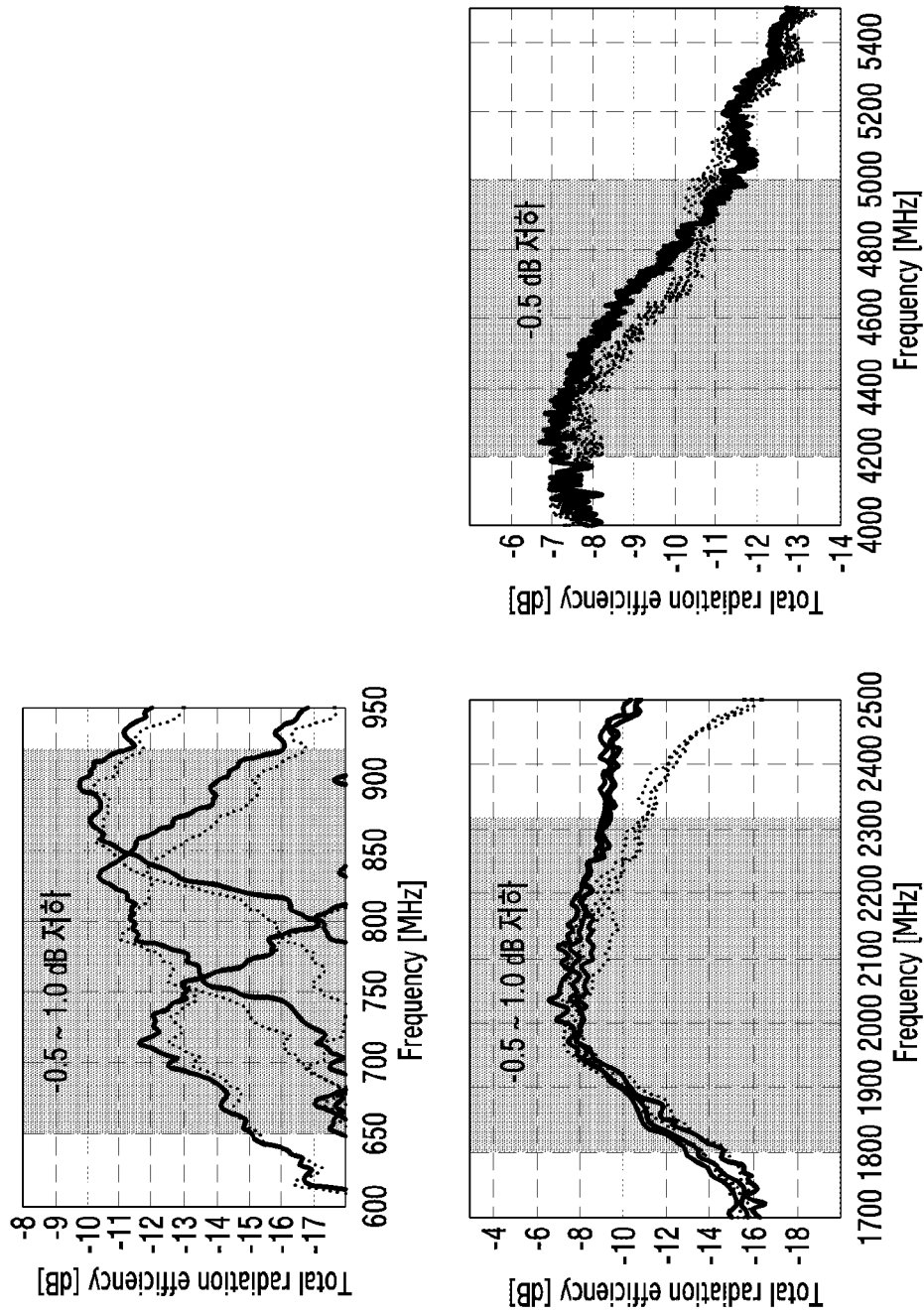

FIG. 7 includes graphs each showing a total antenna radiation efficiency depending on whether the split portions 241 and 242 provided in the conductive member 240 according to various embodiments and the non-conductive portions 221 and 222 provided in the second housing 120 are aligned.

Referring to FIG. 7, the total antenna radiation efficiency in a predetermined band may vary depending on whether the first split portion 241 and the first non-conductive portion 221 are aligned and whether the second split portion 242 and the second non-conductive portion 222 are aligned.

According to an embodiment, when the first split portion 241 and the first non-conductive portion 221 are not aligned or the second split portion 242 and the second non-conductive portion 222 are not aligned, the total antenna radiation performance may be deteriorated in the frequency band of about 600 MHz to about 950 MHz, a frequency band of about 1.7 GHz to about 2.5 GHz, or a frequency band of about 4 GHz to about 5.4 GHz. In an example, when the first split portion 241 and the first non-conductive portion 221 are not aligned or the second split portion 242 and the second non-conductive portion 222 are not aligned, the total radiation efficiency may decrease by about 0.5 dB to about 1.0 dB in the frequency band of about 600 MHz to about 950 MHz. In addition, when the first split portion 241 and the first non-conductive portion 221 are not aligned or the second split portion 242 and the second non-conductive portion 222 are not aligned, the total radiation efficiency may decrease by about 0.5 dB to about 1.0 dB in the frequency band of about 1.7 GHz to about 2.5 GHz. Furthermore, when the first split portion 241 and the first non-conductive portion 221 are not aligned or the second split portion 242 and the second non-conductive portion 222 are not aligned, the total radiation efficiency may decrease by about 0.5 dB in the frequency band of about 4 GHz to about 5.4 GHz.

Figure 8A:
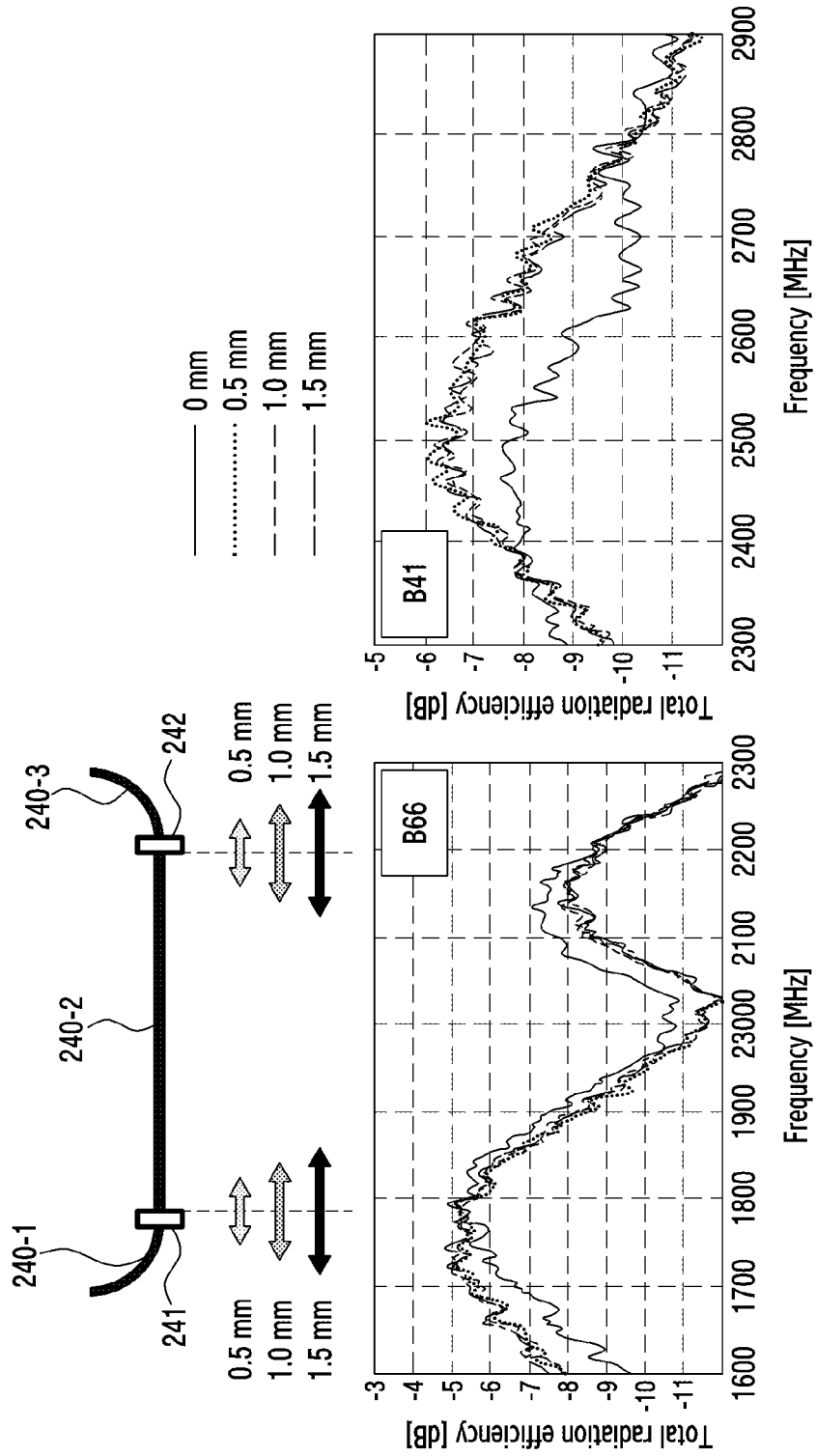
FIG. 8B includes graphs each showing the total radiation efficiency of an electronic device according to an overlapping degree between a split portion of a conductive member and a non-conductive portion of a housing according to various embodiments.
Figure 8B:
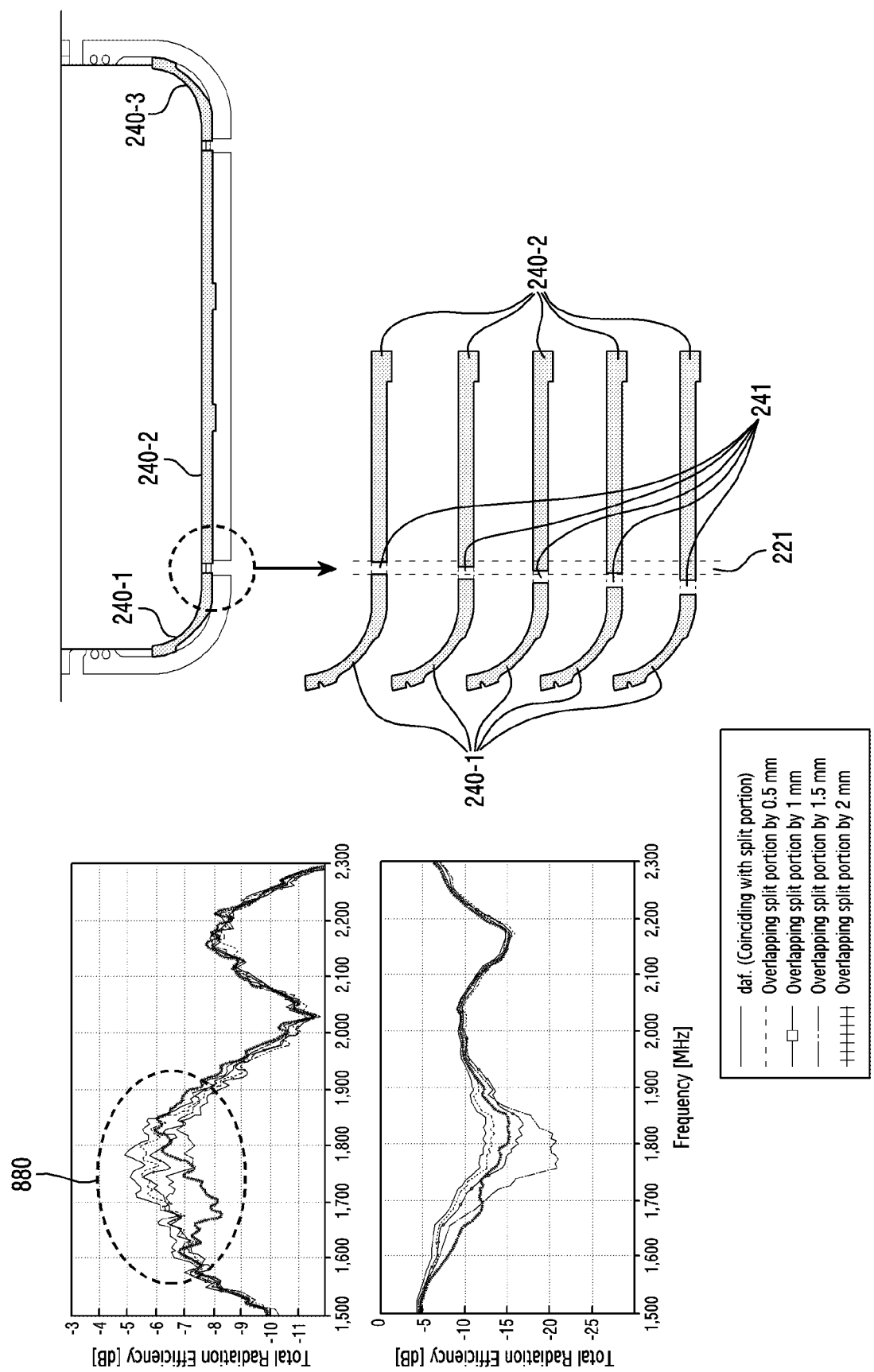

FIG. 8A includes graphs each showing the total radiation efficiency of the electronic device 100 according to the lengths/widths of the split portions 241 and 242 included in the conductive member 240 according to various embodiments. FIG. 8B includes graphs each showing the total radiation efficiency of the electronic device according to an overlapping degree between a split portion of a conductive member and a non-conductive portion of a housing according to various embodiments.

Referring to FIG. 8A, when the lengths of the split portions 241 and 242 included in the conductive member 240 have a value equal to or greater a predetermined value, the total radiation efficiency by the electronic device 100 may be improved.

According to an embodiment, when the lengths of the split portions 241 and 242 included in the conductive member 240 are about 0.5 mm or more, the total antenna radiation performance may be improved in the frequency band of about 1.6 GHz to about 1.8 GHz. In addition, when the lengths of the split portions 241 and 242 included in the conductive member 240 are about 0.5 mm or more, the total antenna radiation performance may be improved in the frequency band of about 2.4 GHz to about 2.7 GHz.

Referring to FIG. 8B, the conductive member 240 may be disposed such that the first split portion 241 included in the conductive member 240 at least partially overlaps the first non-conductive portion 221 of the housing 110 or 120.

According to an embodiment, when the conductive member 240 is disposed such that the first split portion 241 coincides with the first non-conductive portion 221 of the housing 110 or 120 to a certain degree or more, the total antenna radiation efficiency of the electronic device 100 may be improved.

For example, compared to the case in which the second conductive member portion 240-2 of the conductive member 240 overlaps the first non-conductive portion 221 by 0.5 mm, when the first split portion 241 of the conductive member 240 and the first non-conductive portion 221 of the housing 110 or 120 coincide with each other, the total antenna radiation efficiency may be improved in the frequency band of about 1.6 GHz to about 1.8 GHz.

In addition, compared to the case in which the second conductive member portion 240-2 of the conductive member 240 overlaps the first non-conductive portion 221 by 1.5 mm, when the second conductive member portion 240-2 of the conductive member 240 overlap the first non-conductive portion 221 by 0.5 mm, the total antenna radiation efficiency may be improved in the frequency band of about 1.6 GHz to about 1.8 GHz.

Figure 9A:
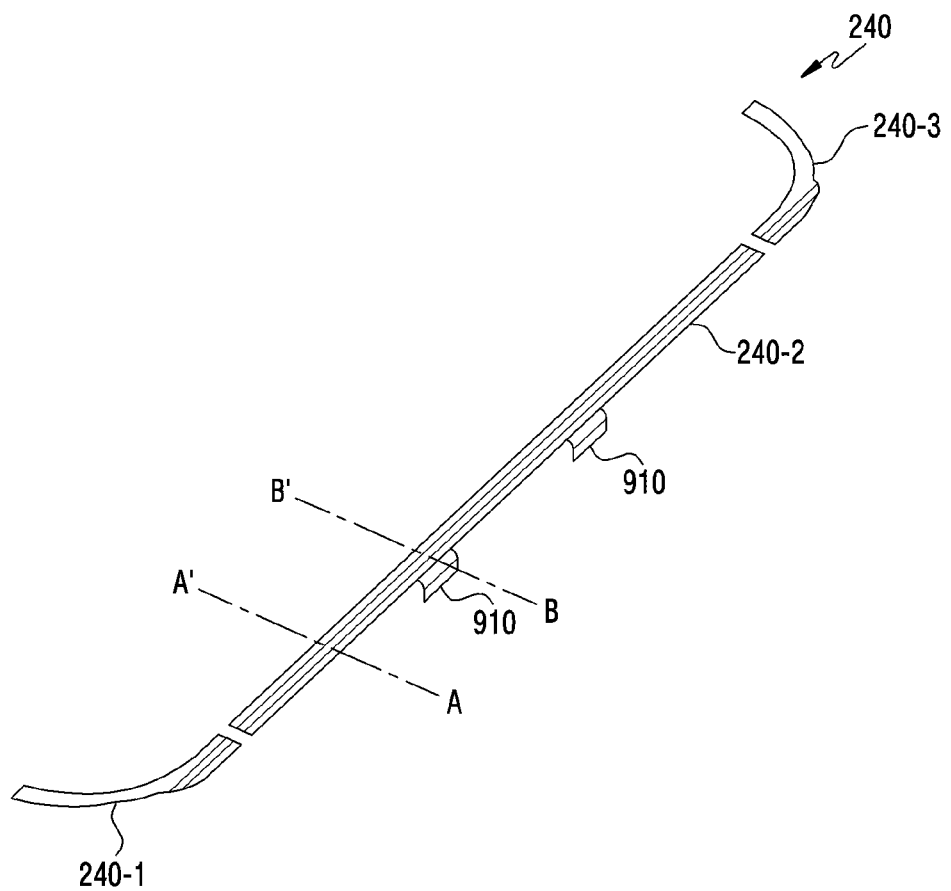
FIG. 9A is a diagram illustrating an example conductive member according to various embodiments.
Figure 9B:
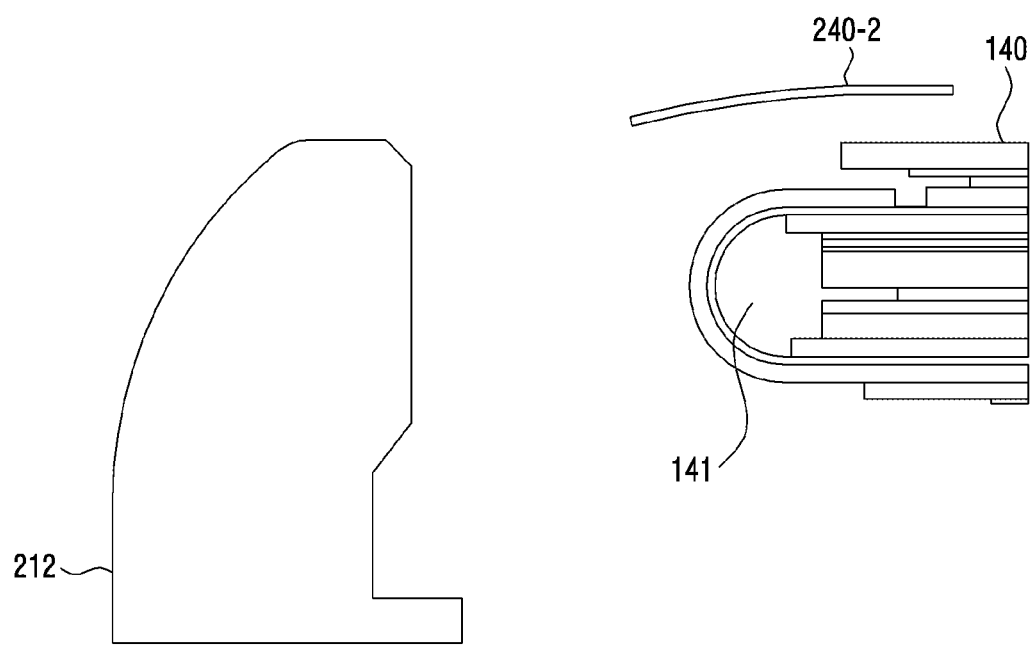
FIG. 9B is a cross-sectional view of a portion of the conductive member an electronic device taken along line A-A' of FIG. 9A according to various embodiments.
Figure 9C:
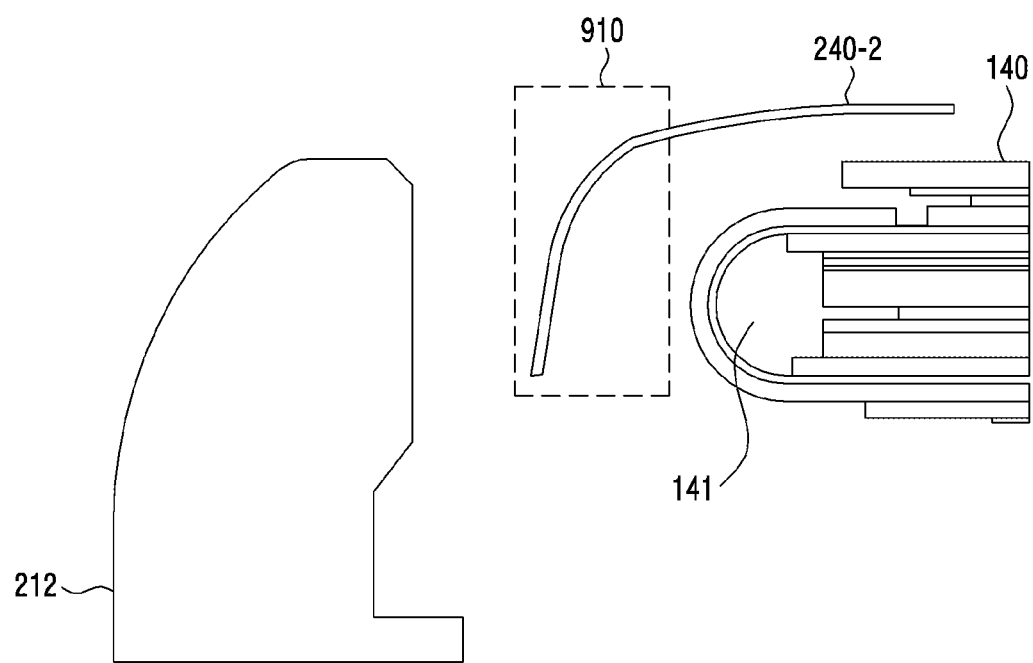
FIG. 9C is a cross-sectional view of the conductive member of a portion of the electronic device taken along line B-B' of FIG. 9A according to various embodiments.

FIG. 9A is a diagram illustrating a conductive member 240 according to various embodiments. FIG. 9B is a cross-sectional view of a portion of the electronic device 100 including the conductive member 240 taken along line A-A'. FIG. 9C illustrates a cross section of a portion of the electronic device 100 when the conductive member 240 according to the embodiment of FIG. 9A is cut along line B-B'.

Referring to FIGS. 9A, 9B, and 9C, the second conductive member portion 240-2 may include at least one first protrusion 910.

According to an embodiment, the second conductive member portion 240-2 may be spaced apart from the second conductive portion 212 by a predetermined distance in the region A-A'.

According to an embodiment, the first protrusion 910 included in the second conductive member portion 240-2 in the region B-B' may extend from the second conductive member portion 240-2 to at least partially face the second conductive portion 212. In an example, at least a portion of the first protrusion 910 may be disposed between the second conductive portion 212 and a display circuit unit.

According to an embodiment, the first protrusion 910 may provide a discharge path such that discharge occurring at a position adjacent to the second conductive member portion 240-2 flows to the second conductive portion 212. In an example, by being located closer to the second conductive portion 212 than other portions of the second conductive member portion 240-2, the first protrusion 910 may prevent/reduce electrostatic discharge more effectively.

Figure 10A:
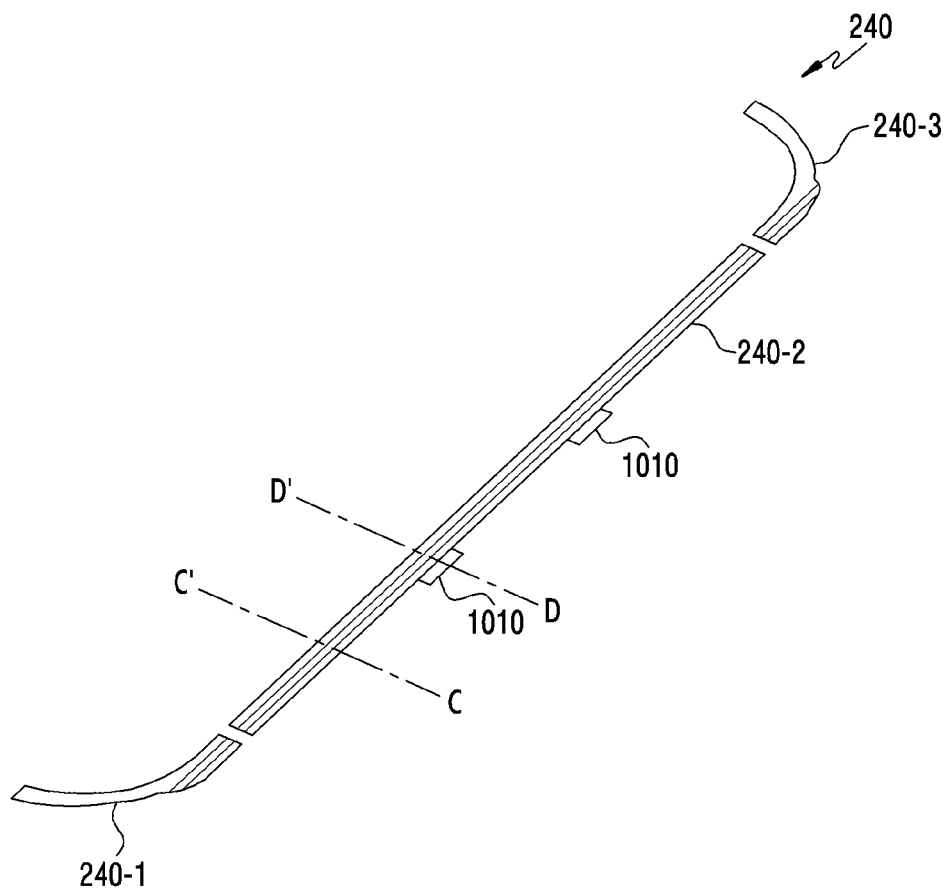
FIG. 10A is a diagram illustrating an example conductive member according to various embodiments.
Figure 10B:
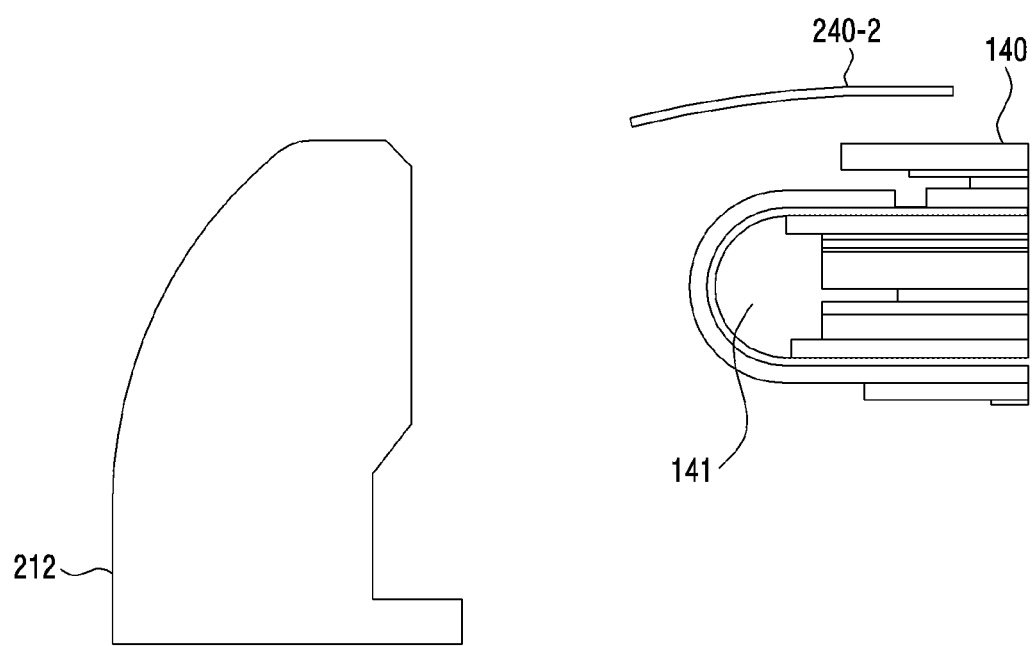
FIG. 10B is a cross-sectional view of the conductive member of a portion of the electronic device taken along line C-C' of FIG. 10A according to various embodiments.
Figure 10C:
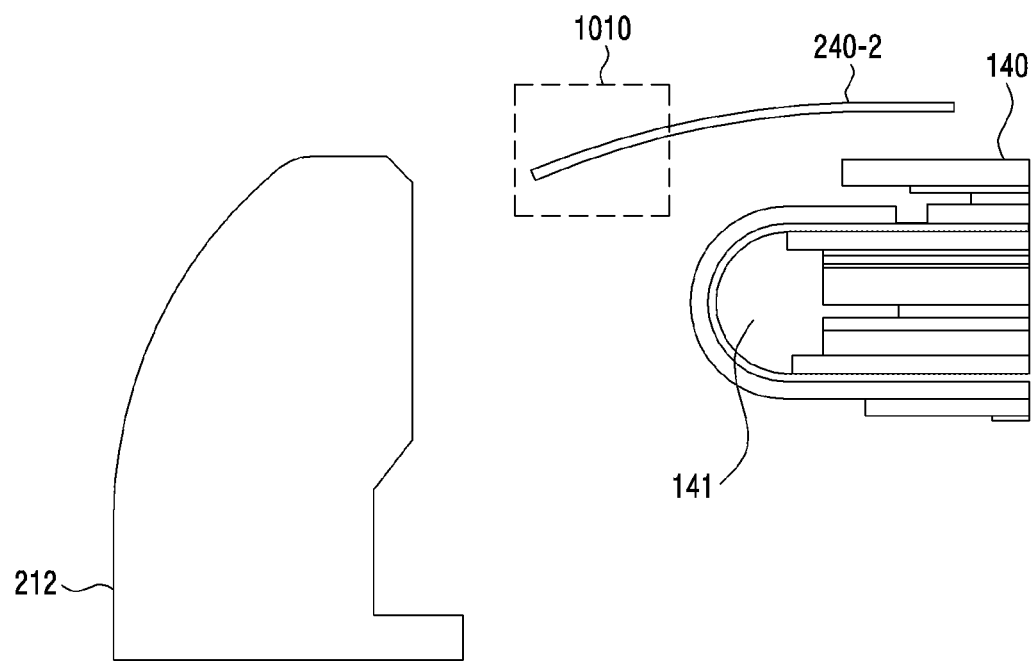
FIG. 10C is a cross-sectional view of a portion of the conductive member of the electronic device taken along line D-D' of FIG. 10A according to various embodiments.

FIG. 10A is a diagram illustrating a conductive member 240 according to various embodiments. FIG. 10B is a cross-sectional view of a portion of the electronic device 100 taken along line C-C' of FIG. 10A according to various embodiments. FIG. 10C is a cross-sectional view of a portion of the electronic device 100 taken along line D-D' of FIG. 10A according to various embodiments.

Referring to FIGS. 10A, 10B, and 10C, the second conductive member portion 240-2 may include at least one first protrusion 1010.

According to an embodiment, the second conductive member portion 240-2 may be spaced apart from the second conductive portion 212 by a predetermined distance in the region C-C'.

According to an embodiment, in the region D-D', the second protrusion 1010 included in the second conductive member portion 240-2 may extend from the second conductive member portion 240-2 toward the second conductive portion 212 to be adjacent to the second conductive member portion 212. In an example, the second protrusion 1010 may extend seamlessly from the second conductive member portion 240-2.

According to an embodiment, the second protrusion 1010 may provide a discharge path such that discharge occurring at a position adjacent to the second conductive member portion 240-2 flows to the second conductive portion 212. In an example, by being located closer to the second conductive portion 212 than other portions of the second conductive member portion 240-2, the second protrusion 1010 may prevent/reduce electrostatic discharge more effectively.

Figure 11A:
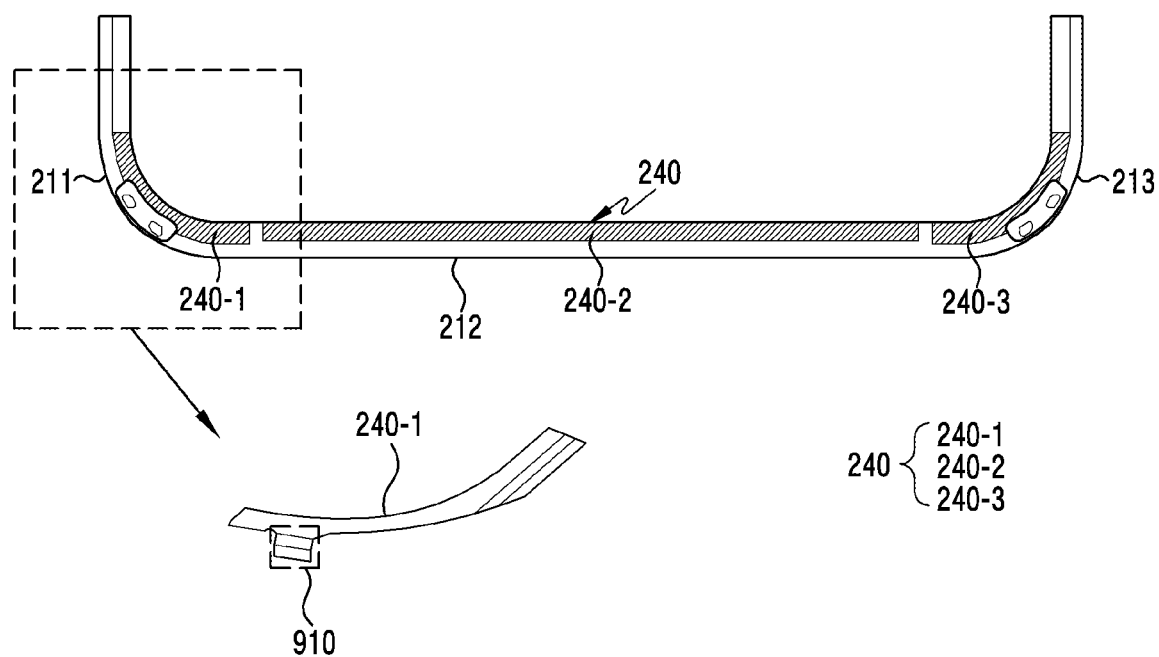
FIG. 11A is a diagram illustrating a portion of the second housing when one first protrusion is provided on a first conductive member portion and/or a third conductive member portion according to various embodiments.
Figure 11B:
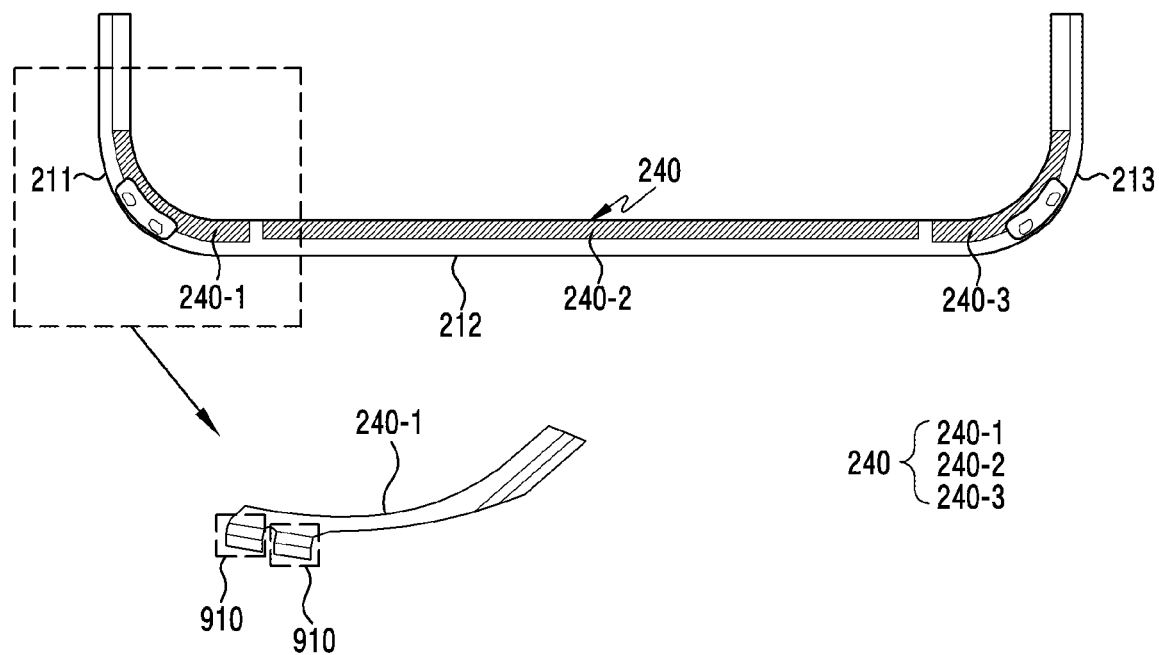
FIG. 11B is a diagram illustrating a portion of the second housing when at least two first protrusions are provided on the first conductive member portion and/or the third conductive member portion according to various embodiments.
Figure 11C:
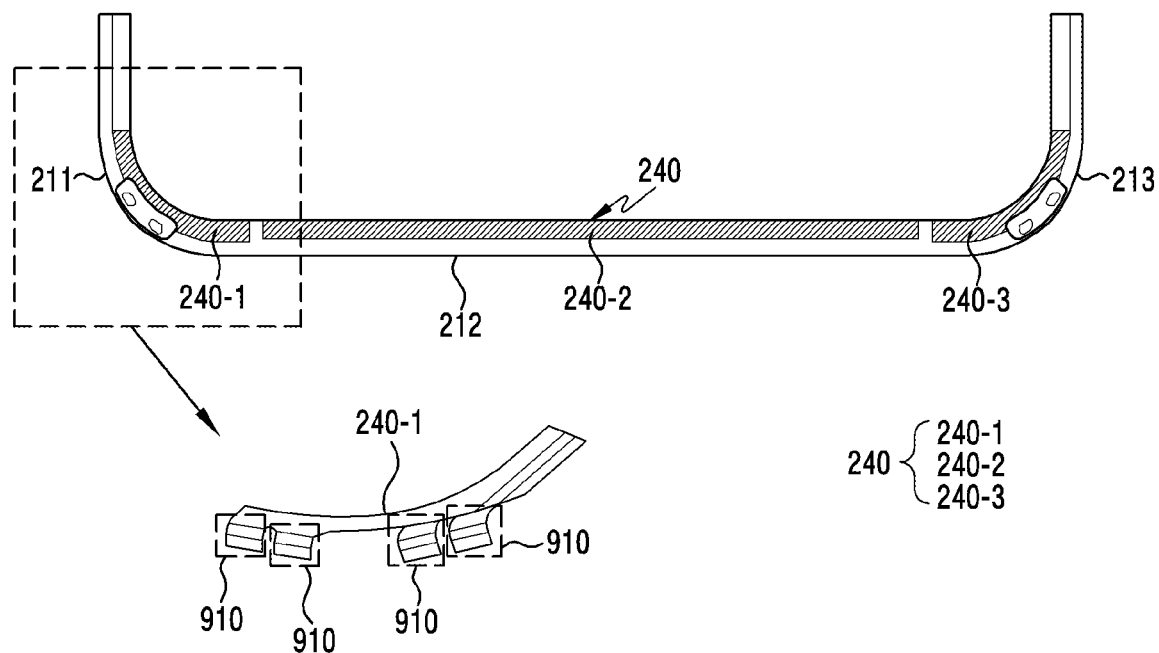
FIG. 11C is a diagram illustrating a portion of the second housing when at least four first protrusions are provided on the first conductive member portion and/or the third conductive member portion according to various embodiments.

FIG. 11A is a diagram illustrating a portion of the second housing 120 when one first protrusion 910 is provided on the first conductive member portion 240-1 and/or a third conductive member portion 240-3 according to various embodiments. FIG. 11B is a diagram illustrating a portion of the second housing 120 when at least two first protrusions 910 are provided on the first conductive member portion 240-1 and/or the third conductive member portion 240-3 according to various embodiments. FIG. 11C is a diagram illustrating a portion of the second housing 120 when at least four first protrusions 910 are provided on the first conductive member portion 240-1 and/or the third conductive member portion 240-3 according to various embodiments.

Referring to FIGS. 11A, 11B, and 11C, at least one first protrusion 910 may be provided on the first conductive member portion 240-1 and/or the third conductive member portion 240-3. Although not illustrated, as another example, at least one second protrusion 1010 may be provided on the first conductive member portion 240-1 and/or the third conductive member portion 240-3.

According to an embodiment, one first protrusion 910 may be provided on each of the first conductive member portion 240-1 and/or the third conductive member portion 240-3. In another example, one first protrusion 910 may be provided on the first conductive member portion 240-1, and two or more first protrusions 910 may be provided on the third conductive member portion 240-3.

According to an embodiment, two first protrusions 910 may be provided on each of the first conductive member portion 240-1 and/or the third conductive member portion 240-3. In another example, two first protrusions 910 may be provided on the first conductive member portion 240-1, and four first protrusions 910 may be provided on the third conductive member portion 240-3.

According to an embodiment, four first protrusions 910 may be provided in each of the first conductive member portion 240-1 and/or the third conductive member portion 240-3.

According to an embodiment, at least one first protrusion 910 provided on the first conductive member portion 240-1 may provide a discharge path such that discharge occurring at a position adjacent to the second conductive member portion 240-1 flows to the first conductive portion 211. In an example, by being located closer to the first conductive portion 211 than other portions of the first conductive member portion 240-1, the at least one first protrusion 910 provided on the first conductive member portion 240-1 may prevent/reduce electrostatic discharge more effectively.

According to an embodiment, at least one first protrusion 910 provided on the first conductive member portion 240-3 may provide a discharge path such that discharge occurring at a position adjacent to the third conductive member portion 240-3 flows to the third conductive portion 213. In an example, by being located closer to the third conductive portion 213 than other portions of the third conductive member portion 240-3, the at least one first protrusion 910 provided on the third conductive member portion 240-3 may prevent/reduce electrostatic discharge more effectively.

Figure 12:
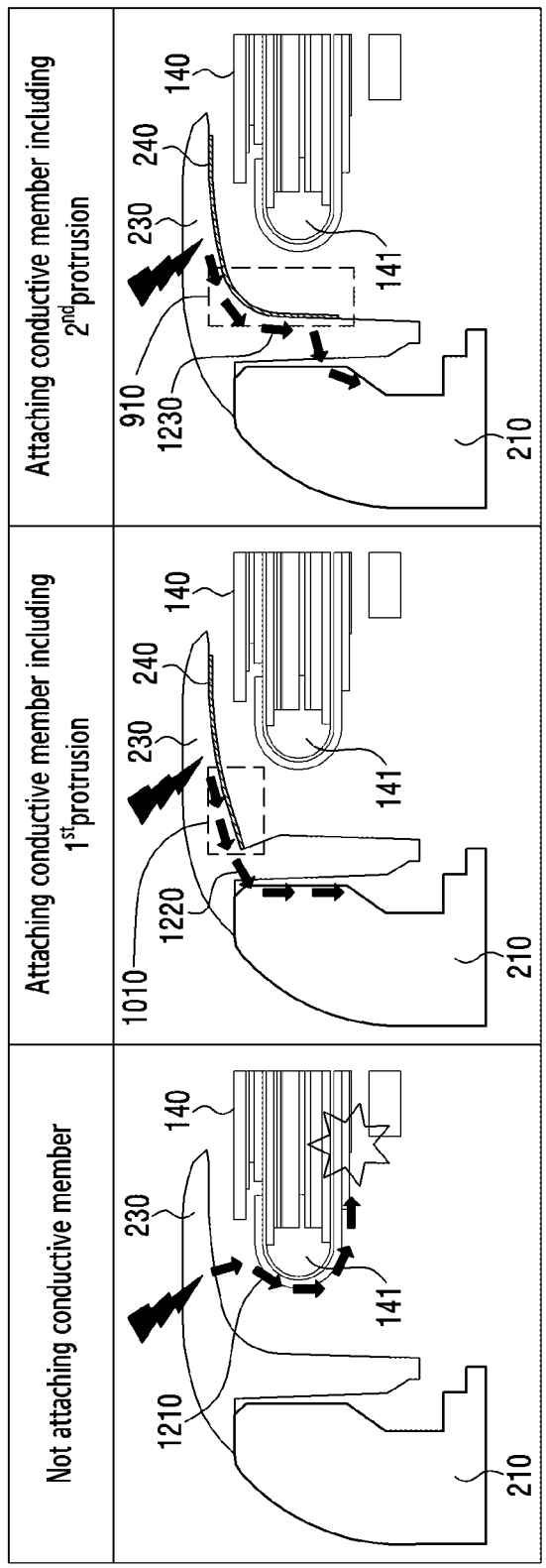
FIG. 12 is a diagram illustrating a discharge path provided along at least a portion of a dielectric material and conductive portions depending on whether a conductive member including a first protrusion or a conductive member including a second protrusion is provided according to various embodiments.

FIG. 12 is a diagram illustrating a discharge path provided along at least a portion of the dielectric material 230 and the conductive portions 210 depending on whether the conductive portion 240 including a first portion 910 or the conductive portion 240 including a second protrusion 1010 is provided according to various embodiments.

Referring to FIG. 12, when the conductive member 240 is not provided, electrostatic discharge occurring near the dielectric material 230 may flow to the display circuit unit, and thus the performance of the display 140 may be deteriorated.

Referring to FIG. 12, when the conductive member 240 is provided, a discharge path for static electricity generated near the dielectric material 230 may be provided along the conductive member 240 and at least some of the conductive portions 210, rather than being formed to be directed to the display circuit unit. As a result, it is possible to prevent or suppress performance deterioration of the display 140.

According to an embodiment, when the conductive member 240 is not provided, a first discharge path 1210 in which electrostatic discharge occurring near the dielectric material 230 is directed toward the display circuit unit may be provided.

Due to this, the performance of the display 140 may be deteriorated. According to an embodiment, when the conductive member 240 including the first protrusion 910 is provided, a second discharge path 1220 may be provided such that electrostatic discharge occurring near the dielectric material 230 flows along the conductive member 240 and at least some of the conductive portions 210, rather than flowing to the display circuit unit. In an example, when a discharge path of static electricity is provided along the conductive member 240 and at least some of the conductive portions 210, degradation in performance of the display 140 due to static discharge may be prevented or suppressed.

According to an embodiment, when the conductive member 240 including the second protrusion 1010 is provided, a third discharge path 1230 may be provided such that electrostatic discharge occurring near the dielectric material 230 flows along the conductive member 240 and at least some of the conductive portions 210, rather than flowing to the display circuit unit. In an example, when a discharge path of static electricity is provided along the conductive member 240 and at least some of the conductive portions 210, degradation in performance of the display 140 due to static discharge may be prevented or suppressed.

Figure 13A:
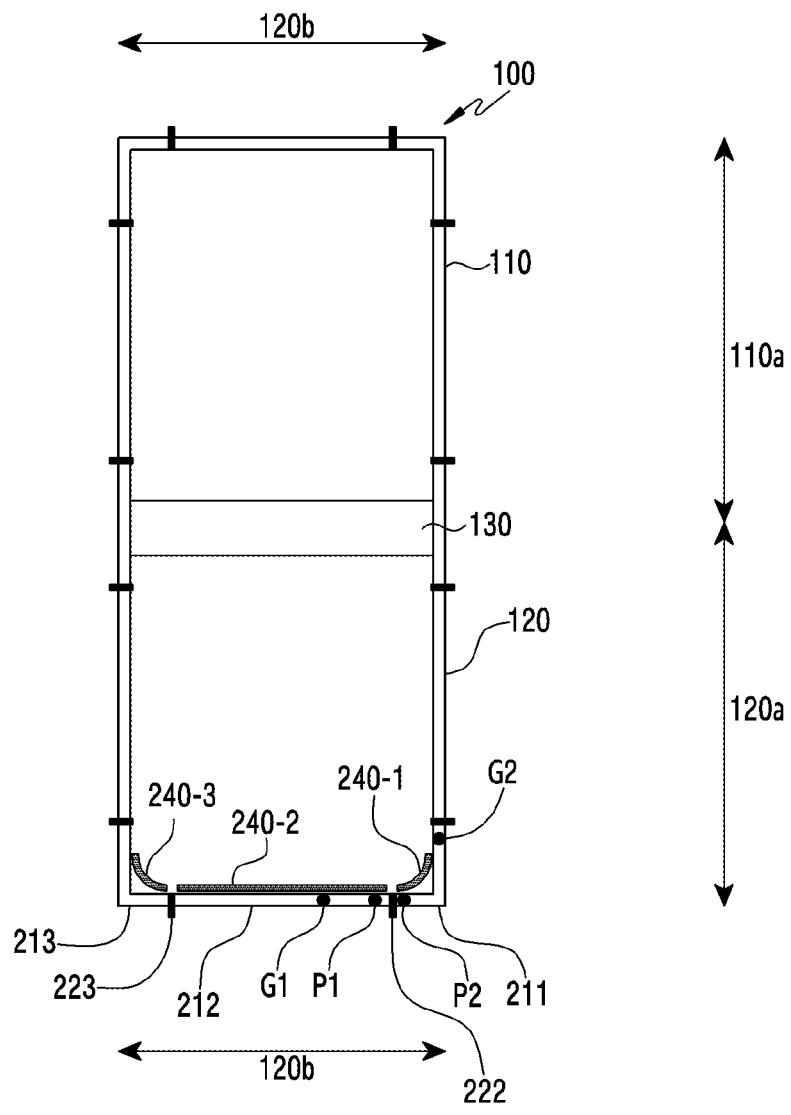
FIG. 13A is a diagram illustrating an electronic device in which feeding points and ground points are provided according to various embodiments.
Figure 13B:
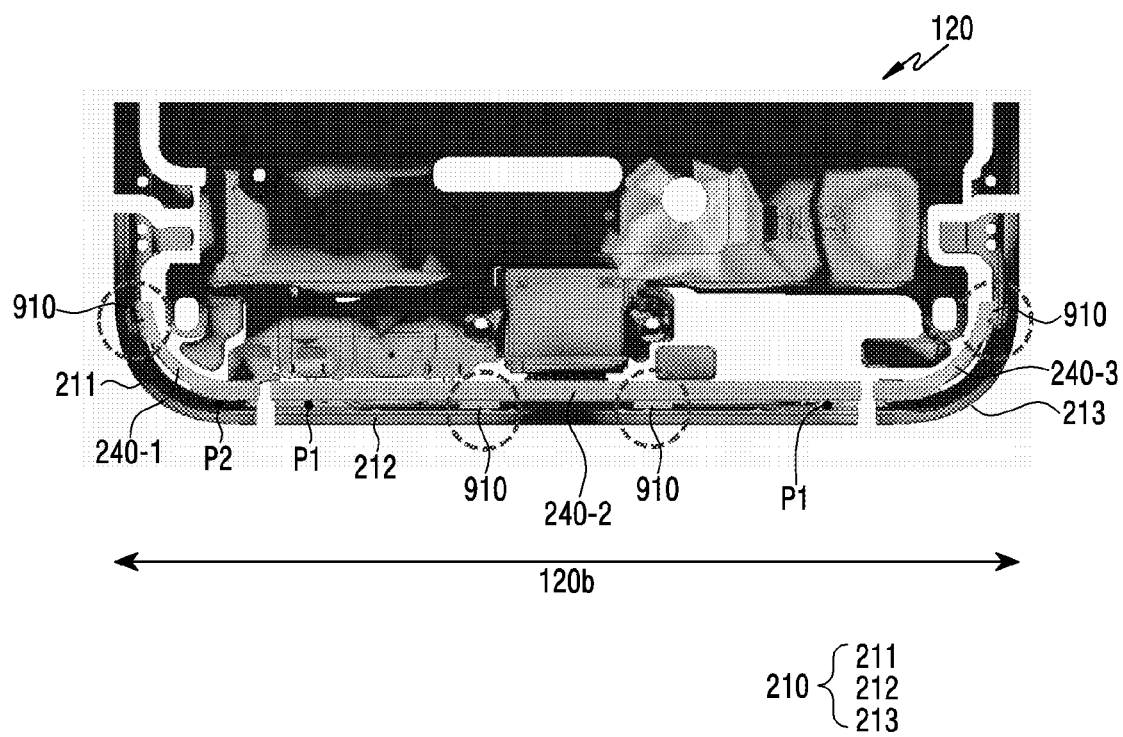
FIG. 13B is a diagram illustrating an electric field distribution formed in the electronic device of FIG. 13A according to various embodiments.

FIG. 13A is a diagram illustrating an electronic device 100 in which feeding points P1 and P2 and ground points G1 and G2 are provided according to various embodiments. FIG. 13B is a diagram illustrating an electric field distribution formed in the electronic device 100 of FIG. 13A according to various embodiments.

Referring to FIGS. 13A and 13B, at least one first protrusion 910 may be provided at a position spaced apart from the feeding points P1 and P2 having a high electric field strength by a predetermined distance. Although not illustrated, the second protrusion 1010 may be provided at a position spaced apart from the feeding points P1 and P2 having a high electric field strength by a predetermined distance.

According to an embodiment, a first feeding point P1 may be provided at one point of the second conductive portion 212, and a first ground point G1 may be provided at another point of the second conductive portion 212. As an embodiment, a second feeding point P2 may be provided at one point of the third conductive portion 213, and a second ground point G2 may be provided at another point of the third conductive portion 213.

According to an embodiment, the at least one first protrusion 910 provided on the second conductive member portion 240-2 may be provided at one point of the second conductive member portion 240-2 to be spaced apart from the first feeding point P1. This makes it possible for the discharge path of the first protrusion 910 provided on the second conductive member portion 240-2 to reduce the influence of the first feeding point P1.

According to an embodiment, the first protrusion 910 provided on the third conductive member portion 240-3 may be provided at one point of the third conductive member portion 240-3 to be spaced apart from the second feeding point P2. This makes it possible for the discharge path of the first protrusion 910 provided on the third conductive member portion 240-2 not to be affected by the second feeding point P2.

Figure 14:
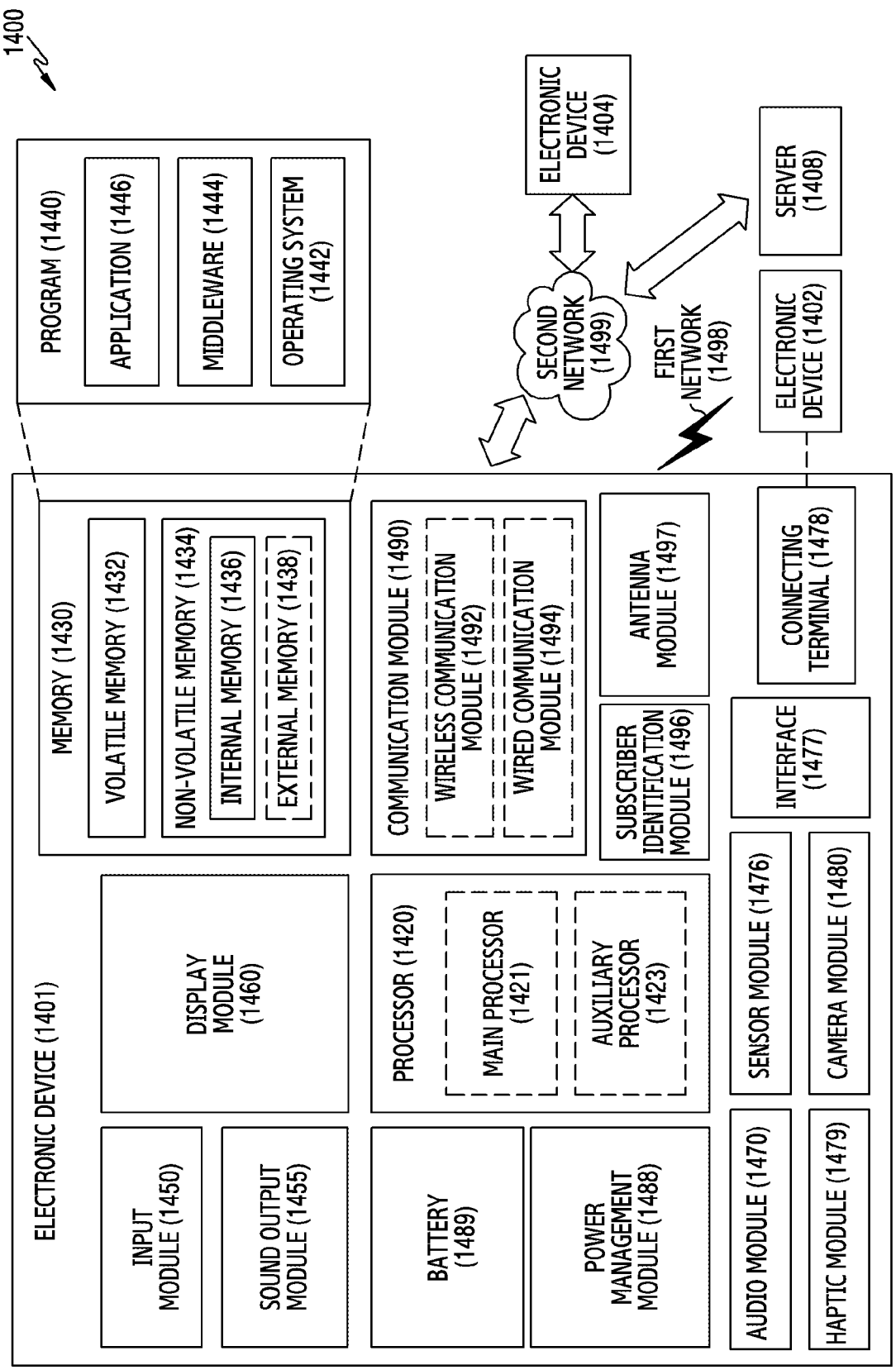
FIG. 14 is a block diagram of an example electronic device in a network environment according to various embodiments.

FIG. 14 is a block diagram of an electronic device in a network environment, according to various embodiments;

Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In various embodiments, at least one of the components (e.g., the connecting terminal 1478) may be omitted from the electronic device 1401, or one or more other components may be added in the electronic device 1401. In various embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to an embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 1464 dB or less) for implementing mMTC, or U-plane latency (e.g., 0.5 ms or less for each of downlink (DL) and uplink (UL), or a round trip of 14 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element including a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In an embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

Figure 15:
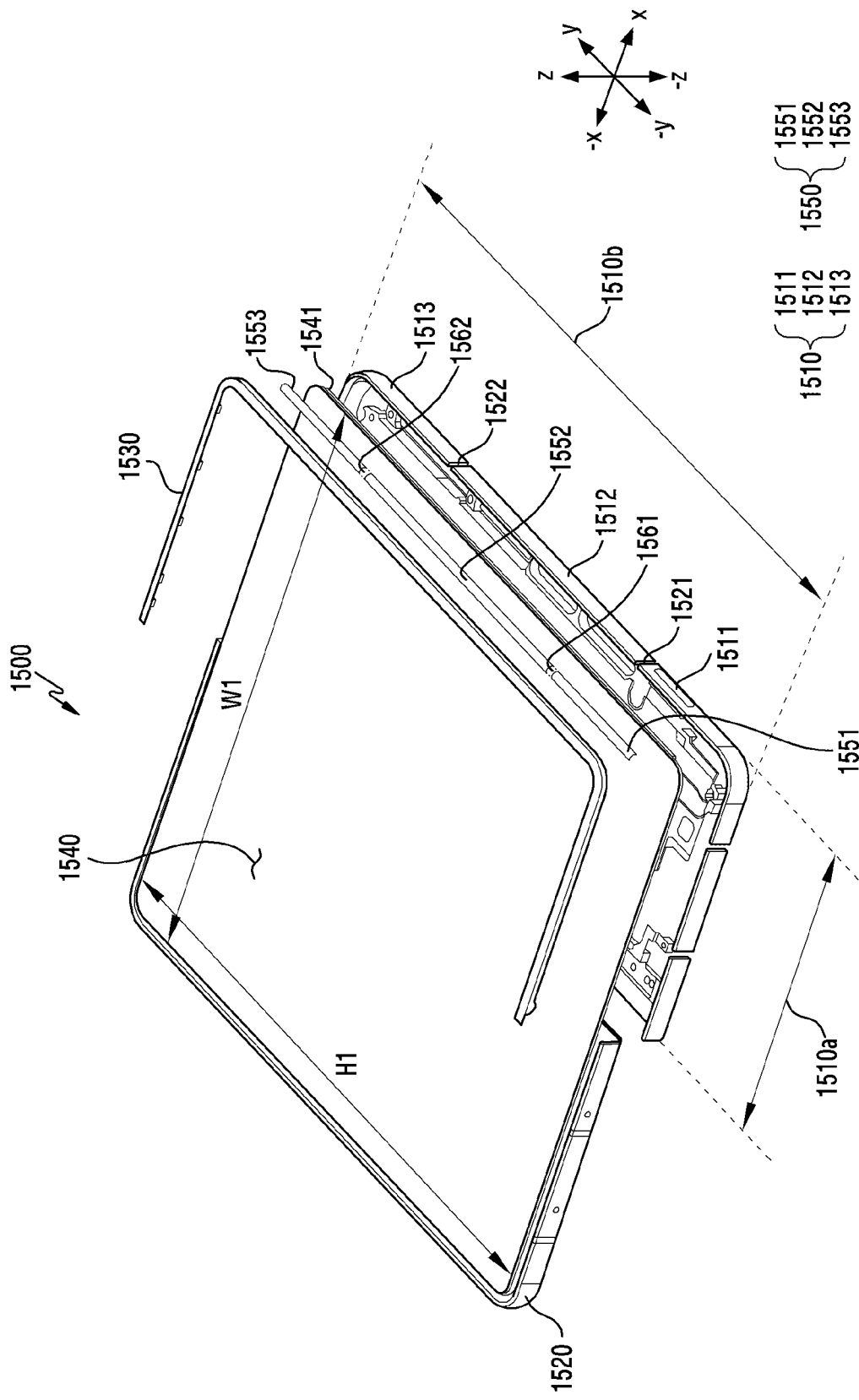
FIG. 15 is an exploded perspective view of an electronic device including a flexible display and a conductive member according to various embodiments.

FIG. 15 is an exploded perspective view of an electronic device including a flexible display and a conductive member according to various embodiments.

Referring to FIG. 15, the electronic device 1500 may include a first housing 1510, a second housing 1520, a second housing 1540, a connecting member 1550, a dielectric material 1530 and/or a display circuit unit 1541.

According to an embodiment, the first housing 1510 and the second housing 1520 may be coupled to each other via a connecting member to be rotatable about a first axis (e.g., the y axis in FIG. 15) oriented in a first direction (e.g., the +y-axis direction in FIG. 15) with respect to the first housing 1510.

According to an embodiment, the rear surfaces of the first housing 1510 and the second housing 1520 (e.g., the surface located in the −z axis direction in the first housing 1510) may be covered with a rear cover (not illustrated). In an example, at least a portion of the rear cover may be formed of a non-conductive material.

According to an embodiment, on the front surface of the electronic device 1500 (e.g., the surface located in the +z-axis direction of the first housing 1510), a display 1540 may be disposed over the first housing 1510 and the second housing 1520. In an example, the display 1540 may occupy most of the front surface of the electronic device 100. According to an embodiment, the display 1540 may have a horizontal length W1 longer than a vertical length H1, but is not limited thereto.

According to an embodiment, the display 1540 may include a flexible display. In an example, when the electronic device 1500 is in a folded state, the display 1540 may be flexibly bent depending on an angle formed between the first housing 1510 and the second housing 1520.

According to an embodiment, the first housing 1510 may include a first edge 1510a extending in a second direction (e.g., the +x-axis direction in FIG. 1) and a second edge 1510b extending in a first direction (e.g., the +y-axis direction in FIG. 1) perpendicular to the second direction (e.g., the +x-axis direction in FIG. 1).

According to an embodiment, the dielectric material 1530 (e.g., the dielectric material 230 in FIG. 2A) may define at least a portion of the first housing 1510 or the exterior of the electronic device 1500. In an example, the dielectric material 1530 may be referred to as a decoration that defines a portion of the exterior of the electronic device 1500.

According to an embodiment, the conductive member 1550 (e.g., the conductive member 240 in FIG. 2A) may be disposed between the dielectric material 1530 and the display circuit unit 1541. According to an embodiment, the conductive member 1550 may include a first conductive member portion 1551, a first split portion 1561, a second conductive member portion 1552, a second split portion 1562, and/or a third conductive member portion 1553.

According to an embodiment, the first conductive member portion 1551, the second conductive member portion 1552, and the third conductive member portion 1553 may include a conductive material. For example, the first conductive member portion 1551, the second conductive member portion 1552, and the third conductive member portion 1553 may be formed of a conductive tape. As another example, the first conductive member portion 1551, the second conductive member portion 1552, and the third conductive member portion 1553 may be provided through at least one of deposition on a dielectric material, deposition on a separate support member on the display circuitry 1541, a flexible printed circuit board (FPCB), plating, or stainless use steel (SUS).

According to an embodiment, the first split portion 1561 and/or the second split portion 1562 may include a non-conductive material. In an example, the first split portion 1561 or the second split portion 1562 may be filled with a dielectric material having a predetermined dielectric constant.

According to an embodiment, at least a portion of the first split portion 1561 may be disposed to correspond to the first non-conductive portion 1521. As another example, at least a portion of the second split portion 1562 may be disposed to correspond to the second non-conductive portion 1522. In an example, the first split portion 1561 may be provided at a point of the conductive member 1550 to face the first non-conductive portion 1521, and the second split portion 1562 may be provided at another point of the conductive member 1550 to face the second non-conductive portion 1522.

According to an embodiment, when only one of the first non-conductive portion 1521 or the second non-conductive portion 1522 is provided, of the first split portion 1561 or the second split portion 1562, only one corresponding to one of the portion 1521 or the second non-conductive portion 1522 may be provided. For example, when the second edge 1510b is provided with the first non-conductive portion 1521 without being provided with the second non-conductive portion 1522, the conductive member 1550 may be provided with the first split portion 1561 without being provided with the second split portion 1562. As another example, when the second edge 1510b is provided with the second non-conductive portion 1522 without being provided with the first non-conductive portion 1521, the conductive member 1550 may be provided with the second split portion 1562 without being provided with the first split portion 1561. A detailed description thereof will be given later.

Figure 16A:
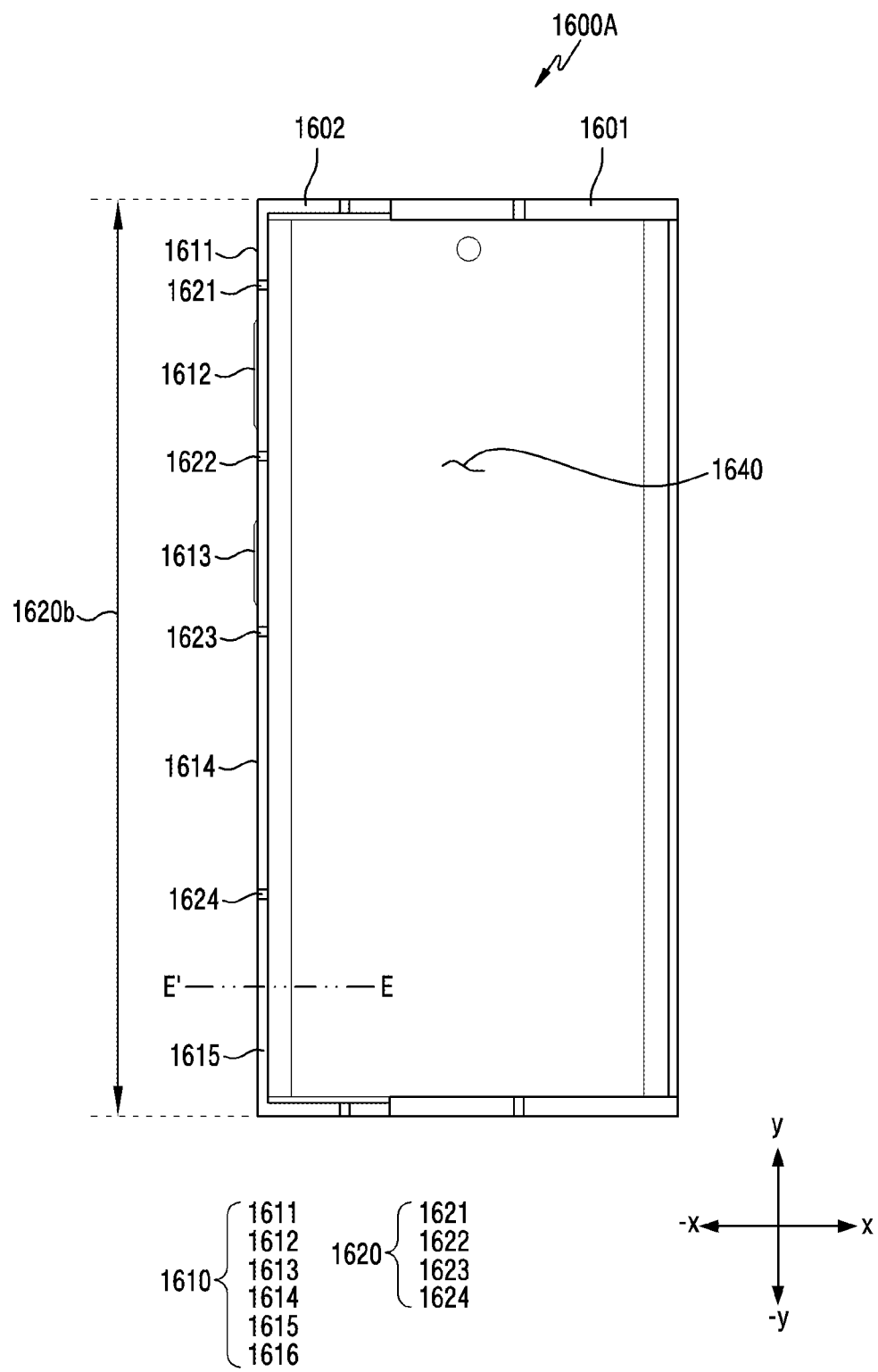
FIG. 16A is a diagram illustrating an electronic device including a rollable display in a first state according to an various embodiments.
Figure 16B:
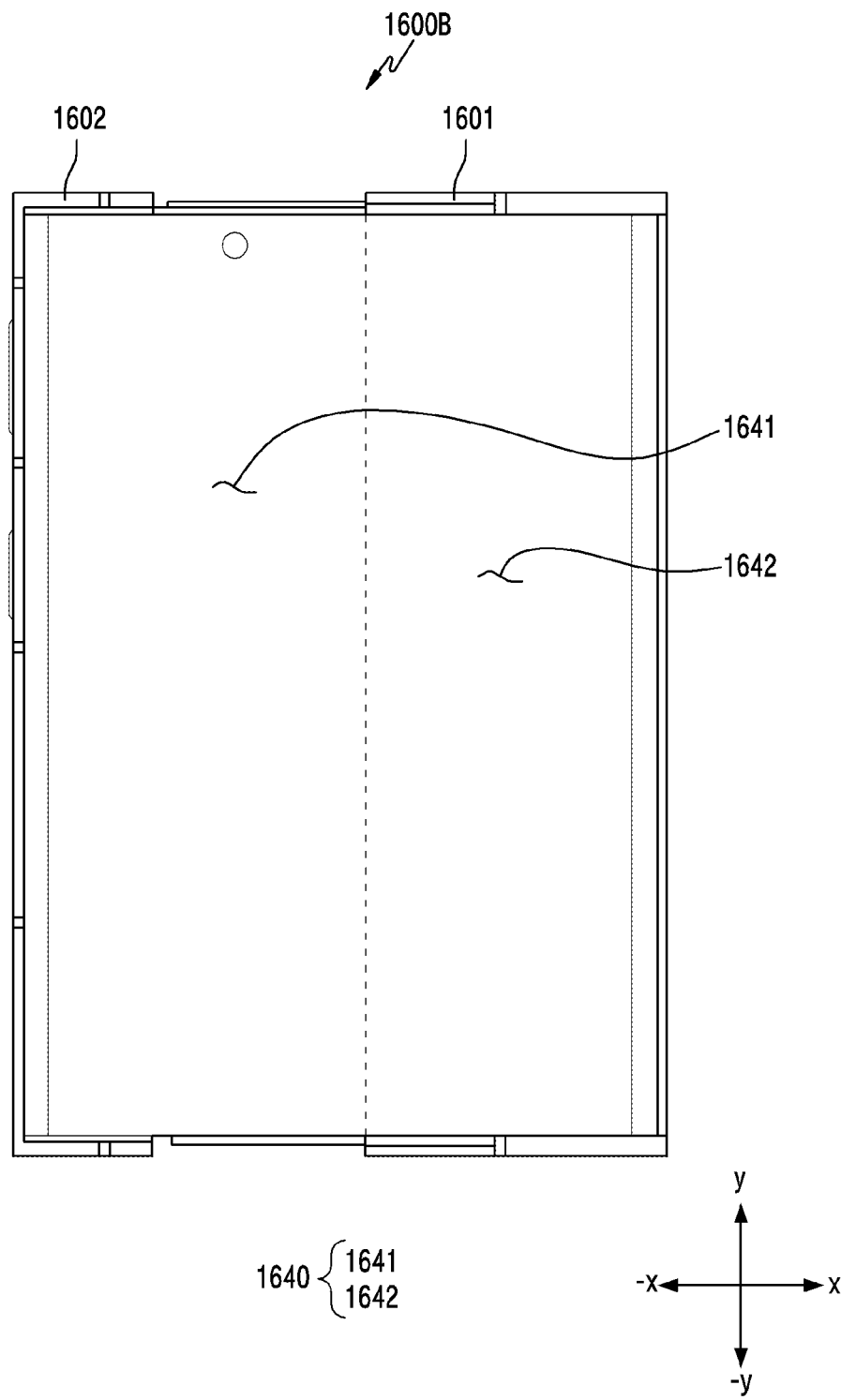
FIG. 16B is a diagram illustrating the electronic device including a rollable display in a second state according to various embodiments.
Figure 16C:
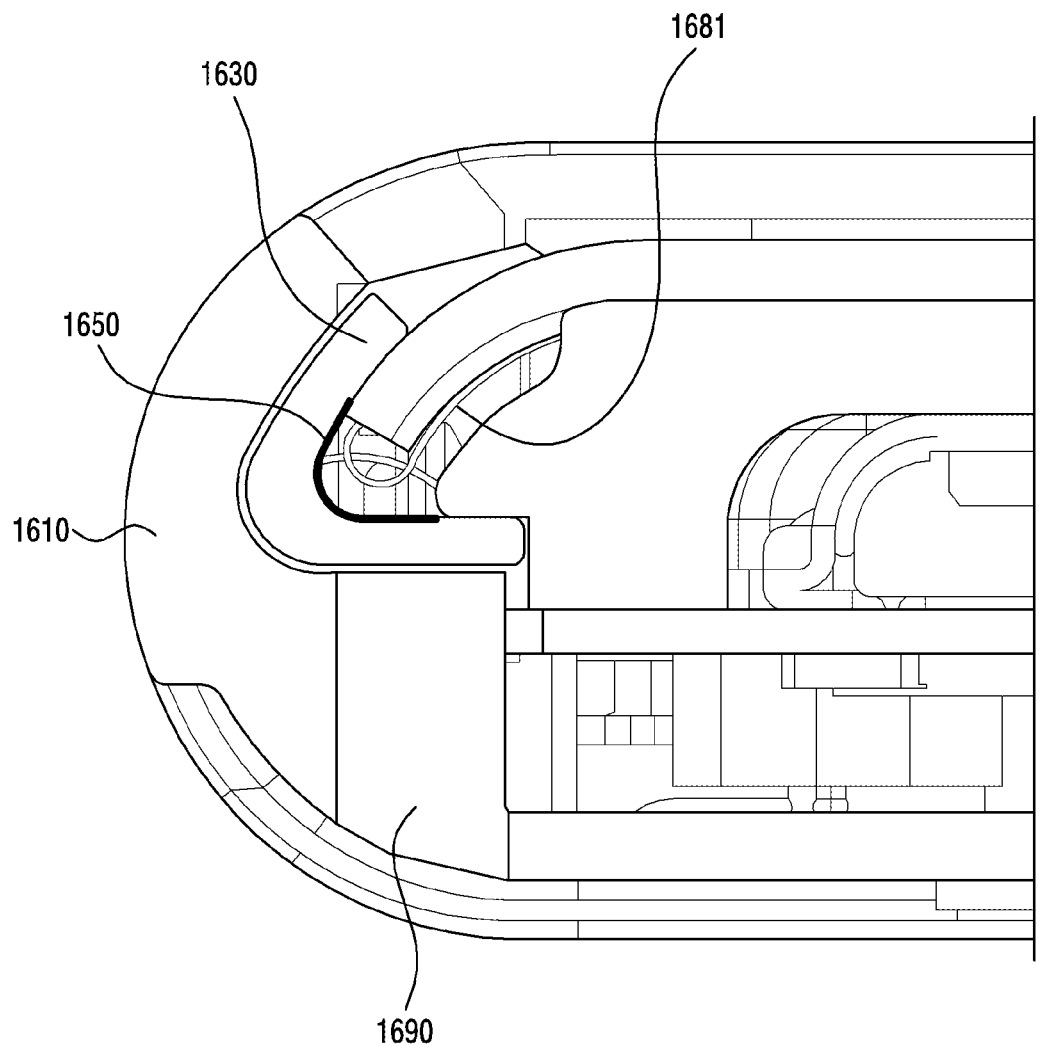
FIG. 16C is a cross-sectional view taken along axis E-E' in the electronic device of FIG. 16A according to various embodiments.

FIG. 16A is a diagram illustrating an electronic device including a rollable display in a first state according to various embodiments. FIG. 16B is a diagram illustrating the electronic device including a rollable display in a second state according to various embodiments. FIG. 16C is a cross-sectional view taken along axis E-E' in the electronic device of FIG. 16A according to various embodiments.

Referring to 16A and 16B together, the display 1640 may be placed on one surface of the electronic device 1600 according to an embodiment. Hereinafter, the surface on which the display 1640 is placed will be referred to as a front surface. According to an embodiment, the display 1640 may occupy most of the front surface of the electronic device 1600. According to an embodiment, the display 1640 may have a flat shape and a curved shape.

According to an embodiment, on the front surface of the electronic device 1600, the display 1640 and housings 1601 and 1602, which surround at least portion of the display 1640, may be disposed. According to an embodiment, the housings 1601 and 1602 may define a partial region of the front surface, the side surface, and the rear surface of the electronic device 1600. According to an embodiment, the housings 1601 and 1602 may form a partial region of the side surface and the rear surface of the electronic device 1600. According to an embodiment, the housings 1601 and 1602 may include a first housing 1601 and a second housing 1602 that is movable relative to the first housing 1601.

According to an embodiment, the display 1640 may include a first portion 1641 that is capable of being coupled to the second housing 1602 and a second portion 1642 that is capable of extending from the first portion 1641 and capable of being retracted into the inside of the electronic device 1600. According to an embodiment, when the electronic device 1600 is switched from the first state 1600A to a second state 1600B according to the movement of the second housing 1602, the second portion 1642 of the display 1640 is capable of being drawn out from the inside to the outside of the electronic device 1600. According to an embodiment, when the electronic device 1600 is switched from the second state 100b to the first state 100a according to the movement of the second housing 1602, the second portion 1642 of the display 1640 is capable of being retracted into the inside of the electronic device 1600.

The fourth edge 1620b of the second housing 1602 according to an embodiment may include a first conductive portion 1611, a first non-conductive portion 1621, a second conductive portion 1612, a second non-conductive portion 1622, a third conductive portion 1613, a third non-conductive portion 1623, a fourth conductive portion 1614, a fourth non-conductive portion 1624, and/or a fifth conductive portion 1615. Meanwhile, in the following description, a conductive portion may be replaceably understood as a conductive unit or a conductive region, and a non-conductive portion may be replaceably understood as a non-conductive unit or a split portion. According to an embodiment, conductive portions 1610 may be spaced apart from each other by non-conductive portions 1620.

According to an embodiment, a wireless communication circuit (not illustrated) disposed within a housing 1601 or 1602 may transmit/receive a radio signal using at least one of the conductive portions 1610 by feeding power to at least a portion of the second housing 1602. For example, the wireless communication circuit disposed on a printed circuit board within the housing 1601 or 1602 may transmit and/or receive a radio signal by feeding power to at least one of the conductive portions 1610.

Referring to FIG. 16C, the second housing 1602 according to an embodiment may include conductive portions 1610 and non-conductive portions 1620. The conductive portions 1610 according to an embodiment may be referred to as the conductive portions 210 of FIG. 2A.

The conductive member 1650 according to an embodiment may be disposed between the second housing 1602 or the fourth edge 1620b of the second housing 1602 and the display circuit unit 1681. According to an embodiment, the conductive member 1650 may be disposed between the dielectric material 1630 and the display circuit unit 1681. According to an embodiment, the conductive member 1650 may be disposed adjacent to the dielectric material 1630 between the dielectric material 1630 (e.g., the dielectric material 230 in FIG. 2A) and the display circuit unit 1681.

According to an embodiment, the conductive member 1650 (e.g., the conductive member 240 in FIG. 2A) may protect the display circuit unit 1681 from electrostatic discharge. In an example, the conductive member 1650 may provide a discharge path that transfers discharge occurring near the dielectric material 1630 to the conductive portions 1610 to prevent or suppress performance degradation of the display circuit unit 1681.

Figure 17A:
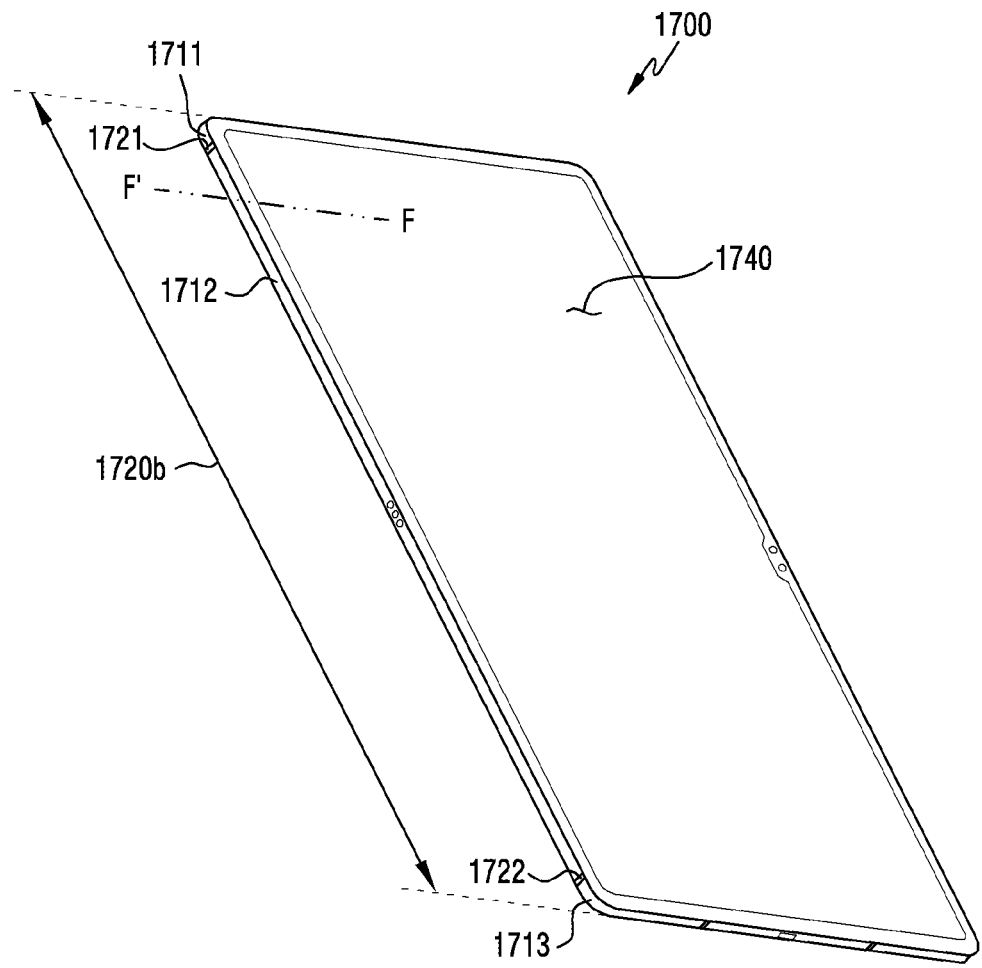
FIG. 17A is a perspective view of an electronic device according to various embodiments.
Figure 17B:
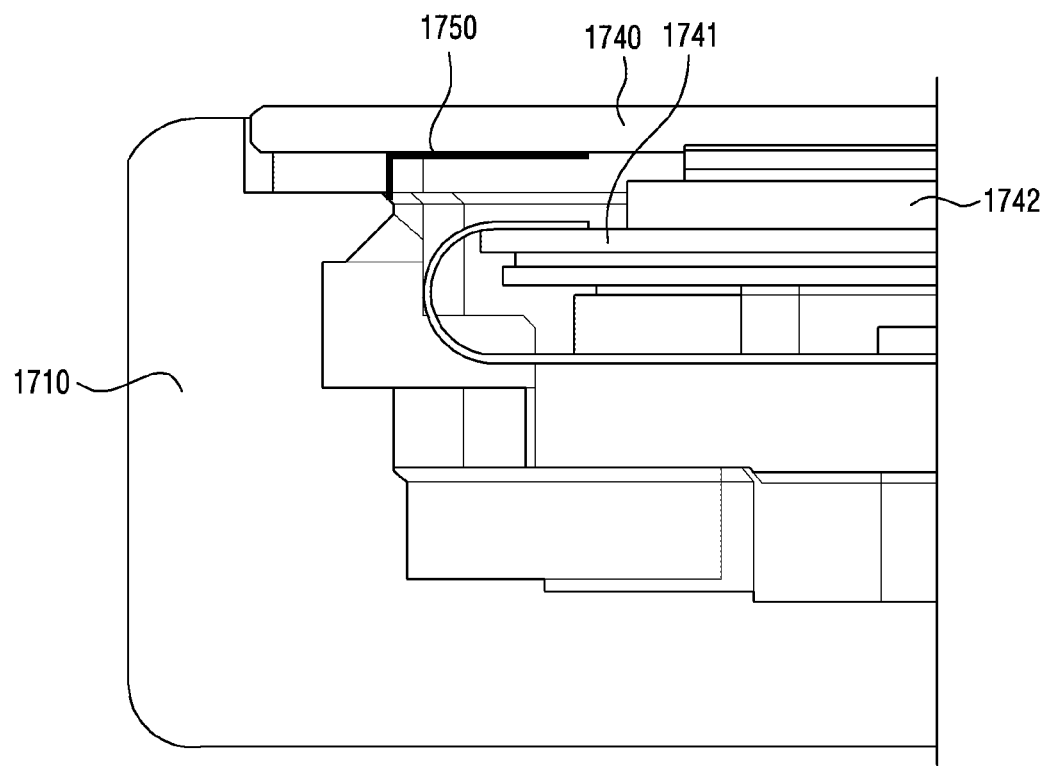
FIG. 17B is a cross-sectional view taken along axis F-F' in the electronic device of FIG. 17A according to various embodiments.

FIG. 17A is a perspective view of an electronic device according to various embodiments. FIG. 17B is a cross-sectional view taken along axis F-F' of FIG. 17A according to various embodiments.

Referring to FIG. 17A, an electronic device 1700 according to an embodiment may include a cover glass 1740, a display 1742, and a housing 1701 that define at least a portion of a first surface (or a "front surface"). The electronic device 1700 according to an embodiment may be referred to as a tablet device.

According to an embodiment, a second surface (or a "side surface") that is substantially perpendicular to the front surface of the electronic device 1700 may be substantially defined by the housing 1701. The housing 1701 according to an embodiment may include, for example, conductive portions 1710 formed of a conductive material (e.g., aluminum, stainless steel (STS), or magnesium) and/or non-conductive portions 1720 formed of a non-conductive material (e.g., a polymer). For example, the housing 1701 may include conductive portions 1710 and/or non-conductive portions 1720 that split the conductive portions 1710.

The second edge 1720b of the housing 1701 according to an embodiment may include a first conductive portion 1711, a first non-conductive portion 1721, a second conductive portion 1712, a second non-conductive portion 1722, and/or a third conductive portion 1713. Meanwhile, in the following description, a conductive portion may be replaceably understood as a conductive unit or a conductive region, and a non-conductive portion may be replaceably understood as a non-conductive unit or a split portion.

According to an embodiment, the first conductive portion 1711, the second conductive portion 1712, or the third conductive portion 1713 may include a metallic material. In an example, the first conductive portion 1711, the second conductive portion 1712, and the third conductive portion 1713 may correspond to at least a portion of a metal housing.

According to an embodiment, the first non-conductive portion 1721 or the second non-conductive portion 1722 may be formed of a dielectric material having a predetermined dielectric constant. In an example, the first non-conductive portion 1721 and the second non-conductive portion 1722 may be filled with a dielectric material.

According to an embodiment, by feeding power to at least a portion of the housing 1701, the wireless communication circuit (not illustrated) disposed within the housing 1701 may transmit/receive power using at least one of the first conductive portion 1711, the second conductive portion 1712, or the third conductive portion 1713. In an example, a wireless communication circuit disposed on a printed circuit board within the housing 1701 may transmit and/or receive a radio signal by feeding power to at least one of the first conductive portion 1711, the second conductive portion 1712, or the third conductive portion.

Referring to FIGS. 17A and 17B together, the conductive member 1750 (e.g., the conductive member 240 in FIG. 2A) according to an embodiment may be disposed between the cover glass 1740 and the display circuit unit 1741. The conductive member 1750 according to an embodiment may be disposed between the conductive portions 1710 and the display circuit unit 1741. According to an embodiment, the conductive member 1750 may be disposed to be electrically separated from the first conductive portion 1711, the second conductive portion 1712, or the third conductive portion 1713.

According to an embodiment, the conductive member 1750 may protect the display circuit unit 1741 from electrostatic discharge. In an example, the conductive member 1750 may provide a discharge path that transfers discharge occurring near a dielectric material (e.g., the dielectric material 230 in FIG. 2A) to the conductive portions 1710 to prevent or suppress performance degradation of the display circuit unit 1741.

Figure 18A:
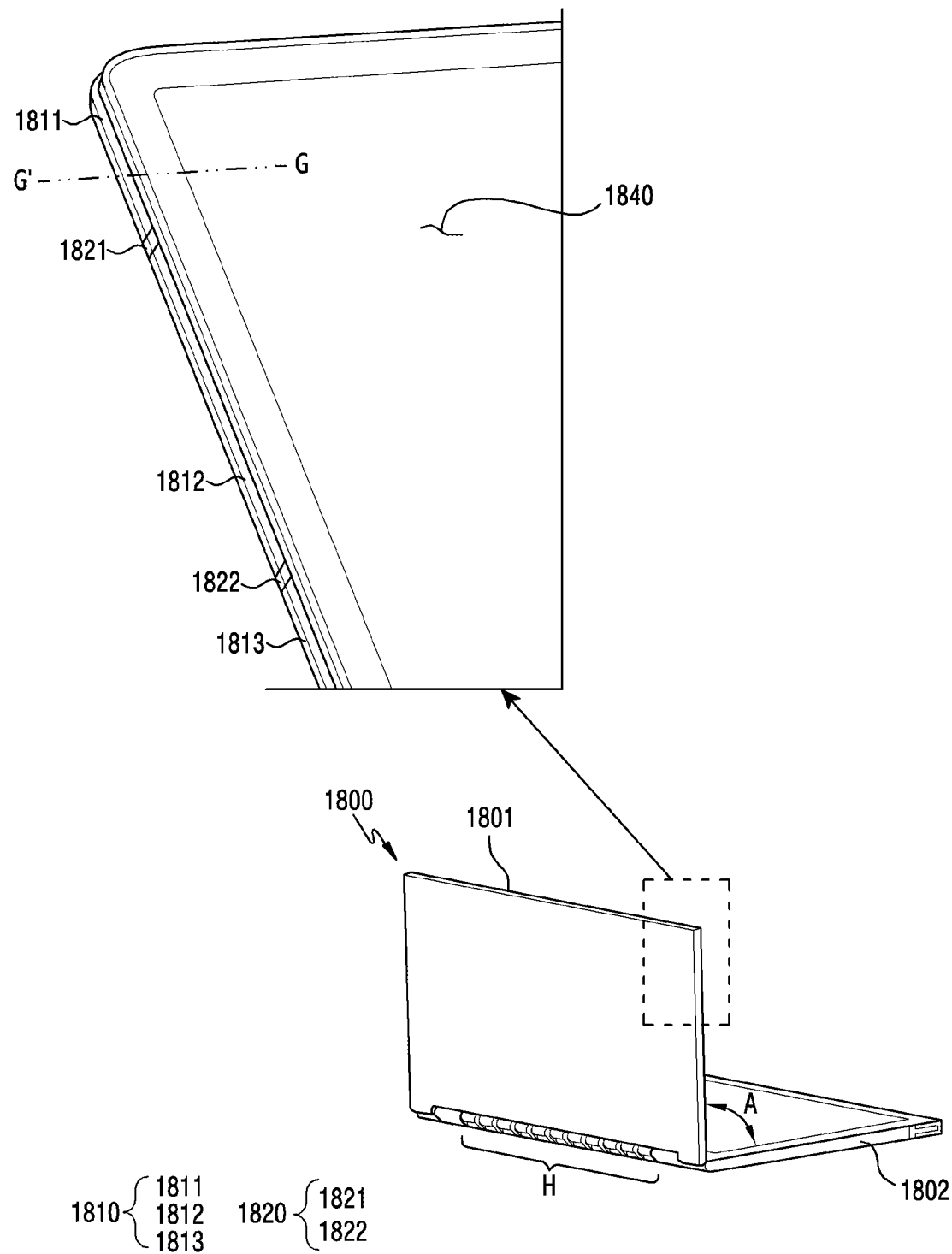
FIG. 18A is a diagram illustrating an electronic device according to various embodiments.
Figure 18B:
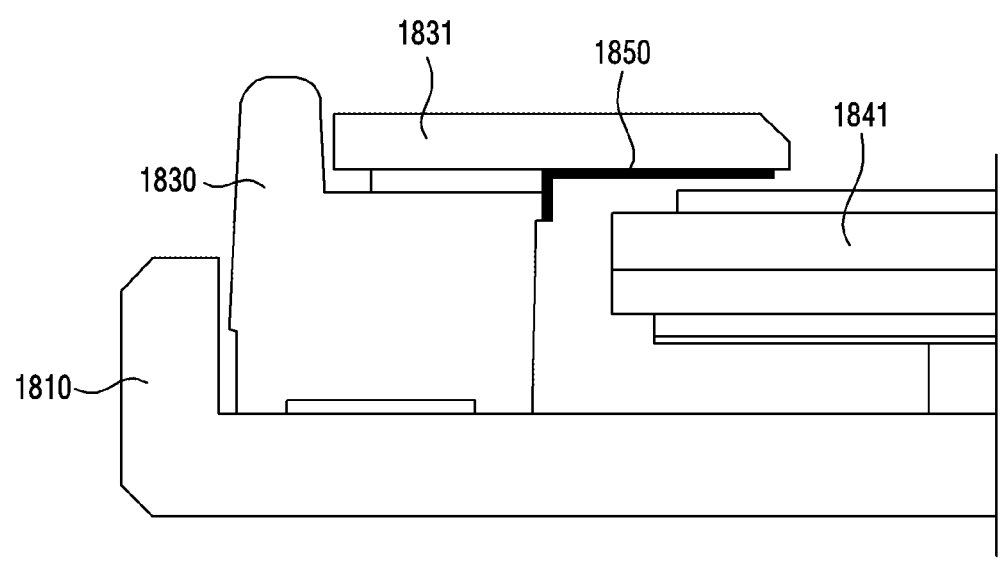
FIG. 18B is a cross-sectional view taken along axis G-G' in the electronic device of FIG. 18A according to various embodiments.

FIG. 18A is a diagram illustrating an electronic device according to various embodiments. FIG. 18B cross-sectional view taken along axis G-G' of FIG. 18A according to various embodiments.

Referring to FIG. 18A, an electronic device 1800 according to an embodiment may include a first housing 1801, a hinge structure H, a second housing coupled to the first housing 1801 via the hinge structure H to be rotatable relative to the first housing 1801, and a display 1840. According to an embodiment, the first housing 1801 may be coupled to the second housing 1802 to rotate by a predetermined angle A relative to the second housing 1802 about the hinge structure H.

According to an embodiment, the first housing 1801 may include conductive portions 1810 and non-conductive portions 1820 that define a side surface of the electronic device 1800. According to an embodiment, the conductive portions 1810 may be disposed to be electrically separated from each other by the non-conductive portions 1820.

The first housing 1801 according to an embodiment may include a first conductive portion 1811, a first non-conductive portion 1821, a second conductive portion 1812, a second non-conductive portion 1822, and/or a third conductive portions 1813. Meanwhile, in the following description, a conductive portion may be replaceably understood as a conductive unit or a conductive region, and a non-conductive portion may be replaceably understood as a non-conductive unit or a split portion.

According to an embodiment, a wireless communication circuit (not illustrated) disposed within a housing 1801 or 1802 may transmit/receive a radio signal using at least one of the conductive portions 1810 by feeding power to at least a portion of the housing 1801 or 1802. For example, the wireless communication circuit disposed on a printed circuit board within the housing 1801 or 1802 may transmit and/or receive a radio signal by feeding power to at least one of the conductive portions 1810.

Referring to FIG. 18B, a conductive member 1850 (e.g., the conductive member 240 in FIG. 2A) according to an embodiment may be disposed between a dielectric material 1830 (e.g., the dielectric material 230 in FIG. 2A) and a display circuit unit 1841. According to an embodiment, the conductive member 1850 may be disposed between the dielectric material 1830 and the display circuit unit 1841 to be adjacent to a dielectric material 1830. According to an embodiment, the dielectric material 1830 may be referred to as a decoration that protects the display circuit unit 1841 or the display (e.g., the display 1742 in FIG. 7).

According to an embodiment, the electronic device 1800 may include a glass decoration 1831. According to an embodiment, the glass decoration 1831 may be provided to protect the display. According to an embodiment, the glass decoration 1831 may be disposed adjacent to the conductive member 1850. The glass decoration 1831 according to an embodiment may be formed of a dielectric material having a predetermined dielectric constant.

According to an embodiment, the conductive member 1850 may protect the display circuit unit 1841 from electrostatic discharge. In an example, the conductive member 1850 may provide a discharge path that transfers discharge occurring near a dielectric material (e.g., the dielectric material 230 in FIG. 2A) to the conductive portions 1810 to prevent or suppress performance degradation of the display circuit unit 1841.

Figure 19A:
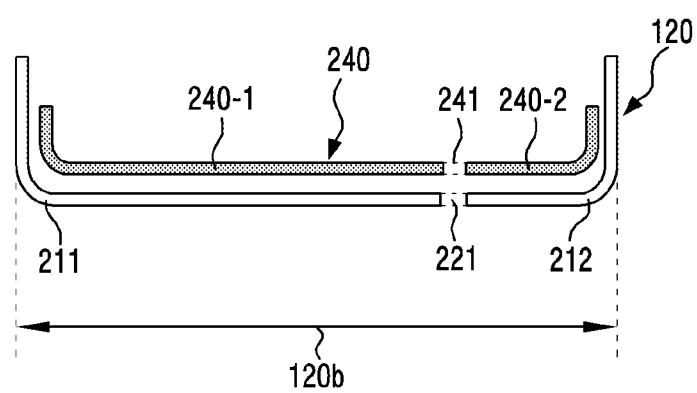
FIG. 19A is a diagram illustrating a housing including a single non-conductive portion and a conductive member according to various embodiments.
Figure 19B:
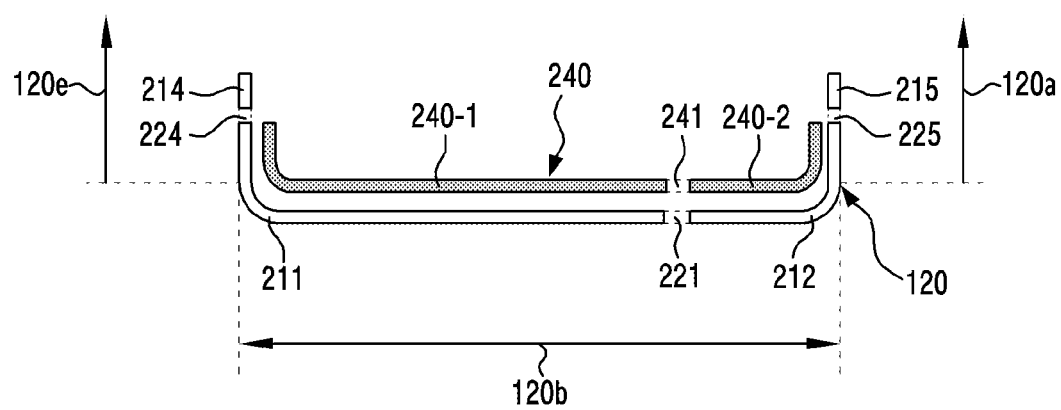
FIG. 19B is a diagram illustrating a housing including a single non-conductive portion and a side non-conductive portion and a conductive member according to various embodiments.
Figure 19C:
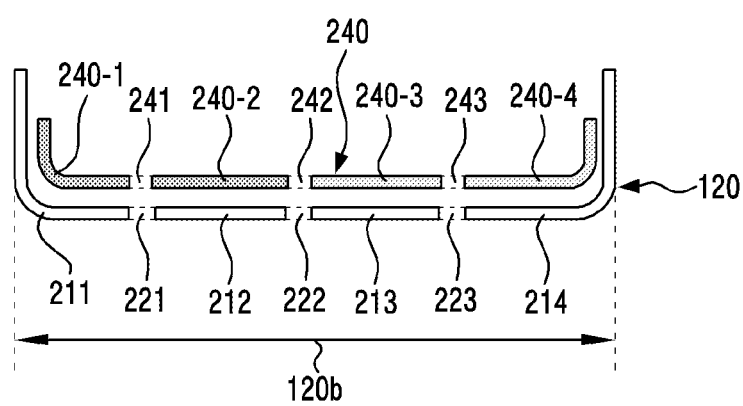
FIG. 19C is a diagram illustrating a housing including a plurality of non-conductive portions and a conductive member according to various embodiments.

FIG. 19A is a diagram illustrating a housing including a single non-conductive portion and a conductive member according to various embodiments. FIG. 19B is a diagram illustrating a housing including a single non-conductive portion and a side non-conductive portion and a conductive member according to various embodiments. FIG. 19C is a diagram illustrating a housing including a plurality of non-conductive portions and a conductive member according to various embodiments.

Referring to FIGS. 19A, 19B and 19C, some of the edges of the second housing 120 according to an embodiment may include a plurality of conductive portions 211, 212, 213, and 214 and at least one non-conductive portion 221, 222, or 223. According to an embodiment, the conductive member 240 may include a plurality of conductive member portions 240-1, 240-2, 240-3, and 240-4 and at least one split portion 241, 242, or 243.

Referring to FIG. 19A, a fourth edge 120b of the second housing 120 according to an embodiment may include a first conductive portion 211, a first non-conductive portion 221, and a second conductive portion 212. According to an embodiment, the conductive member 240 may include a first conductive member portion 240-1, a first split portion 241, and a second conductive member portion 240-2. According to an embodiment, the first non-conductive portion 221 of the second housing 120 and the first split portion 241 of the conductive member 240 may be disposed at positions corresponding to each other. For example, the first non-conductive portion 221 of the second housing 120 and the first split portion 241 of the conductive member 240 may be disposed to at least partially overlap each other.

Referring to FIG. 19B, a fourth edge 120b of the second housing 120 according to an embodiment may include a first conductive portion 211, a first non-conductive portion 221, and a second conductive portion 212. A third edge 120a of the second housing 120 according to an embodiment may include a portion of the second conductive portion 212, a fifth non-conductive portion 225, and a fifth conductive portion 215. According to an embodiment, a fifth edge 120e perpendicular to the fourth edge 120b and parallel to the third edge 120a may include a portion of the first conductive portion 211, a fourth non-conductive portion 224, and a fourth conductive portion 214.

According to an embodiment, the conductive member 240 may include a first conductive member portion 240-1, a first split portion 241, and a second conductive member portion 240-2. According to an embodiment, the first non-conductive portion 221 of the second housing 120 and the first split portion 241 of the conductive member 240 may be disposed at positions corresponding to each other. For example, the first non-conductive portion 221 of the second housing 120 and the first split portion 241 of the conductive member 240 may be disposed to at least partially overlap each other.

According to an embodiment, one end of the first conductive member portion 240-1 may be disposed to correspond to the fourth non-conductive portion 224. According to an embodiment, one end of the second conductive member portion 240-2 may be disposed to correspond to the fifth non-conductive portion 225.

Referring to FIG. 19C, the fourth edge 120b of the second housing 120 according to an embodiment may include a first conductive portion 211, a first non-conductive portion 221, a second conductive portion 212, a second non-conductive portion 222, a third conductive portion 213, a third non-conductive portion 223, and a fourth conductive portion 214.

According to an embodiment, the conductive member 240 may include a first conductive member portion 240-1, a first split portion 241, a second conductive member portion 240-2, a second split portion 242, a third conductive member portion 240-3, a third split portion 243, and a fourth conductive member portion 240-4.

According to an embodiment, the non-conductive portions 221, 222, and 223 of the second housing 120 may be provided to respectively correspond to the split portions 241, 242, and 243 of the conductive member 240. For example, the first non-conductive portion 221 of the second housing 120 and the first split portion 241 of the conductive member 240 may be disposed at positions corresponding to each other. As another example, the first non-conductive portion 221 of the second housing 120 and the first split portion 241 of the conductive member 240 may be disposed to at least partially overlap each other. As another example, the second non-conductive portion 222 of the second housing 120 and the second split portion 242 of the conductive member 240 may be disposed to at least partially overlap each other.

Figure 20A:
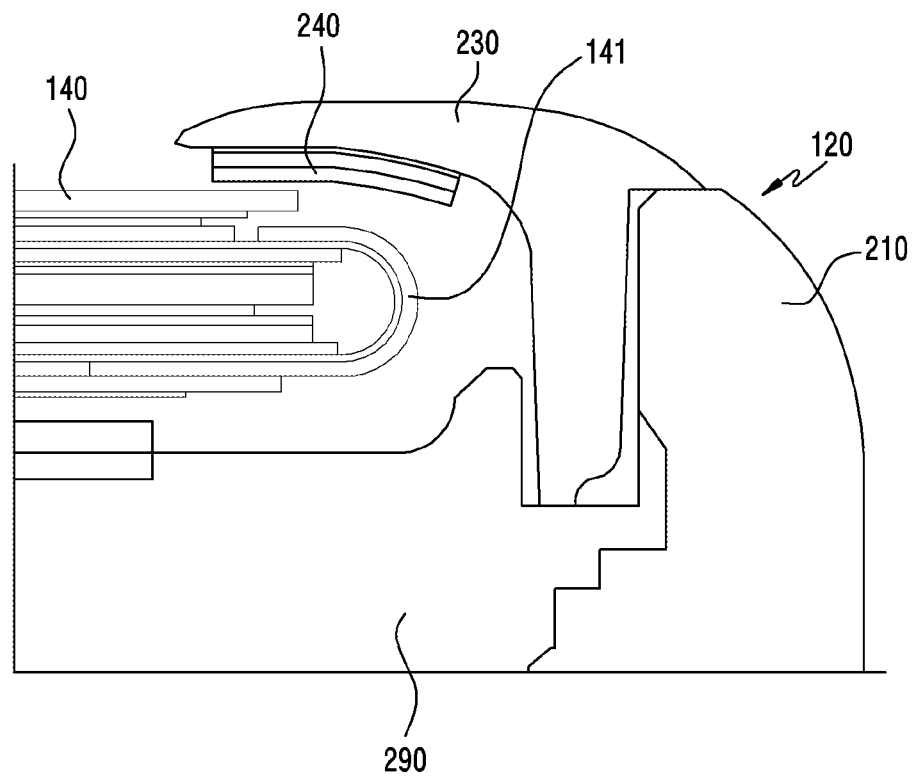
FIG. 20A is a cross-sectional view illustrating a conductive member disposed adjacent to a dielectric material according to various embodiments.
Figure 20B:
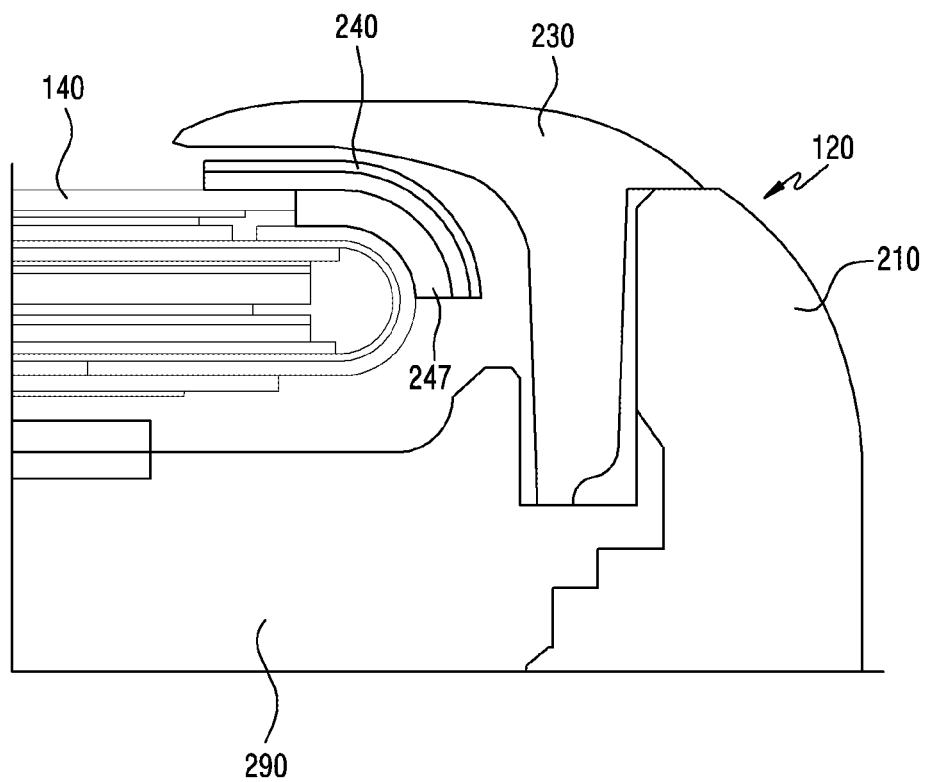
FIG. 20B is a cross-sectional view illustrating a conductive member disposed adjacent to a display according to various embodiments.
Figure 20C:
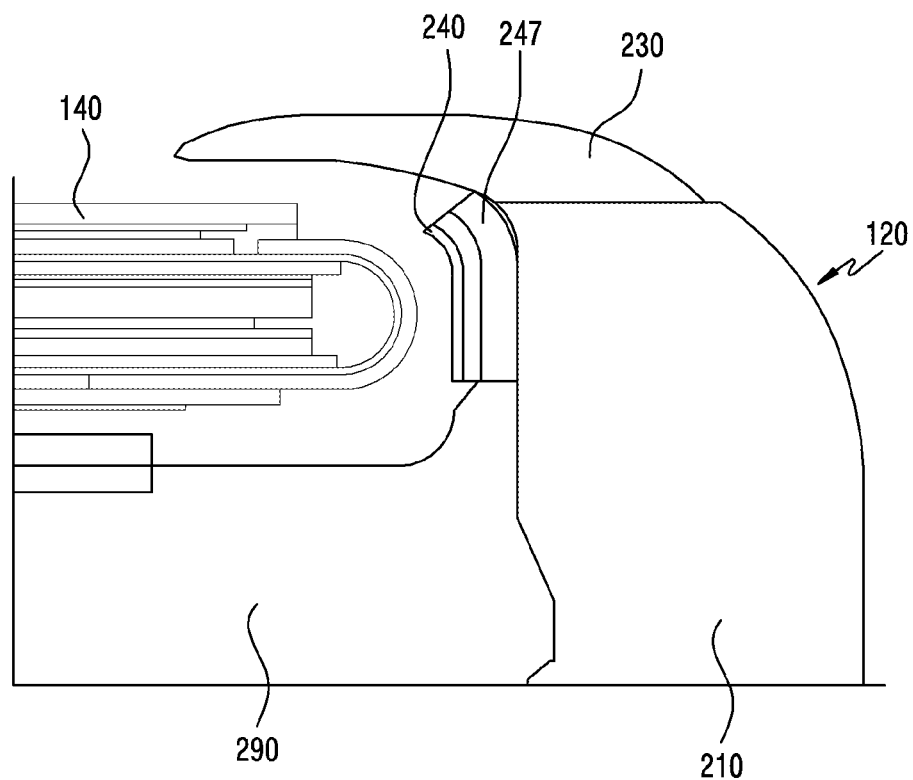
FIG. 20C is a cross-sectional view illustrating a conductive member disposed adjacent to a housing according to various embodiments.

FIG. 20A is a cross-sectional view of a conductive member disposed adjacent to a dielectric material according to various embodiments. FIG. 20B is a cross-sectional view of a conductive member disposed adjacent to a display according to various embodiments. FIG. 20C is a cross-sectional view of a conductive member disposed adjacent to a housing according to various embodiments.

Referring to FIGS. 20A, 20B and 20C together, an electronic device (e.g., the electronic device 100 in FIG. 1) according to an embodiment may include a second housing 120 including conductive portions 210, a display 140, a dielectric material 230 disposed to surround at least a portion of the perimeter of the display 140, a dielectric material 230, and a conductive member 240 disposed between the dielectric material 230 and the display 140.

According to an embodiment, at least a portion of the second housing 120 may include an injection-molded part 290 having a predetermined dielectric constant. According to an embodiment, the injection-molded part 290 may be formed of a non-conductive material.

According to an embodiment, the dielectric material 230 may be disposed between an edge (e.g., the fourth edge 120b in FIG. 2B) of the second housing 120 and the display 140.

Referring to FIG. 20A, the conductive member 240 according to an embodiment may be disposed between the dielectric material 230 and the display 140 to be adjacent to the dielectric material 230. For example, the conductive member 240 may be disposed to be attached to one surface of the dielectric material 230 that faces the display 140.

Referring to FIG. 20B, the conductive member 240 according to an embodiment may be disposed between the dielectric material 230 and the display 140 to be adjacent to the display 140. For example, the conductive member 240 may be disposed to be attached to one surface of the display 140 that faces the dielectric material 230.

According to an embodiment, the conductive member 240 may be attached to one surface of the display 140 that faces the dielectric material 230 via an adhesive member 247 (or a support member).

Referring to FIG. 20C, the conductive member 240 according to an embodiment may be disposed adjacent to the second housing 120. According to an embodiment, the conductive member 240 may be disposed adjacent to an edge of the second housing 120. For example, the conductive member 240 may be disposed to be attached to one surface that is adjacent to an edge (e.g., the fourth edge 120b in FIG. 2B) of the second housing 120 and faces the inside of the electronic device.

According to an embodiment, the conductive member 240 may be attached to the one surface that is adjacent to an edge of the second housing 120 and faces the inside of the electronic device via the adhesive member 247 (or a support member).

Figure 21A:
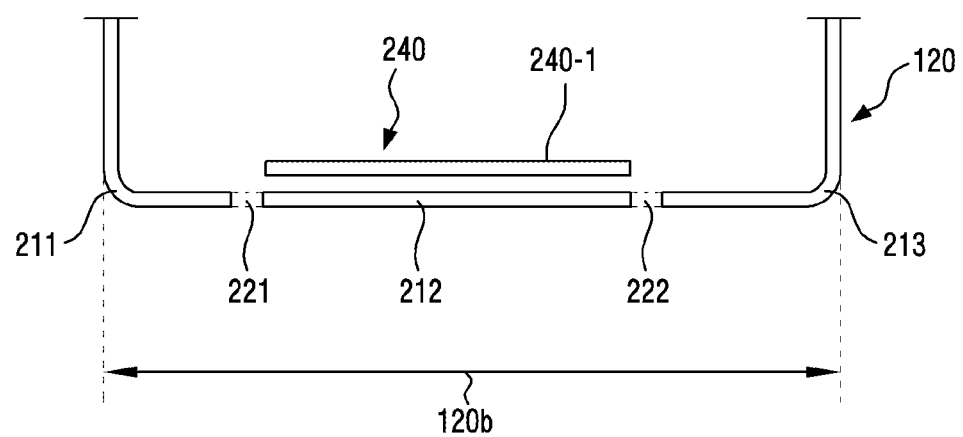
FIG. 21A is a diagram illustrating a housing including a plurality of non-conductive portions and a conductive member according to various embodiments.
Figure 21B:
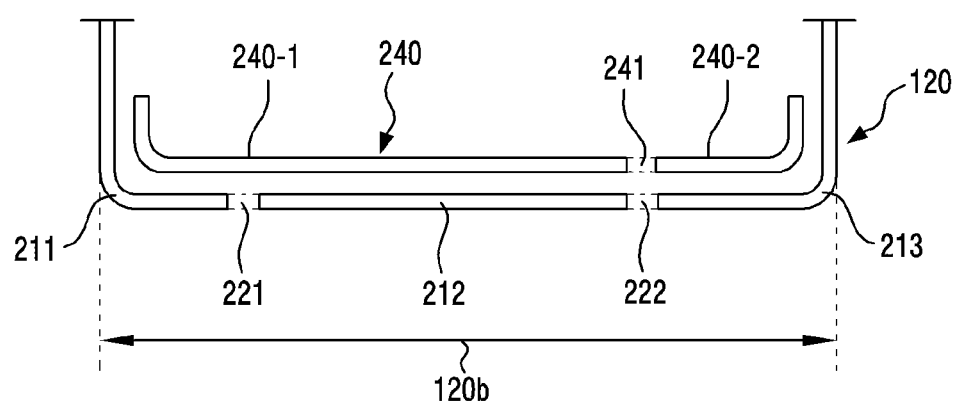
FIG. 21B is a diagram illustrating a housing including a plurality of non-conductive portions and a conductive member having a single split portion according to various embodiments.
Figure 21C:
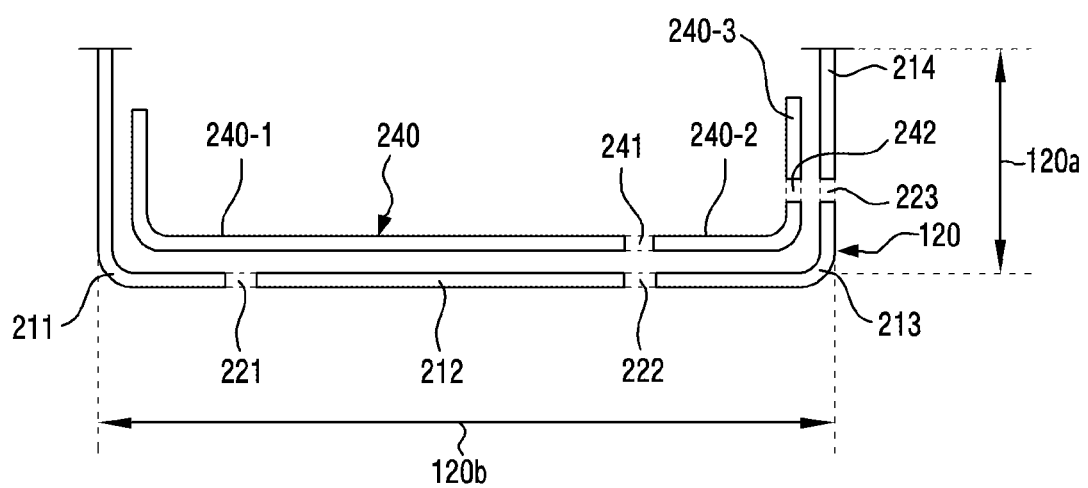
FIG. 21C is a diagram illustrating a housing including a plurality of non-conductive portions and a side non-conductive portion, and a conductive member including a split portion corresponding to at least one non-conductive portion according to various embodiments.
Figure 21D:
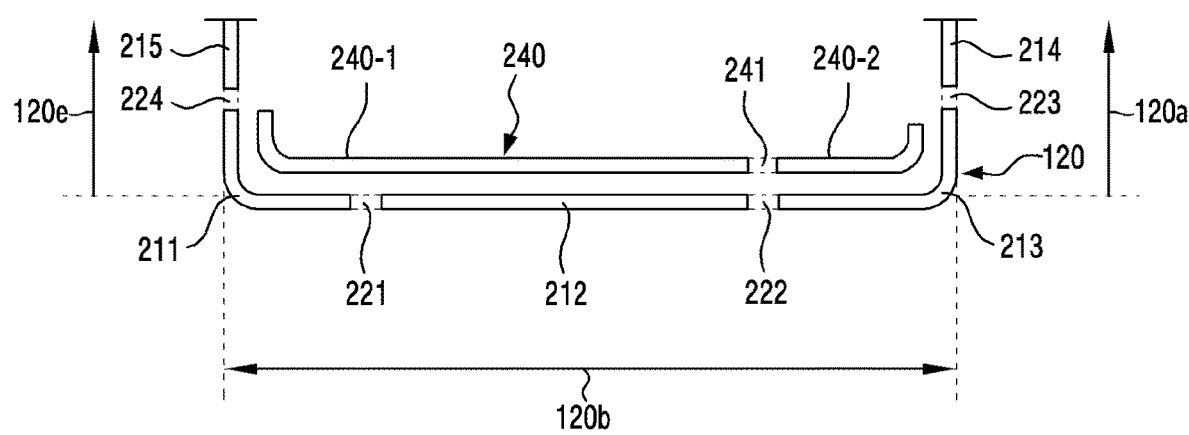
FIG. 21D is a diagram illustrating a housing including a plurality of non-conductive portions and a side non-conductive portion, and a conductive member including a split portion corresponding to at least one non-conductive portion according to various embodiments.
Figure 21E:
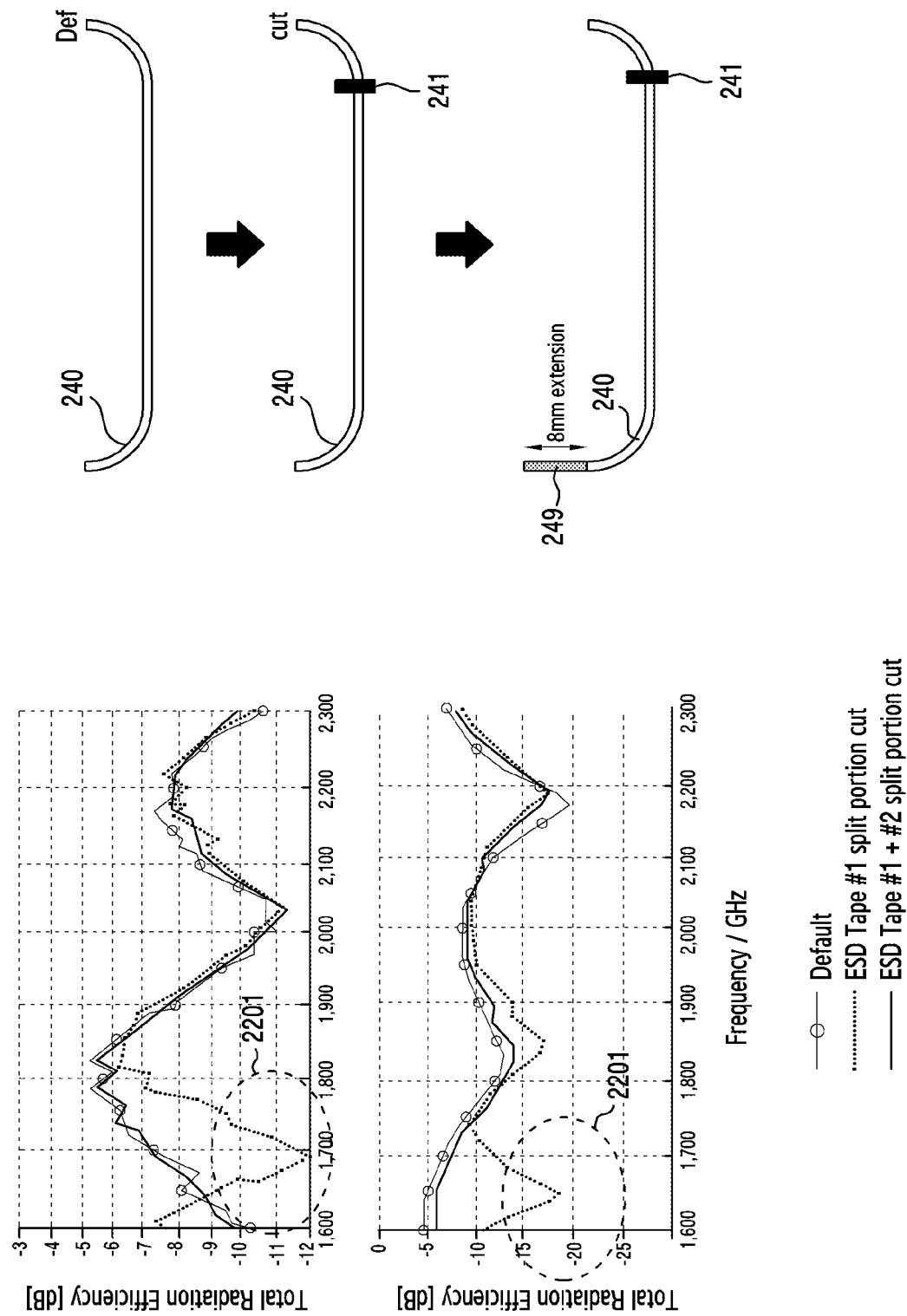
FIG. 21E includes graphs each showing antenna radiation efficiency according to a change in length of a conductive member according to various embodiments.

FIG. 21A is a diagram illustrating a housing including a plurality of non-conductive portions and a conductive member according to various embodiments. FIG. 21B is a diagram illustrating a housing including a plurality of non-conductive portions and a conductive member having a single split portion according to various embodiments. FIG. 21C is a diagram illustrating a housing including a plurality of non-conductive portions and a side non-conductive portion, and a conductive member including a split portion corresponding to at least one non-conductive portion according to various embodiments. FIG. 21D is a diagram illustrating a housing including a plurality of non-conductive portions and a side non-conductive portion, and a conductive member including a split portion corresponding to at least one non-conductive portion according to various embodiments. FIG. 21E includes graphs each showing antenna radiation efficiency according to a change in length of a conductive member according to various embodiments.

Referring to FIGS. 21A, 21B, 21C and 21D together, some of the edges of a second housing 120 according to an embodiment may include a plurality of conductive portions 211, 212, 213, and 214 and at least one non-conductive portion 221, 222, or 223. According to an embodiment, the conductive member 240 may include a plurality of conductive member portions 240-1, 240-2, and 240-3 and at least one split portion 241 or 242.

Referring to FIG. 21A, a fourth edge 120b of the second housing 120 according to an embodiment may include at least a portion of a first conductive portion 211, a first non-conductive portion 221, a second conductive portion 212, a second non-conductive portion 222, and at least a portion of a third conductive portion 213. According to an embodiment, the conductive member 240 may include a first conductive member portion 240-1 corresponding to the second conductive portion 212 of the second housing 120. According to an embodiment, the second conductive portion 212 of the second housing 120 and the first conductive member part 240-1 of the conductive member 240 may be disposed at positions corresponding to each other.

Referring to FIG. 21B, a fourth edge 120b of the second housing 120 according to an embodiment may include at least a portion of the first conductive portion 211, the first non-conductive portion 221, the second conductive portion 212, the second non-conductive portion 222, and at least a portion of the third conductive portion 213.

According to an embodiment, the conductive member 240 may include a first conductive member portion 240-1, a first split portion 241, and a second conductive member portion 240-2. According to an embodiment, the second non-conductive portion 222 of the second housing 120 and the first split portion 241 of the conductive member 240 may be disposed at positions corresponding to each other. For example, the first non-conductive portion 221 of the second housing 120 and the first split portion 241 of the conductive member 240 may be disposed to at least partially overlap each other.

According to an embodiment, one end of the first conductive member portion 240-1 may be disposed to correspond to the second non-conductive portion 222. The first conductive member portion 240-1 may correspond to or overlap at least a portion of the first conductive portion 211, the first non-conductive portion 221, or the second conductive portion 212. The second conductive member portion 240-2 may correspond to or overlap the third conductive portion 213.

Referring to FIG. 21C, the fourth edge 120b of the second housing 120 according to an embodiment may include at least a portion of the first conductive portion 211, the first non-conductive portion 221, the second conductive portion 212, the second non-conductive portion 222, and at least a portion of the third conductive portion 213. A third edge 120a of the second housing 120 according to an embodiment may include another portion of the second conductive portion 213, a third non-conductive portion 223, and at least a portion of a fourth conductive portion 214.

According to an embodiment, the conductive member 240 may include a first conductive member portion 240-1, a first split portion 241, a second conductive member portion 240-2, a second split portion 242, and a third conductive member portion 240-3.

According to an embodiment, at least some of the non-conductive portions 221, 222, and 223 of the second housing 120 may be provided to respectively correspond to the split portions 241 and 242 of the conductive member 240. For example, the second non-conductive portion 222 of the second housing 120 and the first split portion 241 of the conductive member 240 may be disposed at positions corresponding to each other. As another example, the third non-conductive portion 223 of the second housing 120 and the second split portion 242 of the conductive member 240 may be disposed to at least partially overlap each other.

According to an embodiment, the first conductive member portion 240-1 may correspond to or overlap at least a portion of the first conductive portion 211, the first non-conductive portion 221, or the second conductive portion 212. The second conductive member portion 240-2 may correspond to or overlap the third conductive portion 213. The third conductive member portion 240-3 may correspond to or overlap the fourth conductive portion 214.

Referring to FIG. 21D, a fourth edge 120b of the second housing 120 according to an embodiment may include at least a portion of the first conductive portion 211, the first non-conductive portion 221, the second conductive portion 212, the second non-conductive portion 222, and at least a portion of the third conductive portion 213. A third edge 120a of the second housing 120 according to an embodiment may include a portion of the third conductive portion 213, a third non-conductive portion 223, and a fourth conductive portion 214. According to an embodiment, a fifth edge 120e of the second housing 120 perpendicular to the fourth edge 120b and substantially parallel to the third edge 120a may include a portion of the first conductive portion 211, a fourth non-conductive portion 224, and a fifth conductive portion 215.

According to an embodiment, the conductive member 240 may include a first conductive member portion 240-1, a first split portion 241, and a second conductive member portion 240-2.

According to an embodiment, at least some of the non-conductive portions 221, 222, and 223 of the second housing 120 may be provided to respectively correspond to the split portions 241 and 242 of the conductive member 240. For example, the second non-conductive portion 222 of the second housing 120 and the first split portion 241 of the conductive member 240 may be disposed at positions corresponding to each other. As another example, the third non-conductive portion 223 of the second housing 120 and the second split portion 242 of the conductive member 240 may be disposed to at least partially overlap each other.

According to an embodiment, one end of the first conductive member portion 240-1 may be disposed to correspond to the fourth non-conductive portion 224. According to an embodiment, one end of the second conductive member portion 240-2 may be disposed to correspond to the third non-conductive portion 223.

According to an embodiment, the first conductive member portion 240-1 may correspond to or overlap at least a portion of the first conductive portion 211, the first non-conductive portion 221, or the second conductive portion 212. The second conductive member portion 240-2 may correspond to or overlap the third conductive portion 213.

Referring to FIG. 21E, since the conductive member 240 according to an embodiment includes an extension portion 249 extending from one end thereof, antenna radiation performance may be improved.

According to an embodiment, when the conductive member 240 includes the first split portion 241, parasitic resonance 2201 may occur compared to the case in which the conductive member 240 does not include the first split portion 241. According to an embodiment, when the conductive member 240 includes the first segment part 241, the antenna radiation performance may be deteriorated since parasitic resonance 2201 occurs in a predetermined frequency band. For example, when the conductive member 240 includes the first split portion 241, parasitic resonance 2201 occurs in the frequency band of about 1600 MHz to about 1700 MHz, and thus antenna radiation performance may be deteriorated.

According to an embodiment, when the conductive member 240 includes the first split portion 241 and the extension portion 249 extending from one end of the conductive member 240, parasitic resonance 2201, which occurs when the conductive member 240 only includes the first split portion 241 without including the extension portion 249, may not occur.

According to an embodiment, since the conductive member 240 includes the first split portion 241 and the extension portion 249, it is possible to prevent/reduce the occurrence of parasitic resonance 2201 and to prevent/reduce deterioration of antenna performance.

Figure 22:
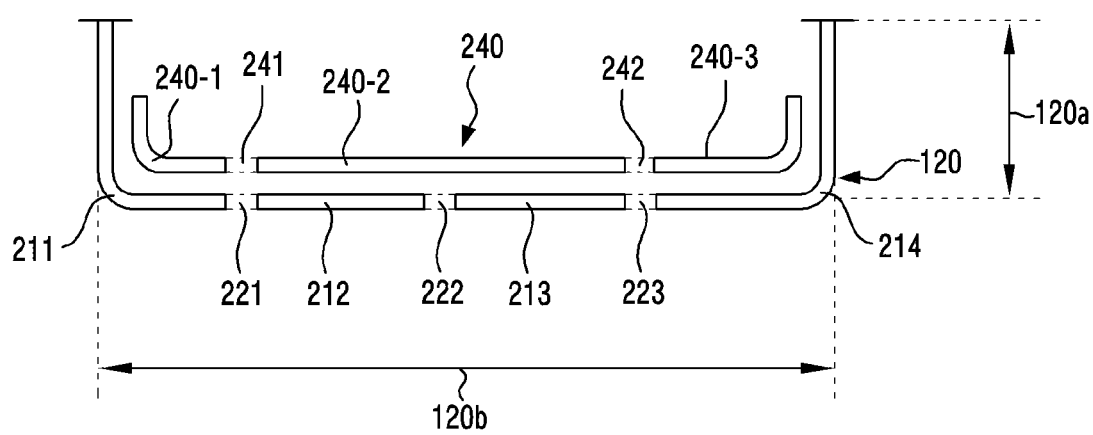
FIG. 22 is a diagram illustrating a housing including three or more non-conductive portions and a conductive member having a split portion corresponding to at least one non-conductive portion according to various embodiments.

FIG. 22 is a diagram illustrating a housing including three or more non-conductive portions and a conductive member having a split portion corresponding to at least one non-conductive portion according to various embodiments.

Referring to FIG. 22, the fourth edge 120b of the second housing 120 according to an embodiment may include at least a portion of a first conductive portion 211, a first non-conductive portion 221, a second conductive portion 212, a second non-conductive portion 222, a third conductive portion 213, a third non-conductive portion 223, and a portion of a fourth conductive portion 214. According to an embodiment, the third edge 120a of the second housing 120 may include a portion of the fourth conductive portion 214.

According to an embodiment, the conductive member 240 may include a first conductive member portion 240-1, a first split portion 241, a second conductive member portion 240-2, a second split portion 242, or a third conductive member portion 240-3.

According to an embodiment, at least some of the non-conductive portions 221, 222, and 223 of the second housing 120 may be provided to respectively correspond to the split portions 241 and 242 of the conductive member 240. For example, the first non-conductive portion 221 of the second housing 120 and the first split portion 241 of the conductive member 240 may be disposed at positions corresponding to each other. As another example, the third non-conductive portion 223 of the second housing 120 and the second split portion 242 of the conductive member 240 may be disposed to at least partially overlap each other.

Figure 23A:
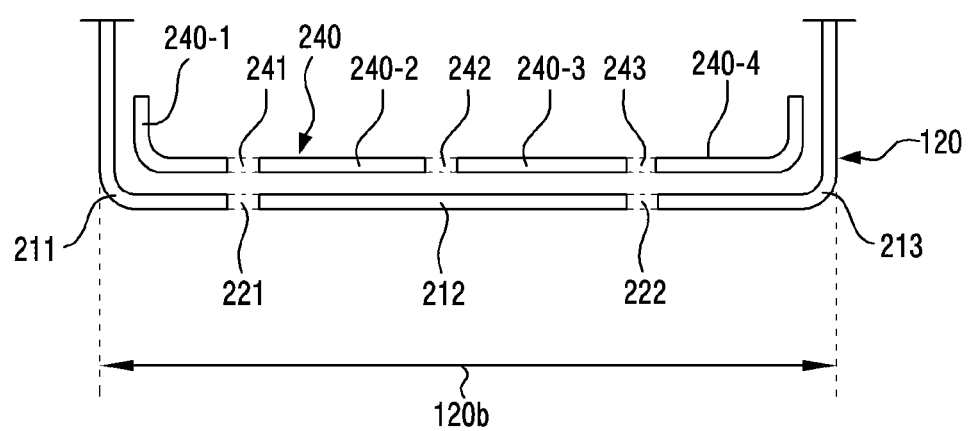
FIG. 23A is a diagram illustrating a housing including a conductive member including a plurality of split portions and non-conductive portions corresponding to at least some of the plurality of split portions according to various embodiments.
Figure 23B:
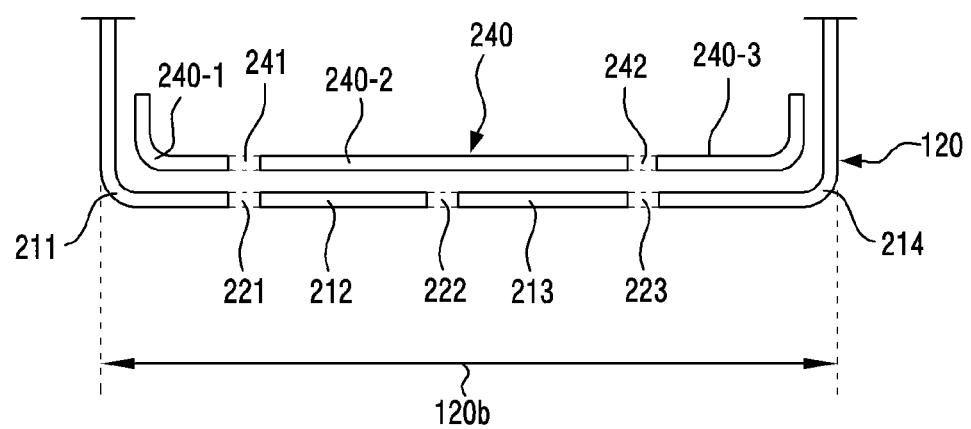
FIG. 23B is a diagram illustrating a housing including a plurality of non-conductive portions and a conductive member including split portions corresponding to at least some of the plurality of non-conductive portions according to various embodiments.
Figure 23C:
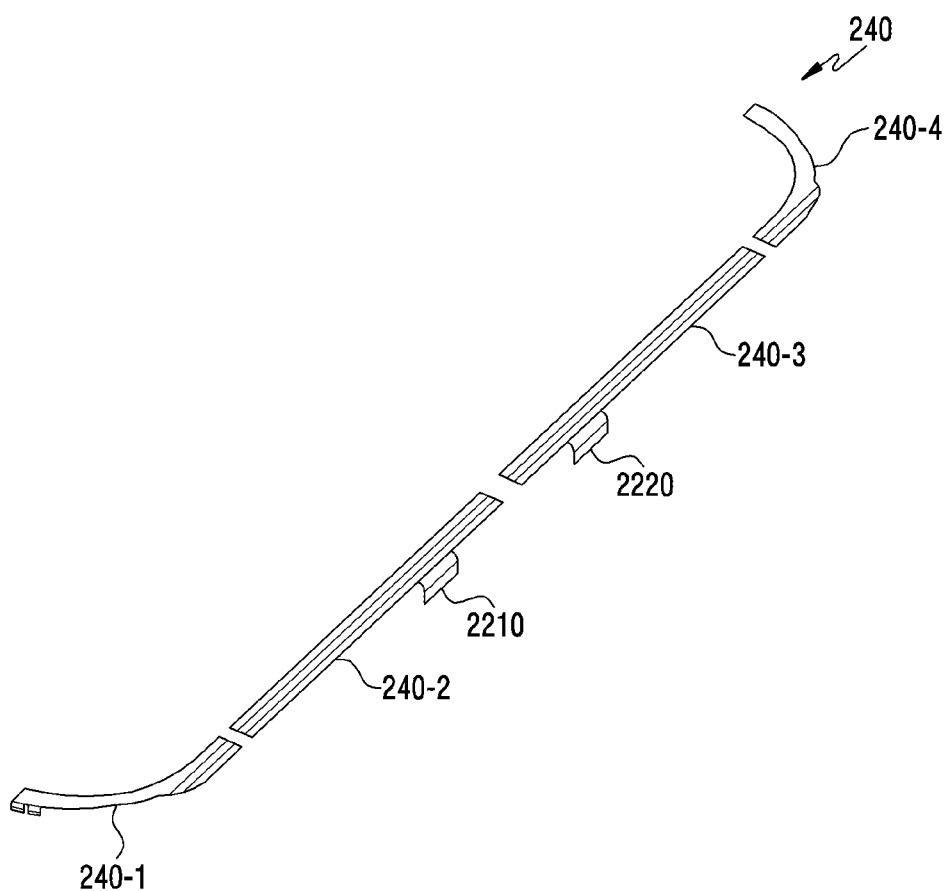
FIG. 23C is a diagram illustrating a conductive member in which protrusions are provided according to various embodiments.

FIG. 23A is a diagram illustrating a housing including a conductive member including a plurality of split portions and non-conductive portions corresponding to at least some of the plurality of split portions according to various embodiments. FIG. 23B is a diagram illustrating a housing including a plurality of non-conductive portions and a conductive member including split portions corresponding to at least some of the plurality of non-conductive portions according to various embodiments. FIG. 23C is a diagram illustrating a conductive member in which protrusions are provided according to various embodiments.

Referring to FIG. 21A, a fourth edge 120b of the second housing 120 according to an embodiment may include at least a portion of a first conductive portion 211, a first non-conductive portion 221, a second conductive portion 212, a second non-conductive portion 222, and/or a third conductive portion 213. According to an embodiment, the conductive member 240 may include a plurality of conductive member portions 240-1, 240-2, 240-3, and 240-4 and at least one split portion 241, 242, or 243.

Referring to FIG. 23A, a fourth edge 120b of the second housing 120 according to an embodiment may include at least a portion of a first conductive portion 211, a first non-conductive portion 221, a second conductive portion 212, a second non-conductive portion 222, and at least a portion of a third conductive portion 213.

According to an embodiment, the conductive member 240 may include a first conductive member portion 240-1, a first split portion 241, a second conductive member portion 240-2, a second split portion 242, a third conductive member portion 240-3, a third split portion 243, and a fourth conductive member portion 240-4.

According to an embodiment, at least some of the split portions 241, 242, and 243 of the conductive member 240 may be provided to respectively correspond to the non-conductive portions 221 and 222 of the housing 120. According to an embodiment, the first non-conductive portion 221 of the second housing 120 and the first split portion 241 of the conductive member 240 may be disposed at positions corresponding to each other. For example, the first non-conductive portion 221 of the second housing 120 and the first split portion 241 of the conductive member 240 may be disposed to at least partially overlap each other.

According to an embodiment, the second non-conductive portion 222 of the second housing 120 and the third split portion 243 of the conductive member 240 may be disposed at positions corresponding to each other. For example, the second non-conductive portion 222 of the second housing 120 and the third split portion 243 of the conductive member 240 may be disposed to at least partially overlap each other.

According to an embodiment, the first conductive member portion 240-1 of the conductive member 240 may be provided to overlap at least a portion of the first conductive portion 211 of the second housing 120. According to an embodiment, the second conductive member portion 240-2 and the third conductive member portion 240-3 of the conductive member 240 may be provided to overlap at least a portion of the second conductive portion 212 of the second housing 120. According to an embodiment, the fourth conductive member portion 240-4 of the conductive member 240 may be provided to overlap at least a portion of the third conductive portion 213 of the second housing 120.

According to an embodiment, the second split portion 242 of the conductive member 240 may be provided to correspond to at least a portion of the second conductive portion 212 of the second housing 120.

Referring to FIG. 23B, the fourth edge 120b of the second housing 120 according to an embodiment may include at least a portion of the first conductive portion 211, the first non-conductive portion 221, the second conductive portion 212, the second non-conductive portion 222, the third conductive portion 213, the third non-conductive portion 223, and the fourth conductive portion 214.

According to an embodiment, the conductive member 240 may include a first conductive member portion 240-1, a first split portion 241, a second conductive member portion 240-2, a second split portion 242, and a third conductive member portion 240-3.

According to an embodiment, at least some of the non-conductive portions 221, 222, and 223 of the second housing 120 may be provided to respectively correspond to the split portions 241 and 242 of the conductive member 240. For example, the first non-conductive portion 221 of the second housing 120 and the first split portion 241 of the conductive member 240 may be disposed at positions corresponding to each other. As another example, the first non-conductive portion 221 of the second housing 120 and the first split portion 241 of the conductive member 240 may be disposed to at least partially overlap each other. As another example, the third non-conductive portion 223 of the second housing 120 and the second split portion 242 of the conductive member 240 may be disposed to at least partially overlap each other.

According to an embodiment, the first conductive member portion 240-1 of the conductive member 240 may be provided to overlap at least a portion of the first conductive portion 211 of the second housing 120. According to an embodiment, at least a portion of the second conductive member portion 240-2 of the conductive member 240 may be provided to overlap at least a portion of the second conductive portion 212 and the third conductive portion 213 of the second housing 120. According to an embodiment, the third conductive member portion 240-3 of the conductive member 240 may be provided to overlap at least a portion of the fourth conductive portion 214 of the second housing 120.

According to an embodiment, the second non-conductive portion 222 of the second housing 120 may be provided to correspond to at least a portion of the second conductive member portion 240-2 of the conductive member 240.

Referring to FIG. 23C, the second conductive member portion 240-2 of the conductive member 240 according to an embodiment may include a first protrusion 2210, and the third conductive member portion 240-3 may include a second protrusion 2220.

According to an embodiment, the first protrusion 2210 may provide a discharge path such that discharge occurring at a position adjacent to the second conductive member portion 240-2 flows to the second conductive portion 212. In an example, by being located closer to the second conductive portion 212 than other portions of the second conductive member portion 240-2, the first protrusion 2210 may prevent/reduce electrostatic discharge more effectively.

According to an embodiment, the second protrusion 2220 may provide a discharge path such that discharge occurring at a position adjacent to the third conductive member portion 240-3 flows to the third conductive portion 213. In an example, by being located closer to the third conductive portion 213 than other portions of the second conductive member portion 240-3, the second protrusion 2220 may prevent/reduce electrostatic discharge more effectively.

Figure 24A:
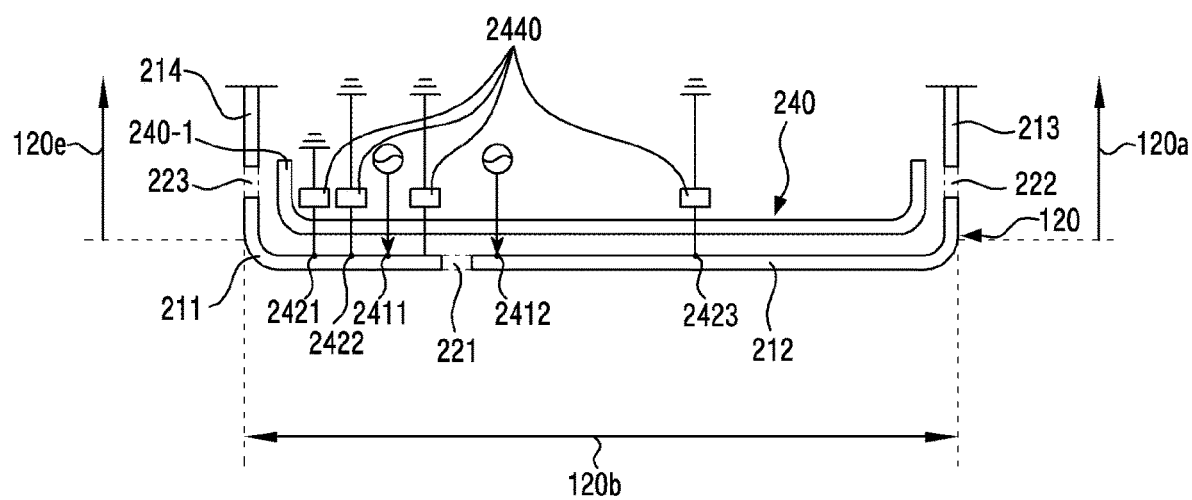
FIG. 24A is a diagram illustrating a housing including a non-conductive portion and a conductive member according to various embodiments.
Figure 24B:
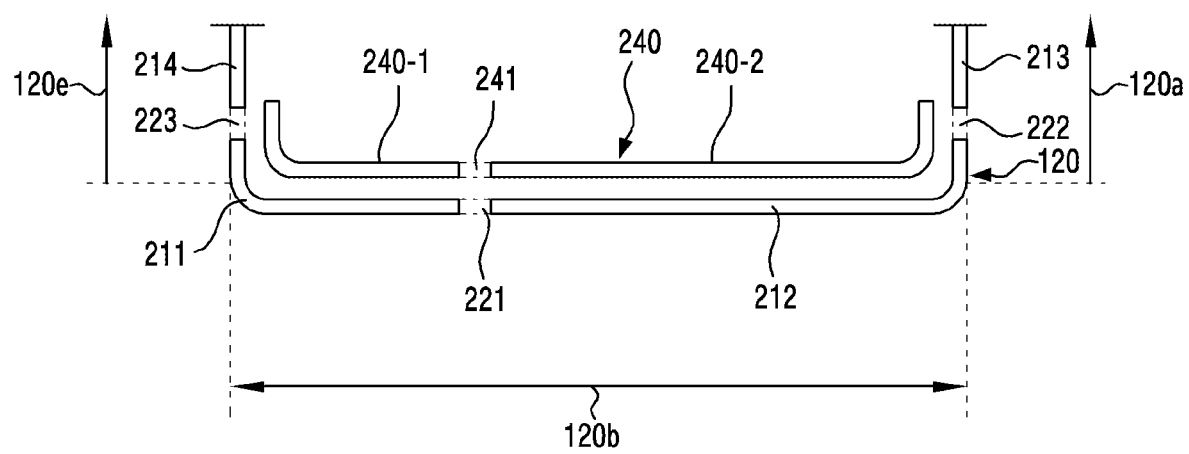
FIG. 24B is a diagram illustrating a housing including a non-conductive portion and a conductive member including a split portion corresponding to at least a portion of the non-conductive portion according to various embodiments.
Figure 24C:
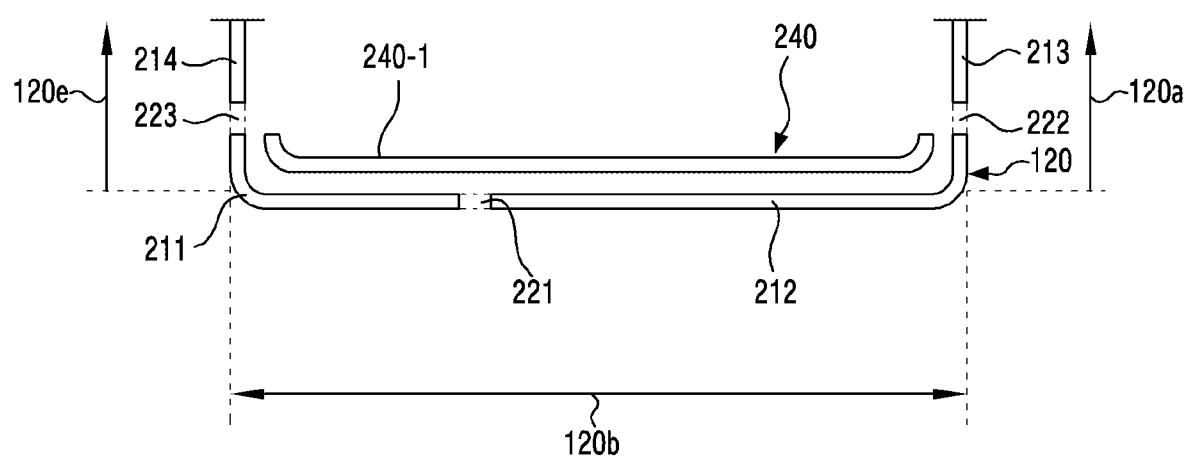
FIG. 24C is a diagram illustrating a housing including a non-conductive portion and a conductive member according to various embodiments.
Figure 24D:
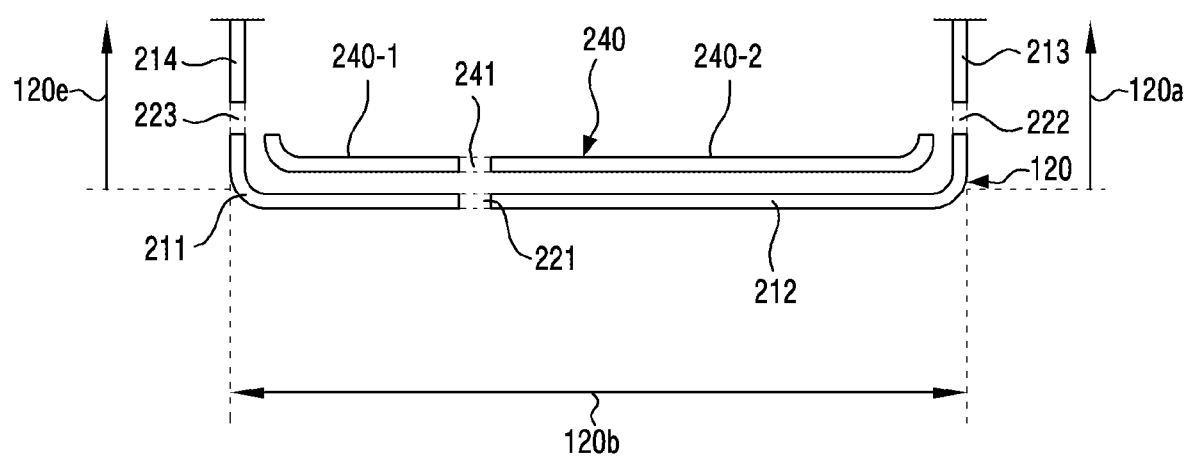
FIG. 24D illustrates a housing including a non-conductive portion and a conductive member is a diagram illustrating a split portion corresponding to at least a portion of the non-conductive portion according to various embodiments.
Figure 24E:
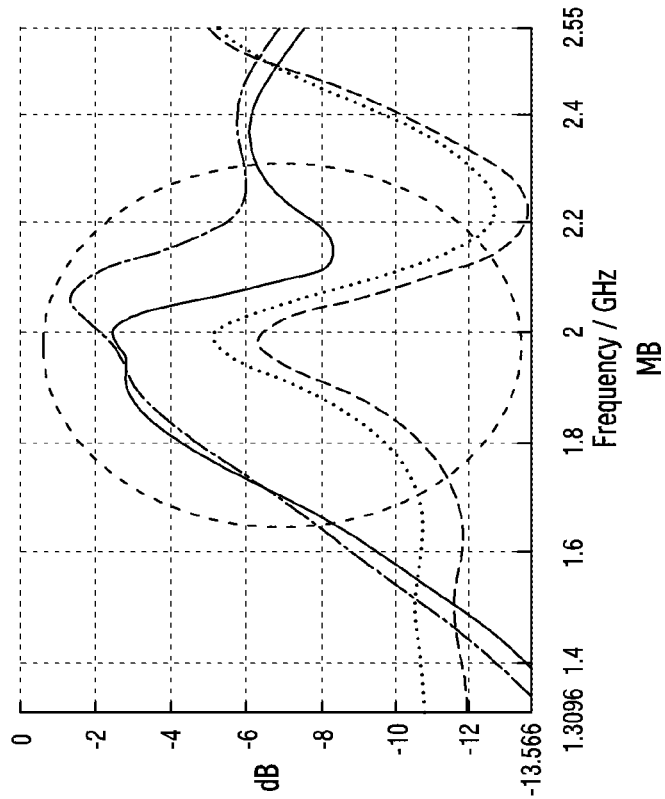
FIG. 24E includes graphs each showing antenna radiation performance according to alignment of a non-conductive portion of a housing and a split portion of a conductive member according to various embodiments.
Figure 24E:
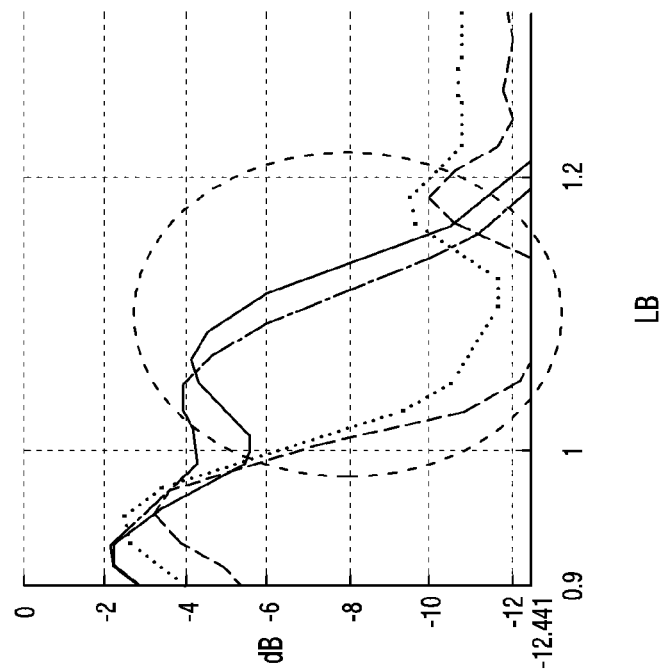

FIG. 24A is a diagram illustrating a housing including a non-conductive portion and a conductive member according to various embodiments. FIG. 24B is a diagram illustrating a housing including a non-conductive portion and a conductive member including a split portion corresponding to at least a portion of the non-conductive portion according to various embodiments. FIG. 24C is a diagram illustrating a housing including a non-conductive portion and a conductive member according to various embodiments. FIG. 24D is a diagram illustrating a housing including a non-conductive portion and a conductive member including a split portion corresponding to at least a portion of the non-conductive portion according to various embodiments. FIG. 24E includes graphs each showing antenna radiation performance according to alignment of a non-conductive portion of a housing and a split portion of a conductive member according to various embodiments.

Referring to FIG. 24A, the fourth edge 120b of the second housing 120 according to an embodiment may include at least a portion of a first conductive portion 211, a first non-conductive portion 221, and at least a portion of a second conductive portion 212. The third edge 120a of the second housing 120 according to an embodiment may include another portion of the second conductive portion 212, a second non-conductive portion 222, and a third conductive portion 213. According to an embodiment, the fifth edge 120e of the second housing 120 perpendicular to the fourth edge 120b and parallel to the third edge 120a may include another portion of the first conductive portion 211, a third non-conductive portion 223, and a fourth conductive portion 214.

According to an embodiment, the electronic device may include a conductive member 240 disposed adjacent to the second housing 120.

According to an embodiment, a wireless communication circuit (not illustrated) may transmit/receive a signal in a predetermined frequency band by feeding power to the first conductive portion 211 and the second conductive portion 212. For example, by feeding power to the first conductive portion 211 and the second conductive portion 212, the wireless communication circuit may use the first conductive portion 211 and the second conductive portion 212 as antenna radiators.

According to an embodiment, the wireless communication circuit may transmit/receive a signal in a predetermined frequency band by feeding power to a first point 2411 of the first conductive portion 211. According to an embodiment, the wireless communication circuit may transmit/receive a signal in a predetermined frequency band by feeding power to a second point 2412 of the first conductive portion 212.

According to an embodiment, the first conductive portion 211 and the second conductive portion 212 of the second housing 120 may be electrically connected to a ground. According to an embodiment, the first conductive portion 211 may be electrically connected to a ground via a first ground point 2421 and/or a second ground point 2422. According to an embodiment, the second conductive portion 212 may be electrically connected to a ground via a third ground point 2423.

According to an embodiment, the first conductive portion 211 and the second conductive portion 212 of the second housing 120 may be electrically connected to a ground via at least one electronic element 2440. At least one electronic element 2440 according to an embodiment may be referred to as one of a matching circuit, a switch, or a tuner. For example, the at least one electronic element 2440 may be referred to as a matching circuit, and an antenna radiation characteristic via the first conductive portion 211 and the second conductive portion 212 may be controlled through the matching circuit. Alternatively, in FIG. 24A, the electronic element 2440 may be referred to as a plurality of matching circuits having different structures.

The feeding structure and the ground connection structure of FIG. 24A may be equally applied to FIGS. 24B, 24C, and 24D.

Referring to FIG. 24B, an edge of the second housing 120 according to an embodiment may include a first conductive portion 211, a first non-conductive portion 221, and a second conductive portion 212. The third edge 120a of the second housing 120 according to an embodiment may include a portion of the second conductive portion 212, a second non-conductive portion 222, and a third conductive portion 213. According to an embodiment, the fifth edge 120e of the second housing 120 perpendicular to the fourth edge 120b and parallel to the third edge 120a may include another portion of the first conductive portion 211, a third non-conductive portion 223, and a fourth conductive portion 214.

According to an embodiment, the conductive member 240 disposed adjacent to the second housing 120 may include a first conductive member portion 240-1, a first split portion 241, and a second conductive member portion 240-2.

According to an embodiment, the first non-conductive portion 221 of the second housing 120 and the first split portion 241 of the conductive member 240 may be disposed at positions corresponding to each other. For example, the first non-conductive portion 221 of the second housing 120 and the first split portion 241 of the conductive member 240 may be disposed to at least partially overlap each other.

Referring to FIG. 24C, one end of the conductive member 240 according to an embodiment may be provided to correspond to the third non-conductive portion 223. The other end of the conductive member 240 according to an embodiment may be provided to correspond to the second non-conductive portion 222.

Referring to FIG. 24D, the conductive member 240 according to an embodiment may include a first conductive member portion 240-1, a first split portion 241, and a second conductive member portion 240-2.

According to an embodiment, one end of the first conductive member portion 240-1 of the conductive member 240 may be provided to correspond to the third non-conductive portion 223. According to an embodiment, one end of the second conductive member portion 240-2 of the conductive member 240 may be provided to correspond to the second non-conductive portion 222. According to an embodiment, the first split portion 241 of the conductive member 240 may be provided to correspond to the first non-conductive portion 221 of the second housing 120.

Referring to FIG. 24E, antenna radiation performance according to an embodiment may vary depending on the alignment of the split portion of the conductive member 240 and the non-conductive portions 221, 222, and 223 of the second housing 120.

Referring to FIGS. 24B, 24C, and 24E together, in providing a split portion 241, 242, or 243 of the conductive member 240 and a non-conductive portion 221, 222, or 223 of the second housing 120 according to an embodiment to correspond to each other, the antenna radiation efficiency may be increased as a corresponding area between the split portion and the non-conductive portion is spaced apart from a point (e.g., the first point 2411) fed with power from the wireless communication circuit.

For example, compared to the case in which the first split portion 241 of the conductive member 240 and the first non-conductive portion 221 of the second housing 120 are provided to correspond to each other (e.g., FIG. 24B), the antenna radiation efficiency may be improved when the conductive member 240 is provided such that one end corresponds to the third non-conductive portion 223 and the other end corresponds to the second non-conductive portion 222 (e.g., FIG. 24C).

According to an embodiment, compared to the case in which only the first split portion 241 of the conductive member 240 is provided to correspond to the first non-conductive portion 221 of the second housing 120 (e.g., FIG. 24B) or the case in which the conductive member 240 is provided such that one end corresponds to the third non-conductive portion 223 and the other end corresponds to the second non-conductive portion 222 (e.g., FIG. 24C), the antenna radiation efficient may be high when the conductive member 240 is provided such that one end corresponds to the third non-conductive portion 223 and the other end corresponds to the second non-conductive portion 222 while the first split portion 241 is provided to correspond to the first non-conductive portion 221 (e.g., FIG. 24D).

According to an embodiment, compared to the case in which the first split portion 241 of the conductive member 240 is provided to correspond to the first non-conductive portion 221 of the second housing 120 (e.g., FIG. 24B), the antenna radiation efficiency may be improved when the conductive member 240 is provided such that one end corresponds to the third non-conductive portion 223 and the other end corresponds to the second non-conductive portion 222 (e.g., FIG. 24C).

According to an embodiment, compared to the case in which the conductive member 240 is provided such that one end correspond to the third non-conductive portion 223 and the other end corresponds the second non-conductive portion 222 (e.g., FIG. 24C), the antenna radiation efficiency may be improved when the conductive member 240 is provided such that one end corresponds to the third non-conductive portion 223 and the other end corresponds to the second non-conductive portion 222 while the first split portion 241 is provided to correspond to the first non-conductive portion 221 (e.g., FIG. 24C).

According to an embodiment, when the split 241, 242, or 243 of the conductive member 240 and the non-conductive portions 221, 222, and 223 of the second housing 120 are provided at least partially not to correspond to each other, the bandwidth of a first frequency band (e.g., a low band (LB)) may decrease, and the antenna radiation performance in a second frequency band (e.g., a mid-band (MB)) may be deteriorated.

Figure 25A:
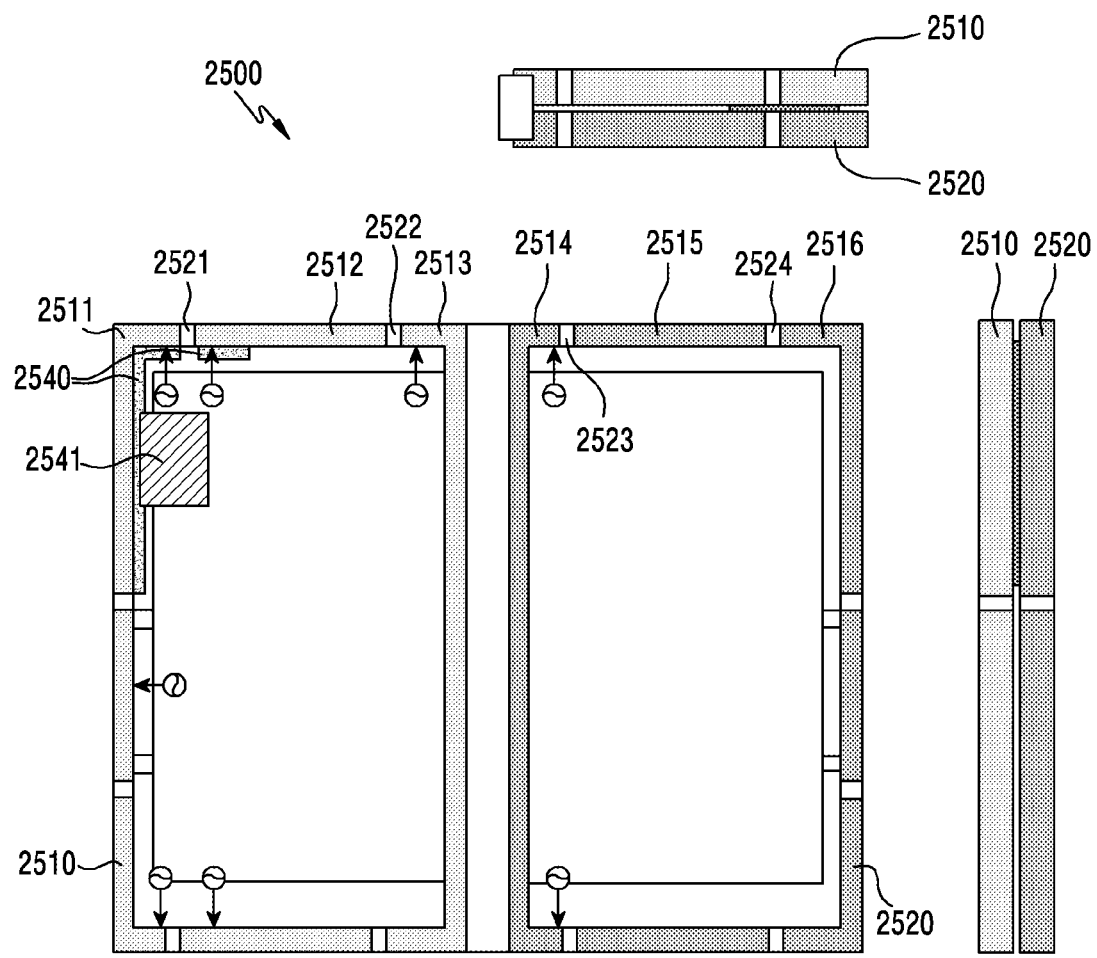
FIG. 25A is a diagram illustrating an electronic device including a conductive member provided to be adjacent to a conductive portion used as an antenna radiator when the electronic device is in an unfolded state, according to various embodiments.
Figure 25B:
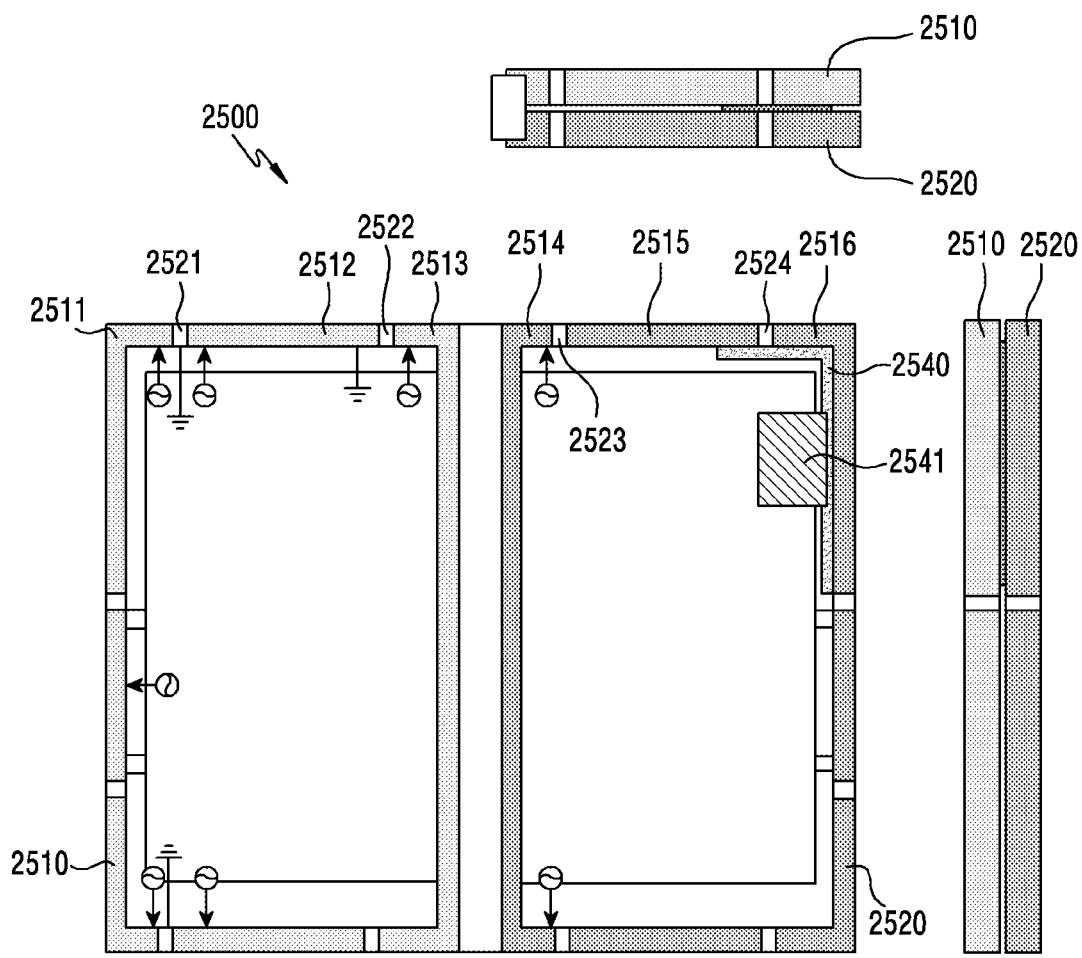
FIG. 25B is a diagram illustrating an electronic device including a conductive member provided to be adjacent to a conductive portion used as an antenna radiator when the electronic device is in a folded state, according to various embodiments.
Figure 25C:
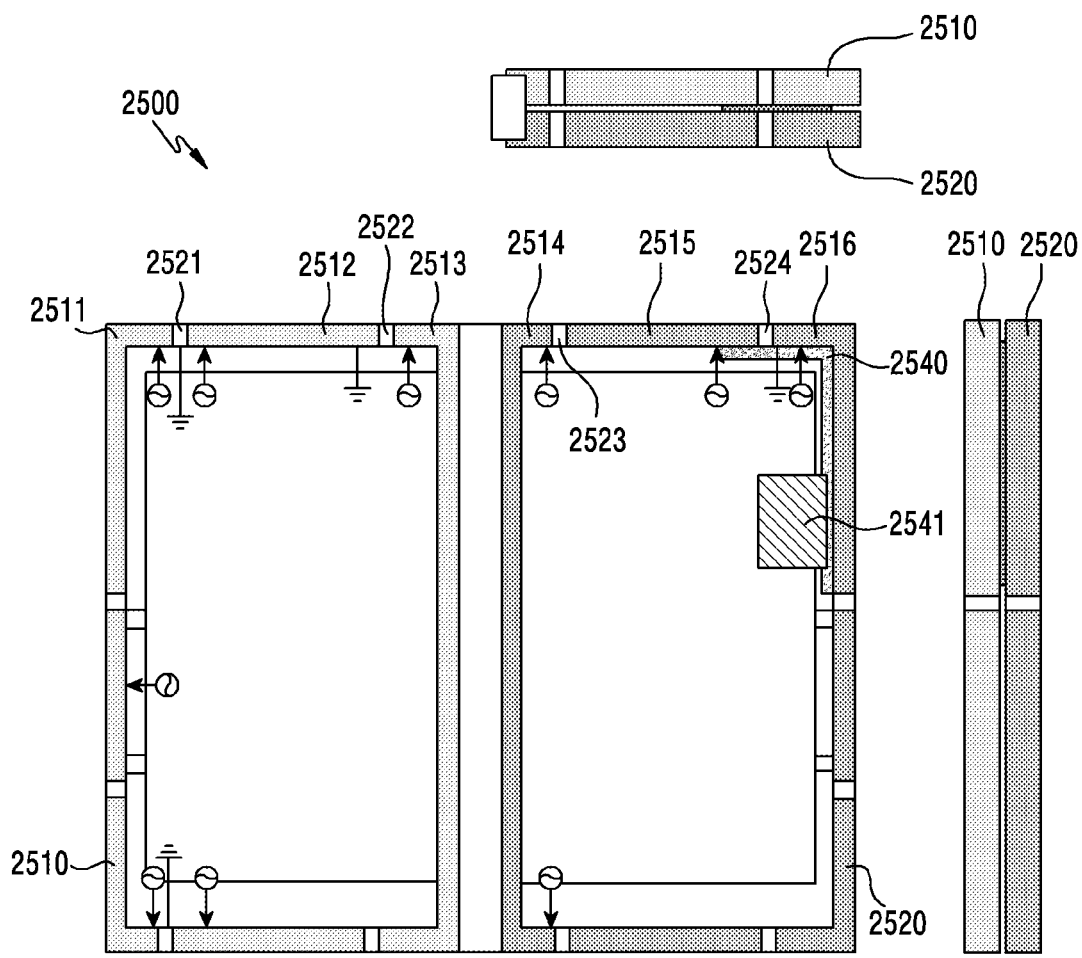
FIG. 25C is a diagram illustrating an electronic device including a conductive member formed to be adjacent to a conductive portion used as an antenna radiator when the electronic device is in an unfolded state and a folded state, according to various embodiments.

FIG. 25A is a diagram illustrating an electronic device including a conductive member provided to be adjacent to a conductive portion used as an antenna radiator when the electronic device is in an unfolded state, according to various embodiments. FIG. 25B is a diagram illustrating an electronic device including a conductive member provided to be adjacent to a conductive portion used as an antenna radiator when the electronic device is in a folded state, according to various embodiments. FIG. 25C is a diagram illustrating an electronic device including a conductive member formed to be adjacent to a conductive portion used as an antenna radiator when the electronic device is in an unfolded state and a folded state, according to various embodiments.

Referring to FIGS. 25A, 25B, and 25C together, the conductive member 2540 according to an embodiment may be disposed adjacent to the display circuit unit 2541 and a region that operates by being fed with power from a wireless communication circuit of the housing 2510 or 2520 depending on the folded or unfolded state of the electronic device 2500.

The electronic device 2500 of FIGS. 25A to 25B may be referred to as the electronic device 1500 of FIG. 15.

Referring to FIG. 25A, a wireless communication circuit (not illustrated) according to an embodiment may transmit/receive a signal in a predetermined frequency band by feeding power to the first conductive portion 2511 and the second conductive portion 2512 of the first housing 2510. By feeding power to the first conductive portion 2511 and the second conductive portion 2512 of the first housing 2510, the wireless communication circuit according to an embodiment may use the first conductive portion 2511 and the second conductive portion 2512 as antenna radiators.

According to an embodiment, the display circuit unit 2541 may be disposed adjacent to the first conductive portion 2511 and the second conductive portion 2512.

According to an embodiment, the conductive member 2540 (e.g., the conductive member 240 in FIG. 2A) may be disposed between the display circuit unit 2541 and the first conductive portion 2511 and/or the second conductive portion 2512. The conductive member 2540 according to an embodiment may be disposed between the display circuit unit 2541 and the first conductive portion 2511 and/or the second conductive portion 2512 to prevent/reduce electrostatic discharge to the display circuit unit 1541. For example, the conductive member 2540 may cause static electricity generated from a dielectric material (e.g., the dielectric material 230 in FIG. 2A) to flow to a portion of the conductive member 2540, the first conductive portion 2511, or the second conductive portion 2512, thereby preventing/reducing the static electricity from being transferred to the display circuit unit 2541.

Referring to FIG. 25B, a wireless communication circuit (not illustrated) according to an embodiment may transmit/receive a signal in a predetermined frequency band by feeding power to the first conductive portion 2511 and the second conductive portion 2512 of the first housing 2510. By feeding power to the first conductive portion 2511 and the second conductive portion 2512 of the first housing 2510, the wireless communication circuit according to an embodiment may use the first conductive portion 2511 and the second conductive portion 2512 as antenna radiators.

According to an embodiment, the display circuit unit 2541 may be disposed adjacent to the fifth conductive portion 2515 and the sixth conductive portion 2516 of the second housing 2520. According to an embodiment, when the electronic device 2500 is in a folded state, the display circuit unit 2541 may be disposed adjacent to the first conductive portion 2511 and the second conductive portion 2512 used as antenna radiators.

According to an embodiment, the conductive member 2540 may be disposed between the display circuit unit 2541 and the fifth conductive portion 2515 and/or the sixth conductive portion 2516.

The conductive member 2540 according to an embodiment may be disposed adjacent to the first conductive portion 2511 and the second conductive portion 2512 when the electronic device 2500 is in a folded state. According to an embodiment, when the electronic device 2500 is in a folded state, the conductive member 2540 may be disposed adjacent to the first conductive portion 2511 and the second conductive portion 2512, thereby preventing/reducing electrostatic discharge to the display circuit unit 1541. For example, the conductive member 2540 may cause static electricity generated from a dielectric material (e.g., the dielectric material 230 in FIG. 2A) to flow to a portion of the conductive member 2540, the fifth conductive portion 2515, or the sixth conductive portion 2516, thereby preventing/reducing the static electricity from being transferred to the display circuit unit 2541.

Referring to FIG. 25C, a wireless communication circuit (not illustrated) according to an embodiment may transmit/receive a signal in a predetermined frequency band by feeding power to the first conductive portion 2511 and the second conductive portion 2512 of the first housing 2510, and the fifth conductive portion 2515 and the sixth conductive portion 2516 of the second housing 2520. The wireless communication circuit according to an embodiment may use the first conductive portion 2511 and the second conductive portion 2512 of the first housing 2510, and the fifth conductive portion 2515 and the sixth conductive portion 2516 of the second housing 2520 as antenna radiators by feeding power thereto.

According to an embodiment, the display circuit unit 2541 may be disposed adjacent to the fifth conductive portion 2515 and the sixth conductive portion 2516 of the second housing 2520. According to an embodiment, when the electronic device 2500 is in a folded state, the display circuit unit 2541 may be disposed adjacent to the first conductive portion 2511 and the second conductive portion 2512 used as antenna radiators.

According to an embodiment, the conductive member 2540 may be disposed between the display circuit unit 2541 and the fifth conductive portion 2515 and/or the sixth conductive portion 2516.

The conductive member 2540 according to an embodiment may be disposed between the display circuit unit 2541 and the fifth conductive portion 2515 and/or the sixth conductive portion 2516 to prevent/reduce electrostatic discharge to the display circuit unit 1541. For example, the conductive member 2540 may cause static electricity generated from a dielectric material (e.g., the dielectric material 230 in FIG. 2A) to flow to a portion of the conductive member 2540, the fifth conductive portion 2515, and/or the sixth conductive portion 2516, thereby preventing/reducing the static electricity from being transferred to the display circuit unit 2541.

The conductive member 2540 according to an embodiment may be disposed adjacent to the first conductive portion 2511 and the second conductive portion 2512 when the electronic device is in a folded state.

According to an embodiment, when the electronic device is in a folded state, the conductive member 2540 may be disposed adjacent to the first conductive portion 2511 and the second conductive portion 2512, thereby preventing/reducing electrostatic discharge to the display circuit unit 1541. For example, the conductive member 2540 may cause static electricity generated from a dielectric material (e.g., the dielectric material 230 in FIG. 2A) to flow to a portion of the conductive member 2540, the fifth conductive portion 2515, or the sixth conductive portion 2516, thereby preventing/reducing the static electricity from being transferred to the display circuit unit 2541.

An electronic device according to an example embodiment may include: a first housing including a first edge oriented in a first direction and a second edge oriented in a second direction perpendicular to the first direction; a second housing rotatably connected to the first housing to the first housing, wherein the second housing includes a third edge corresponding to the first edge and a fourth edge corresponding to the second edge when the first housing and the second housing face each other; a flexible display defining a front surface of the electronic device and disposed over the first housing and the second housing; a dielectric material at least partially disposed between the flexible display and the fourth edge of the second housing and at least partially surrounding a perimeter of the flexible display; a conductive member comprising a conductive material located between the dielectric material and the flexible display; and a wireless communication circuit disposed within the first housing or the second housing, wherein the fourth edge may include a first conductive portion, a first non-conductive portion, a second conductive portion, a second non-conductive portion, and a third conductive portion, the conductive member may be provided with a first split portion and a second split portion corresponding to the first non-conductive portion and the second non-conductive portion of the fourth edge of the second housing, respectively, and the wireless communication circuit may be configured to transmit and/or receive a radio signal using at least one of the first conductive portion, the second conductive portion, or the third conductive portion of the second housing.

According to an example embodiment, the wireless communication circuit may be disposed on a printed circuit board, and the conductive member may be disposed between the dielectric material and the printed circuit board.

According to an example embodiment, the conductive member may include a first conductive member portion, a second conductive member portion, or a third conductive member portion.

According to an example embodiment, the first split portion or the second split portion may comprise a dielectric material having a specified dielectric constant.

According to an example embodiment, the first split portion and the second split portion may have a length of at least 0.5 mm According to an example embodiment, the flexible display may further include a display circuit unit disposed under the flexible display.

According to an example embodiment, the conductive member may comprise a tape including a flexible conductive adhesive layer.

According to an example embodiment, the second conductive member portion may include at least one protrusion.

According to an example embodiment, the at least one protrusion may include a plurality of first protrusions or a plurality of second protrusions.

According to an example embodiment, the at least one protrusion may include a first protrusion, and the first protrusion may extend from one end of the first conductive member portion to at least partially face the first conductive portion.

According to an example embodiment, the at least one protrusion may include a second protrusion, and the second protrusion may extend from one end of the first conductive member portion toward the first conductive portion to be adjacent to the first conductive portion.

According to an example embodiment, the first conductive member portion or the third conductive portion may include at least one protrusion.

According to an example embodiment, the at least one protrusion may include a first protrusion, and the first protrusion may extend from one end of the first conductive member portion to at least partially face the first conductive portion. According to an example embodiment, the at least one protrusion may include a second protrusion, and the second protrusion may extend from one end of the first conductive member portion toward the first conductive portion to be adjacent to the first conductive portion.

According to an example embodiment, the second conductive portion may be include a first feeding point, and the first protrusion included in the second conductive member portion may be provided at one point of the second conductive member portion to be spaced apart from the first feeding point.

An electronic device according to an example embodiment may include: a housing including a first edge oriented in a first direction and a second edge oriented in a second direction perpendicular to the first direction; a display defining a front surface of the electronic device; a dielectric material at least partially disposed between the display and the second edge of the housing and at least partially surrounding a perimeter of the display; a conductive member comprising a conductive material located between the dielectric material and the display; and a wireless communication circuit disposed within the housing, wherein the second edge may include a first conductive portion, a second conductive portion, and a first non-conductive portion disposed between the first conductive portion and the second conductive portion, the conductive member may be provided with a first split portion corresponding to the first non-conductive portion of the second edge of the housing, and the wireless communication circuit may be configured to transmit and/or receive a radio signal using at least one of the first conductive portion and the second conductive portion of the housing.

According to an example embodiment, the conductive member may include a first conductive member portion or a second conductive member portion.

According to an example embodiment, the first split portion may comprise a dielectric material having a specified dielectric constant.

According to an example embodiment, the electronic device may further include a display circuit disposed under the display.

According to an example embodiment, the first conductive member portion or the second conductive member portion may include at least one protrusion.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing, including a first edge oriented in a first direction and a second edge oriented in a second direction perpendicular to the first direction;
   a second housing rotatably connected to the first housing to be rotatable relative to the first housing,
      wherein the second housing includes a third edge corresponding to the first edge and a fourth edge corresponding to the second edge when the first housing and the second housing face each other, and
      the fourth edge includes a first conductive portion, a first non-conductive portion, a second conductive portion, a second non-conductive portion, and a third conductive portion;
   a flexible display defining a front surface of the electronic device and disposed over the first housing and the second housing;
   a dielectric material at least partially disposed between the flexible display and the fourth edge and at least partially surrounding a perimeter of the flexible display;
   a conductive member comprising a conductive material located between the dielectric material and the flexible display; and
   a wireless communication circuit disposed within the first housing or the second housing,
   wherein the conductive member includes a first split portion and a second split portion corresponding to the first non-conductive portion and the second non-conductive portion of the fourth edge of the second housing, respectively, and
   the wireless communication circuit is configured to transmit and/or receive a radio signal using at least one of the first conductive portion, the second conductive portion, or the third conductive portion of the second housing.

2. The electronic device of claim 1, wherein the wireless communication circuit is disposed on a printed circuit board, and
   the conductive member is disposed between the dielectric material and the printed circuit board.

3. The electronic device of claim 1, wherein the conductive member includes a first conductive member portion, a second conductive member portion, or a third conductive member portion.

4. The electronic device of claim 1, wherein the first split portion or the second split portion comprises a dielectric material having a specified dielectric constant.

5. The electronic device of claim 1, wherein the first split portion and the second split portion have a length of at least 0.5 mm.

6. The electronic device of claim 1, further comprising a display circuit disposed under the flexible display.

7. The electronic device of claim 1, wherein the conductive member comprises a tape including a flexible conductive adhesive layer.

8. The electronic device of claim 3, wherein the second conductive member portion includes at least one protrusion.

9. The electronic device of claim 8, wherein the at least one protrusion includes a plurality of first protrusions or a plurality of second protrusions.

10. The electronic device of claim 8, wherein the at least one protrusion includes a first protrusion, and
the first protrusion extends from one end of the first conductive member portion to at least partially face the first conductive portion.

11. The electronic device of claim 8, wherein the at least one protrusion includes a second protrusion, and
the second protrusion extends from one end of the first conductive member portion toward the first conductive portion to be adjacent to the first conductive portion.

12. The electronic device of claim 3, wherein the first conductive member portion or the third conductive portion includes at least one protrusion.

13. The electronic device of claim 12, wherein the at least one protrusion includes a first protrusion, and
the first protrusion extends from one end of the first conductive member portion to at least partially face the first conductive portion.

14. The electronic device of claim 12, wherein the at least one protrusion includes a second protrusion, and
the second protrusion extends from one end of the first conductive member portion toward the first conductive portion to be adjacent to the first conductive portion.

15. The electronic device of claim 3, wherein the second conductive portion includes a first feeding point, and
the first protrusion included in the second conductive member portion is provided at one point of the second conductive member portion to be spaced apart from the first feeding point.

16. An electronic device comprising:
a housing,
wherein the housing includes a first edge oriented in a first direction and a second edge oriented in a second direction perpendicular to the first direction, and
the second edge includes a first conductive portion, a second conductive portion, and a first non-conductive portion disposed between the first conductive portion and the second conductive portion;
a display defining a front surface of the electronic device;
a dielectric material at least partially disposed between the display and the second edge and at least partially surrounding a perimeter of the display;
a conductive member comprising a conductive material located between the dielectric material and the display; and
a wireless communication circuit disposed within the housing,
wherein the conductive member includes a first split portion corresponding to the first non-conductive portion of the second edge of the housing, and
the wireless communication circuit is configured to transmit and/or receive a radio signal using at least one of the first conductive portion and the second conductive portion of the housing.

17. The electronic device of claim 16, wherein the conductive member includes a first conductive member portion or a second conductive member portion.

18. The electronic device of claim 16, wherein the first split portion comprises a dielectric material having a specified dielectric constant.

19. The electronic device of claim 16, wherein the display further includes a display circuit disposed under a flexible display.

20. The electronic device of claim 17, wherein the first conductive member portion or the second conductive member portion includes at least one protrusion.

21. An electronic device comprising:
a housing,
wherein the housing includes a first edge oriented in a first direction and a second edge oriented in a second direction perpendicular to the first direction, and
the second edge includes a first conductive portion, a second conductive portion, and a first non-conductive portion disposed between the first conductive portion and the second conductive portion;
a display defining a front surface of the electronic device;
a dielectric material at least partially disposed between the display and the second edge and at least partially surrounding a perimeter of the display;
a conductive member comprising a conductive material located between the dielectric material and the display, wherein the conductive member includes a first conductive member portion, a second conductive member portion, and a first split portion disposed between the first conductive member portion and the second conductive member portion; and
a wireless communication circuit disposed within the housing,
wherein the first split portion of the conductive member at least partially corresponding to the first non-conductive portion of the second edge of the housing, and
the wireless communication circuit is configured to transmit and/or receive a radio signal by feeding power to at least one of the first conductive portion and the second conductive portion of the housing.

22. The electronic device of claim 21, wherein the first conductive member portion of the conductive member extends to correspond to the first edge at a position corresponding to the first conductive portion of the second edge.

23. The electronic device of claim 21, wherein the display includes:
a cover window; and
a display circuit disposed under the cover window.

24. The electronic device of claim 23, wherein the display further includes a bent portion having a specified curvature, and
the conductive member is disposed between the bent portion and the dielectric material.

25. The electronic device of claim 21, wherein the first conductive member portion and/or the second conductive member portion includes at least one protrusion.

26. The electronic device of claim 21, wherein the conductive member comprises a tape including a flexible conductive adhesive layer.

27. The electronic device of claim 21, wherein the first conductive member portion, the second conductive member portion, and the first split portion comprise an integral thin film between the dielectric material and the display structure.

28. The electronic device of claim 21, wherein the conductive member is disposed between the dielectric material and the display to be adjacent to one surface of the display.

29. The electronic device of claim 21, wherein the conductive member is disposed between the dielectric material and the display to be adjacent to the second edge of the display.

30. The electronic device of claim 21, wherein the conductive member is disposed between the dielectric material and the display to be adjacent to the dielectric material.

* * * * *